(12) United States Patent
Yamashita et al.

(10) Patent No.: US 11,169,168 B2
(45) Date of Patent: Nov. 9, 2021

(54) AUTOMATED ANALYZER

(71) Applicant: Hitachi High-Technologies Corporation, Tokyo (JP)

(72) Inventors: Taichiro Yamashita, Tokyo (JP);
Yoshihiro Yamashita, Tokyo (JP);
Takenori Okusa, Tokyo (JP);
Shunsuke Sasaki, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 345 days.

(21) Appl. No.: 16/483,799

(22) PCT Filed: Mar. 7, 2018

(86) PCT No.: PCT/JP2018/008842
§ 371 (c)(1),
(2) Date: Aug. 6, 2019

(87) PCT Pub. No.: WO2018/168613
PCT Pub. Date: Sep. 20, 2018

(65) Prior Publication Data
US 2020/0191814 A1    Jun. 18, 2020

(30) Foreign Application Priority Data

Mar. 17, 2017    (JP) .............................. JP2017-052059

(51) Int. Cl.
| | |
|---|---|
| *G01N 35/02* | (2006.01) |
| *G01N 35/04* | (2006.01) |
| *G01N 35/10* | (2006.01) |

(52) U.S. Cl.
CPC ........... *G01N 35/025* (2013.01); *G01N 35/04* (2013.01); *G01N 35/1002* (2013.01); *G01N 2035/0406* (2013.01); *G01N 2035/0412* (2013.01)

(58) Field of Classification Search
CPC .. G01N 35/025; G01N 35/04; G01N 35/1002; G01N 2035/0406;
(Continued)

(56) References Cited

U.S. PATENT DOCUMENTS

| | | |
|---|---|---|
| 5,609,822 A | 3/1997 | Carey et al. |
| 5,776,784 A | 7/1998 | Kegelman et al. |

(Continued)

FOREIGN PATENT DOCUMENTS

| | | |
|---|---|---|
| JP | 09-33535 A | 2/1997 |
| JP | 11-502625 A | 3/1999 |

(Continued)

OTHER PUBLICATIONS

Japanese-language Office Action issued in Japanese Application No. 2017-052059 dated Aug. 18, 2020 with English translation (four (4) pages).

(Continued)

*Primary Examiner* — Jill A Warden
*Assistant Examiner* — John McGuirk
(74) *Attorney, Agent, or Firm* — Crowell & Moring LLP

(57) ABSTRACT

An automated analyzer includes a reagent container holder (2) including an openable and closable opening (23) and including a plurality of reagent container holding slots capable of holding reagent containers at internal predetermined positions, and loading assisting means (24) for executing a loading process of conveying the reagent container (3) from outside of the reagent container holder (2) into the reagent container holder (2) via the opening (23) to load the reagent container (3) into the reagent container holding slot (26) and a taking-out process of conveying the reagent container (3) from the reagent container holding slot (26) to outside of the reagent container holder (2) via the opening (23). The loading assisting means (24) is further provided with placing means (33) for the reagent container (3), and an operation handle (34) to be operated for driving the loading assisting means (24). Thus, an automated analyzer can be provided that allows a reagent replacing operation to be easily and reliably achieved.

9 Claims, 42 Drawing Sheets

(58) Field of Classification Search
CPC ... G01N 2035/0412; G01N 2035/0443; G01N 35/0099
See application file for complete search history.

(56) References Cited

U.S. PATENT DOCUMENTS

2008/0014118 A1   1/2008   Kitagawa et al.
2012/0301359 A1   11/2012  Kraemer et al.
2014/0295562 A1   10/2014  Wakamiya et al.

FOREIGN PATENT DOCUMENTS

| | | |
|---|---|---|
| JP | 2008-32688 A | 2/2008 |
| JP | 2011-27663 A | 2/2011 |
| JP | 2013-500489 A | 1/2013 |
| JP | 2014-194390 A | 10/2014 |

OTHER PUBLICATIONS

International Search Report (PCT/ISA/210) issued in PCT Application No. PCT/JP2018/008842 dated May 29, 2018 with English translation (four pages).
Japanese-language Written Opinion (PCT/ISA/237) issued in PCT Application No. PCT/JP2018/008842 dated May 29, 2018 (three pages).
International Preliminary Report on Patentability (PCT/IB/338 & PCT/IB/373) issued in PCT Application No. PCT/JP2018/008842 dated Sep. 26, 2019, including English translation of document C2 (Japanese-language Written Opinion (PCT/ISA/237) previously filed on Aug. 6, 2019) (six (6) pages).

CROSS SECTION B-B

UPRIGHT POSITION

CROSS SECTION C-C

CROSS SECTION D-D

CROSS SECTION D-D

COMPLETE LOADING OF NEW BOTTLE

COMPLETE TAKE-OUT OF EMPTY BOTTLE

AUTOMATED ANALYZER

TECHNICAL FIELD

The present invention relates to an automated analyzer qualitatively or quantitatively analyzing a biological sample such as blood or urine.

BACKGROUND ART

Automated analyzers are devices that automatically analyze blood or any other biological sample and output results and that are indispensable to hospitals and medical testing facilities. The automated analyzers are required to conduct a variety of tests in a shorter time.

In a case where a reagent loaded in the device is to run short, the automated analyzer issues, to an operator, a warning indicating possible shortage of the reagent to urge the operator to replace the reagent with a new full one. The operator temporality stops the automated analyzer and performs a reagent replacing operation, and thus, the automated analyzer is desirably configured to allow an easy and reliable reagent replacing operation and to enable the replacement to be achieved in a short time.

An automated analyzing instrument (automated analyzer) described in Patent Document 1 "includes a reagent driving disk (301) housing a reagent used for analysis and transporting the reagents to a desired position, and a fixed disk (303) including a reagent standby position where a reagent container (110) containing a reagent is caused to temporarily stand by and a magnetic-particle stirring position where magnetic particles are stirred. A part of the reagent standby position is constituted of a loading system (304). In accordance with an analysis request status, a reagent container moving unit (305) moves the reagent container (110) containing the reagent between the reagent driving unit (301) and the fixed disk (303). A part of the fixed disk (303) is provided with the loading system (304) inside which the reagent container (110) containing the reagent can be mounted, to allow any of reagent containers (60) to be changed regardless of an operating state of the reagent fixed disk and to provide the system with a low-temperature storage function."

PRIOR ART DOCUMENT

Patent Document

Patent Document 1: JP-2013-500489-A

SUMMARY OF THE INVENTION

Problems to be Solved by the Invention

In the configuration disclosed in Patent Document 1, to load a reagent in the reagent disk (111), the reagent container (110) containing the reagent is moved between the reagent driving unit (301) and the fixed disk (303) by the reagent container moving unit (305) driven by an electric actuator such as a motor. Moreover, the loading system (304) allowing the reagent container (110) to be mounted in the system is driven in an up-down direction by a reagent actuator (402).

In other word, the reagent container (110) is loaded into the reagent disk (111) using the plurality of electric actuators, thus limiting simplification and miniaturization of the structure and simplification of an operation control algorithm.

On the other hand, in a case where the reagent container is loaded by being manually directly gripped, there is a problem in that when the loading of the reagent container is completed, the position of the reagent container is likely to vary.

An object of the present invention is to provide an automated analyzer that has a simple structure and that can be miniaturized, the automated analyzer allowing an easy and reliable reagent replacing operation and enabling the reagent replacement to be achieved in a short time.

Means for Solving the Problems

To accomplish the object, the present invention is provided with a reagent container holder including an openable and closable opening and a plurality of reagent container holding slots capable of holding a reagent container at an internal predetermined position, and loading assisting means executing a loading process of conveying the reagent container from outside of the reagent container holder into the reagent container holder via the opening to load the reagent container into one of the reagent container holding slots and a taking-out process of conveying the reagent container from the reagent container holding slot to outside of the reagent container holder via the opening, the loading assisting means being provided with a reagent container installing section in which the reagent container is capable of being installed, a pillar movably supporting the reagent container installing section, and an operation handle operating the reagent container installing section in conjunction with an operation by a user.

Effects of the Invention

According to the present invention, an automated analyzer can be provided that has a simple structure and that can be miniaturized, the automated analyzer allowing an easy and reliable reagent replacing operation and enabling the reagent replacement to be achieved in a short time.

MODES FOR CARRYING OUT THE INVENTION

Embodiments of the present invention will be described below with reference to the drawings.

Figure 1:
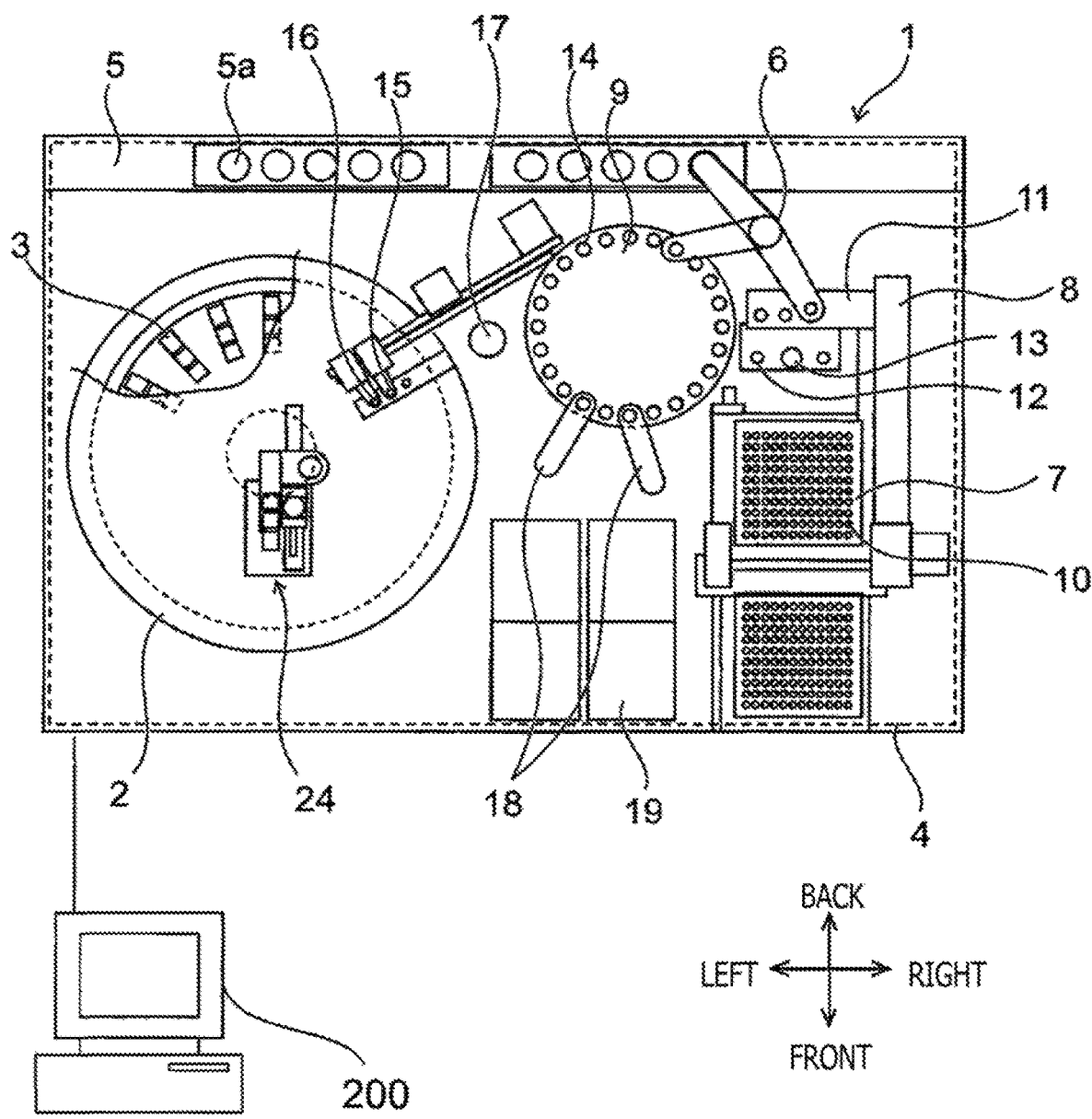
FIG. 1 is a diagram of a configuration of an automated analyzer according to a first embodiment of the present invention.
Figure 2:
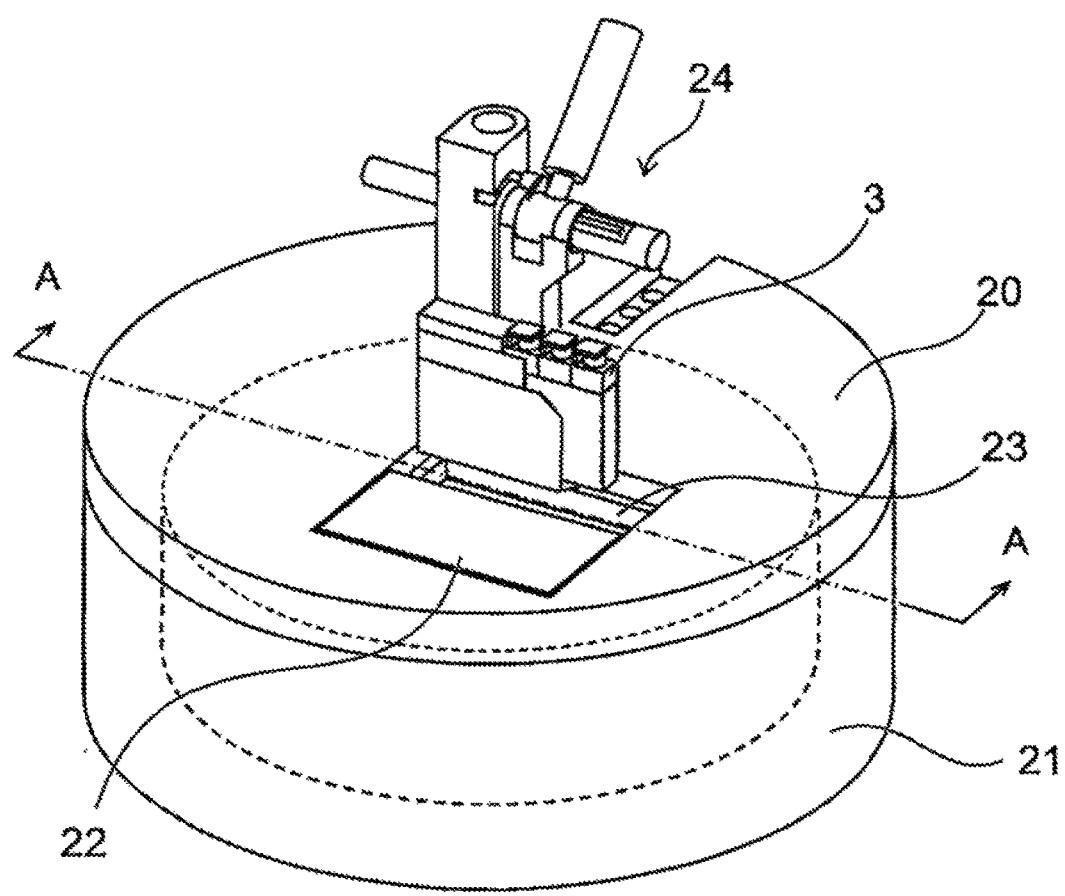
FIG. 2 is a perspective view of a reagent disk and reagent bottle loading means in the automated analyzer according to the first embodiment of the present invention.
Figure 2:
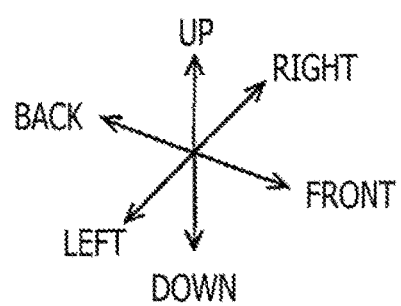
Figure 3:
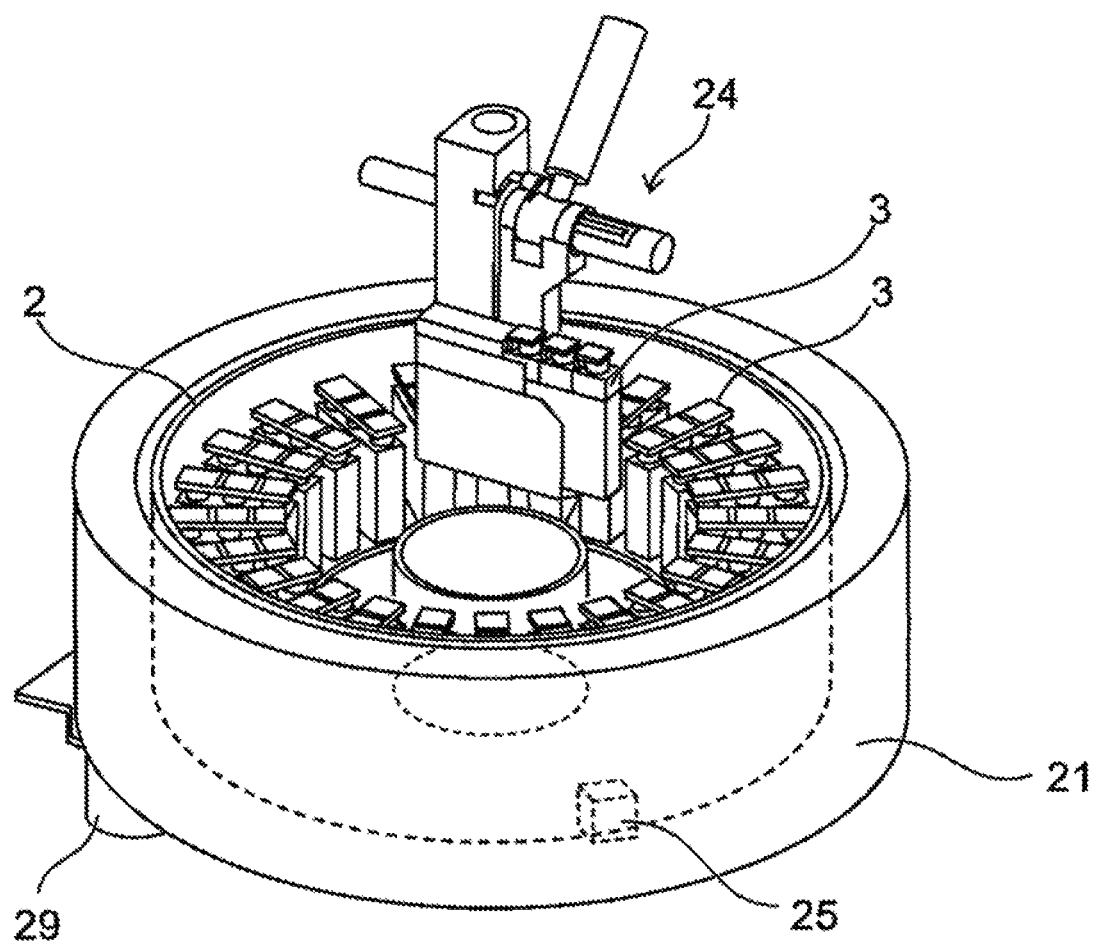
FIG. 3 is a perspective view of the reagent disk and the reagent bottle loading means in the automated analyzer according to the first embodiment of the present invention, the view illustrating a state in which an upper surface lid has been removed.
Figure 3:
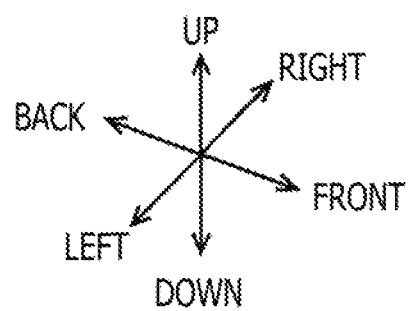
Figure 4:
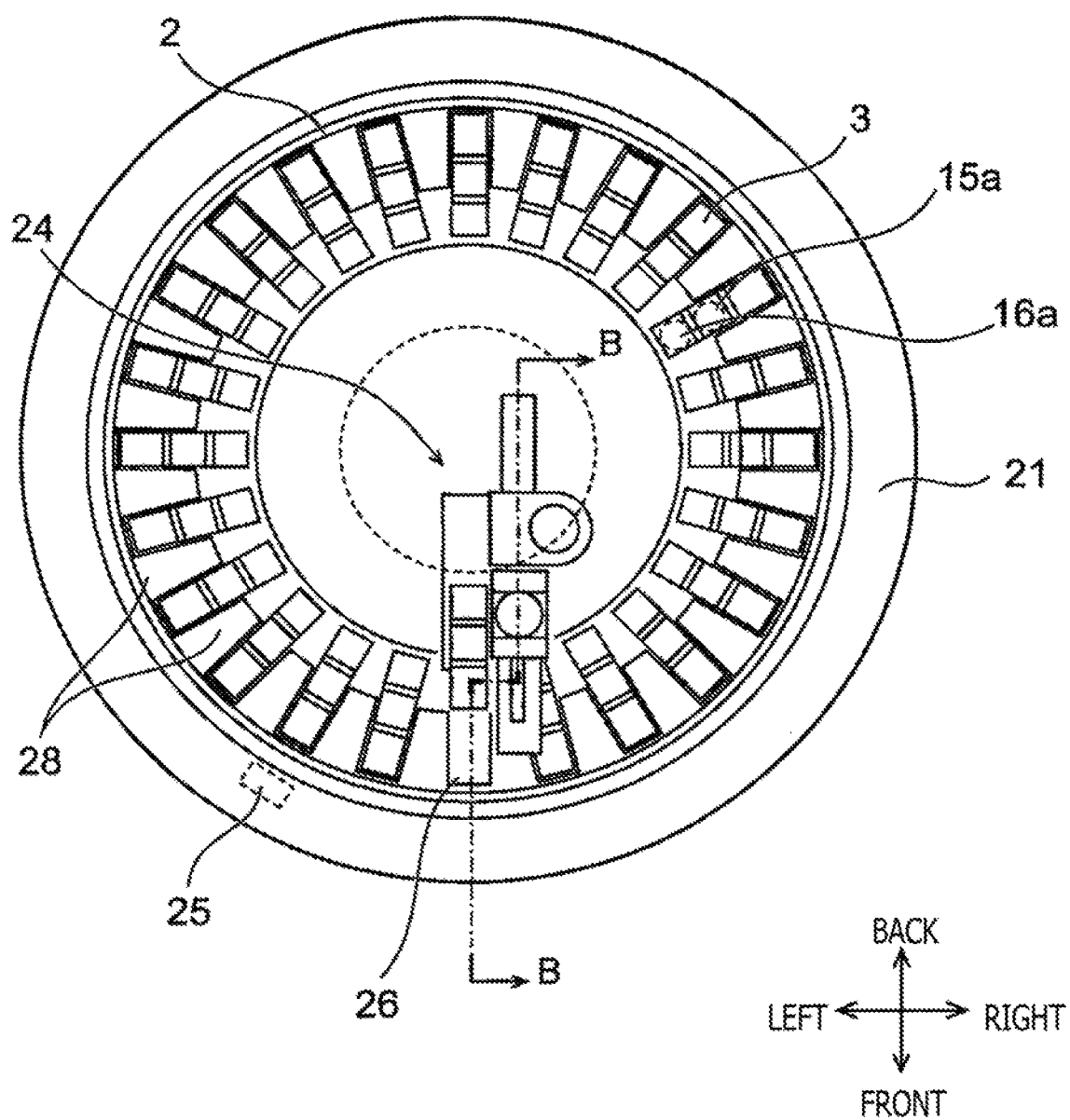
FIG. 4 is a plan view of the reagent disk and the reagent bottle loading means in the automated analyzer according to the first embodiment of the present invention, the view illustrating the state in which the upper surface lid has been removed.
Figure 5:
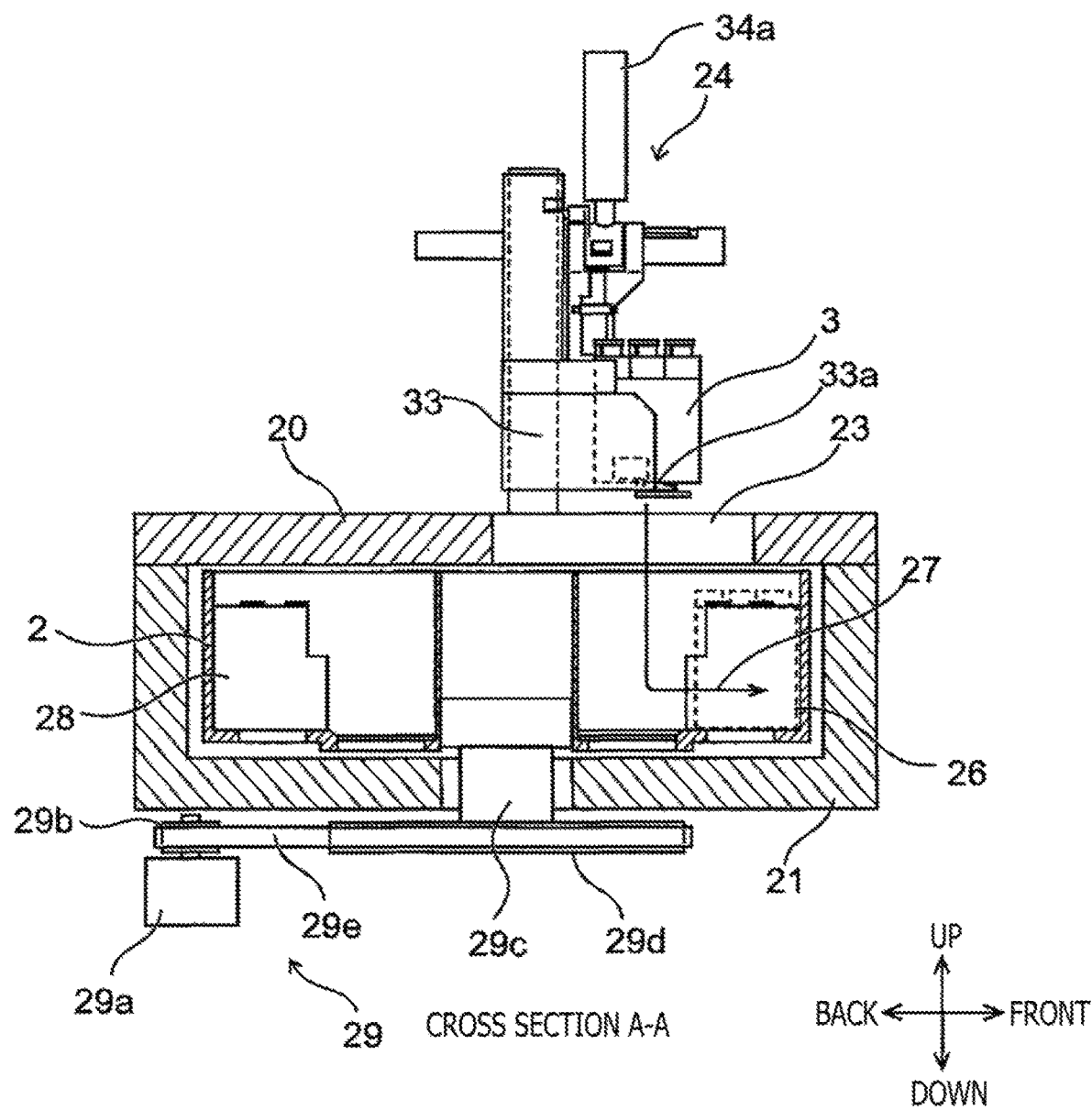
FIG. 5 is an A-A cross-sectional view of the reagent disk and the reagent bottle loading means in the automated analyzer according to the first embodiment of the present invention.
Figure 6A:
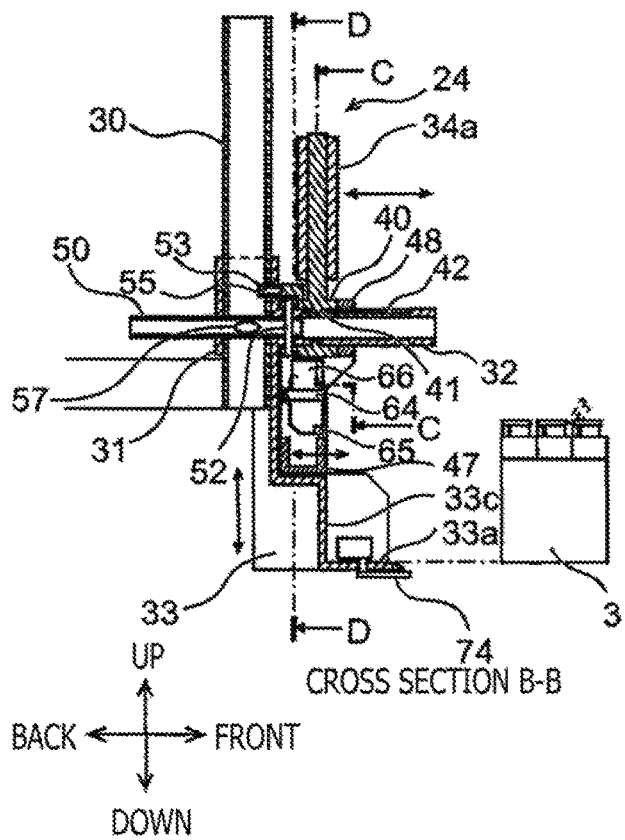
FIG. 6A is a B-B cross-sectional view of the reagent bottle loading means in the automated analyzer according to the first embodiment of the present invention.
Figure 6B:
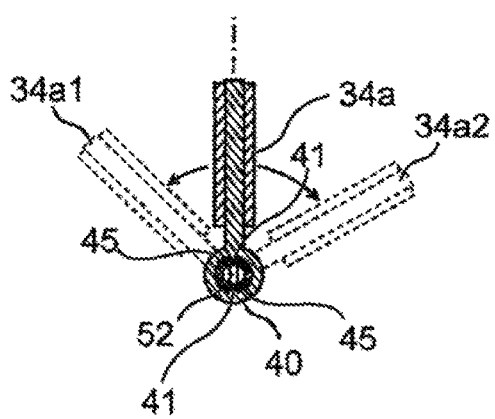
FIG. 6B is a C-C cross-sectional view of the reagent bottle loading means in the automated analyzer according to the first embodiment of the present invention.
Figure 6B:
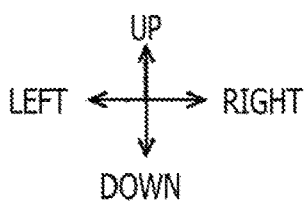
Figure 7A:
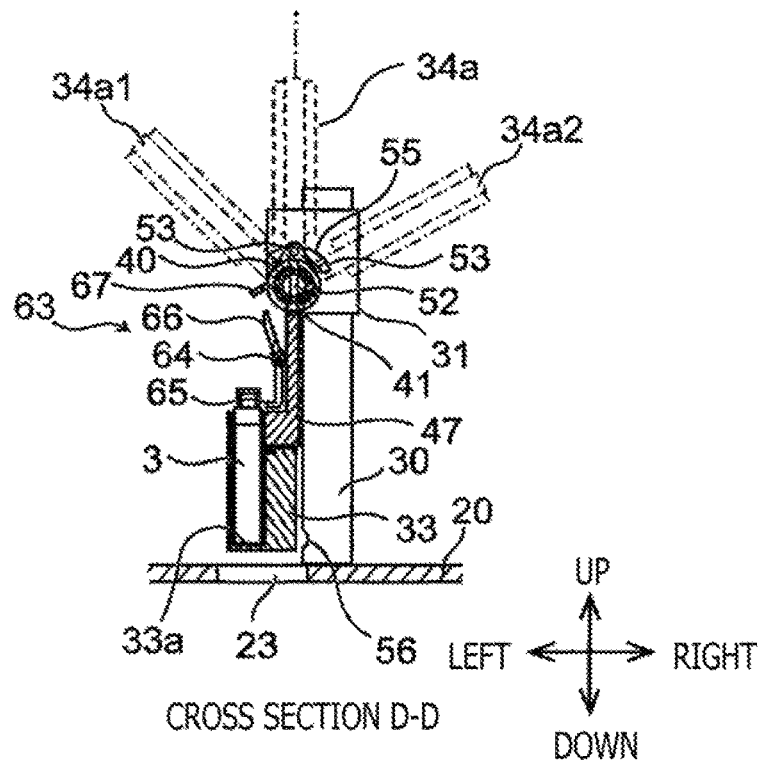
FIG. 7A is a D-D cross-sectional view of the reagent bottle loading means in the automated analyzing device according to the first embodiment of the present invention, the view illustrating a case where an operation handle has been operated to an upright position.
Figure 7B:
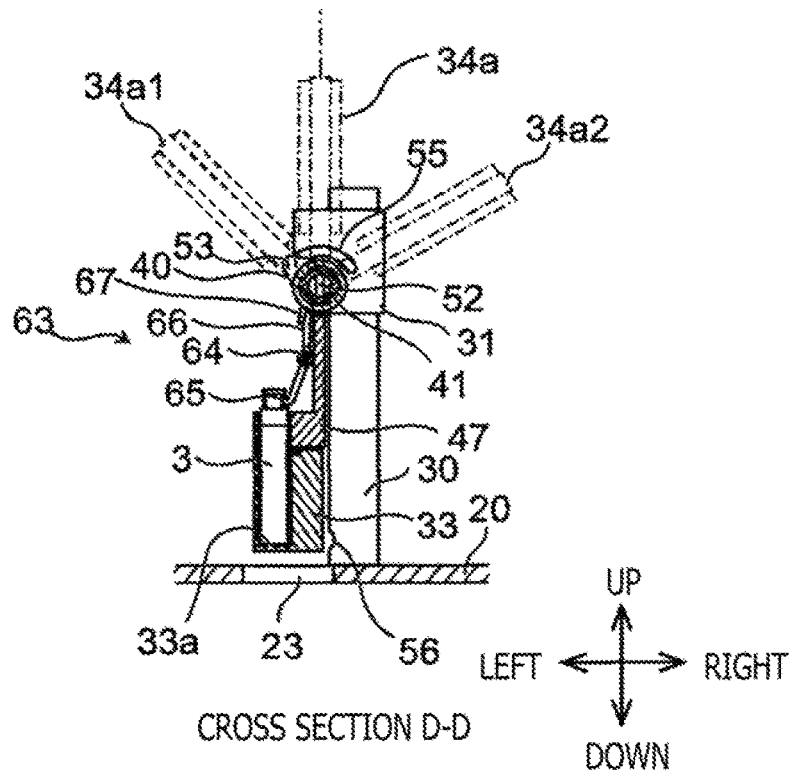
FIG. 7B is a D-D cross-sectional view of the reagent bottle loading means in the automated analyzer according to the first embodiment of the present invention, the view illustrating a state where an operation handle has been tilted leftward.
Figure 8:
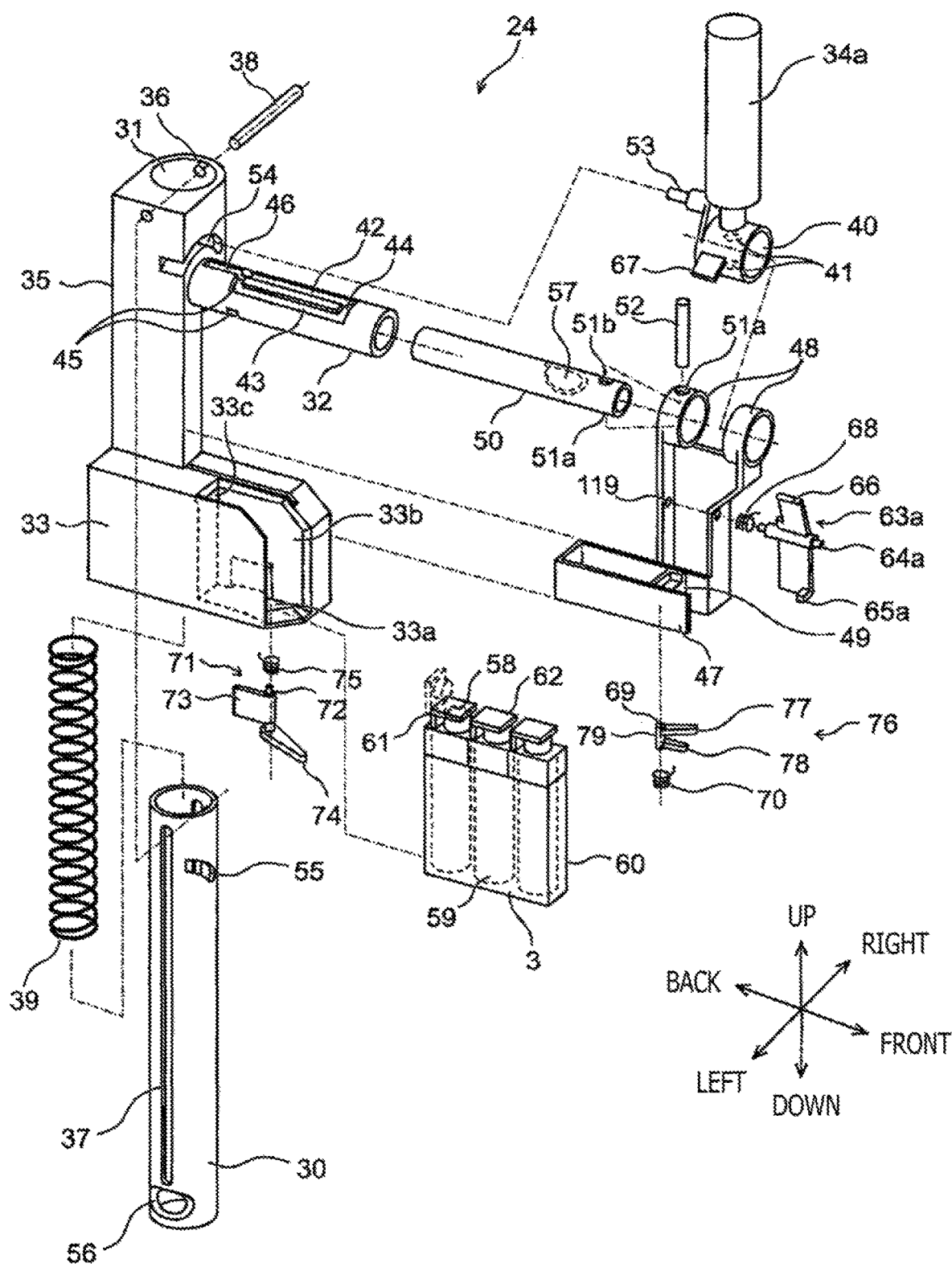
FIG. 8 is an exploded perspective view illustrating a configuration of the reagent bottle loading means in the automated analyzer according to the first embodiment of the present invention.
Figure 9:
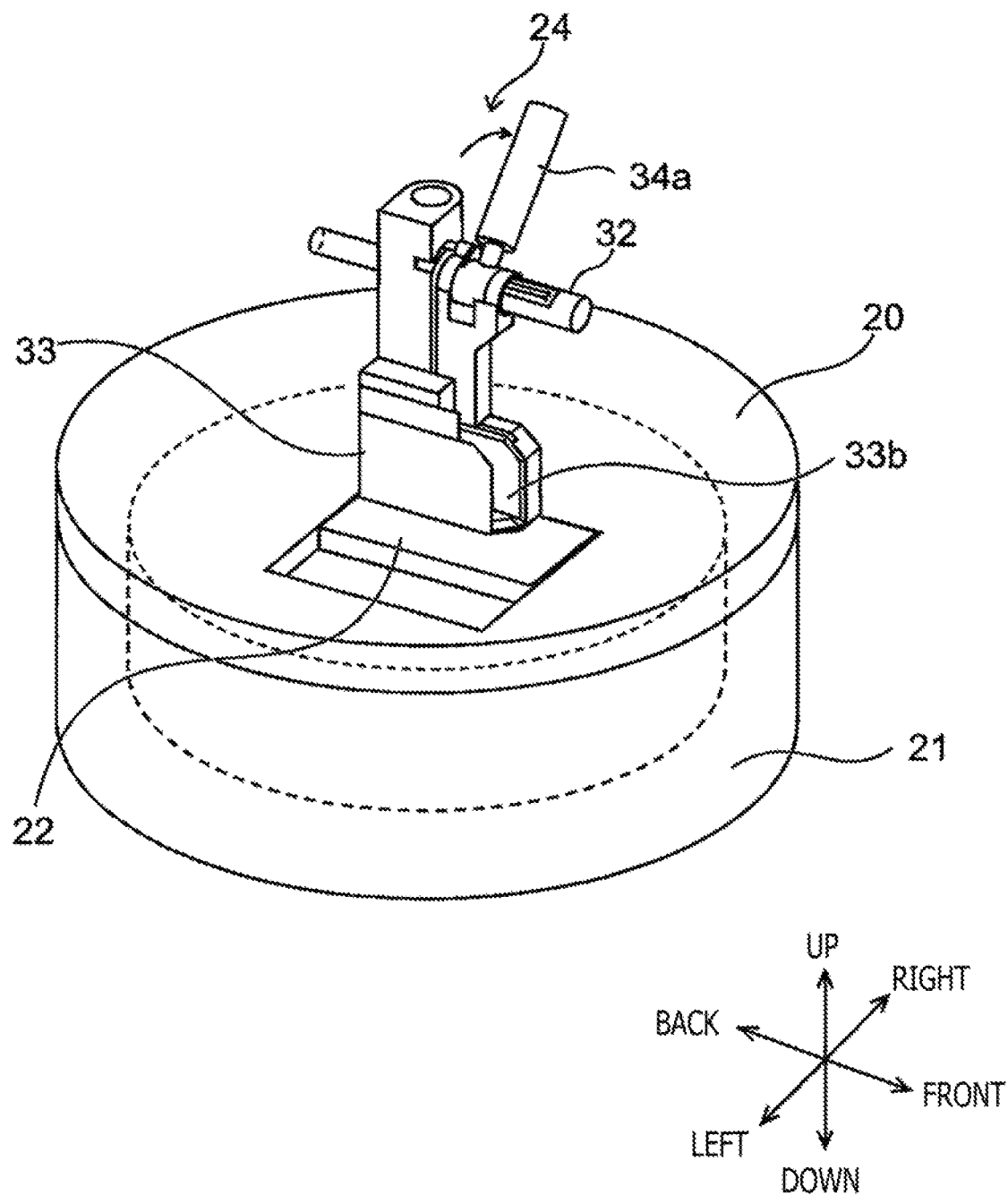
FIG. 9 is a perspective view illustrating a first state of the automated analyzer according to the first embodiment of the present invention.
Figure 10:
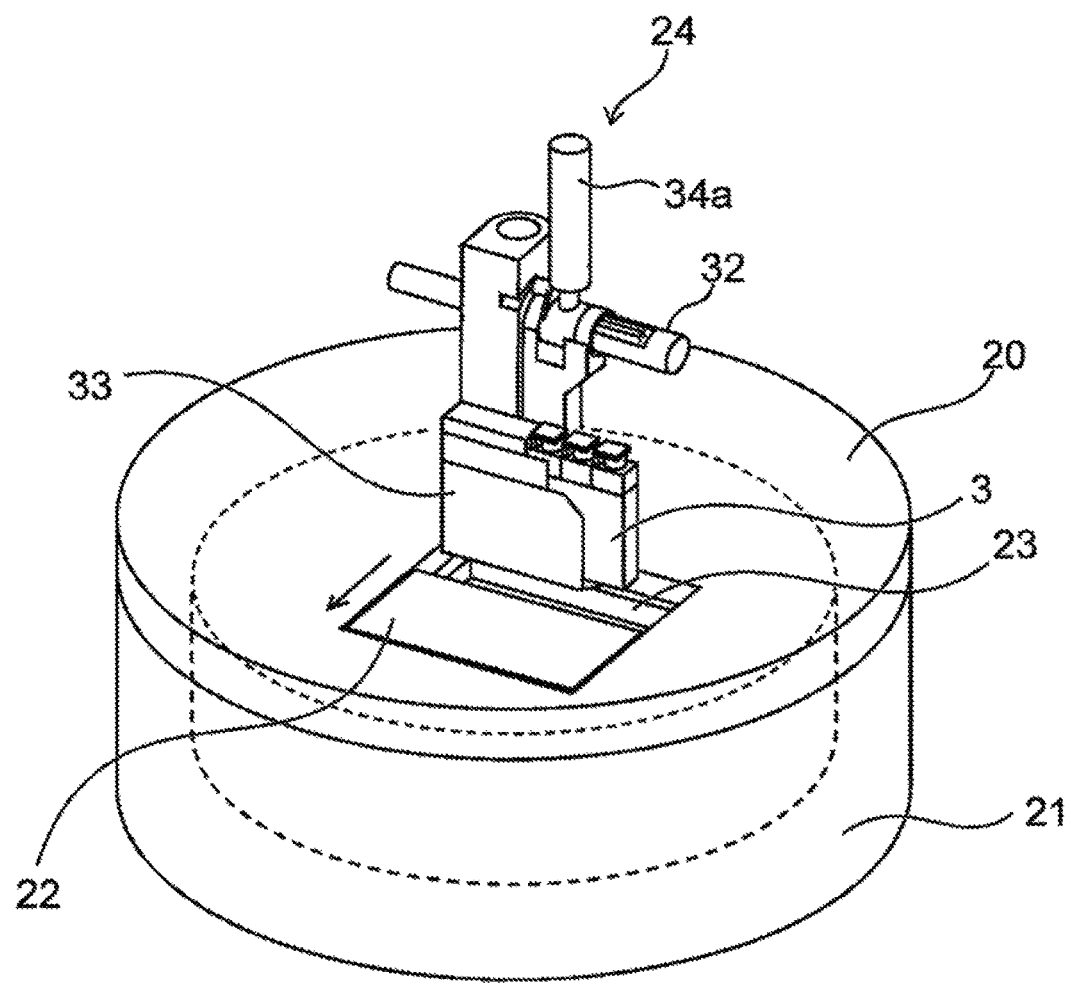
FIG. 10 is a perspective view illustrating a second state of the automated analyzer according to the first embodiment of the present invention.
Figure 10:
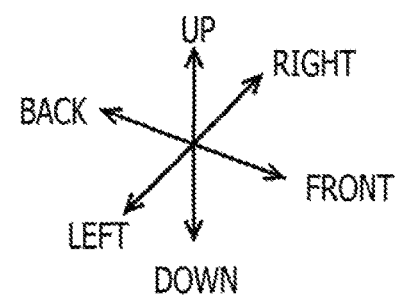
Figure 11:
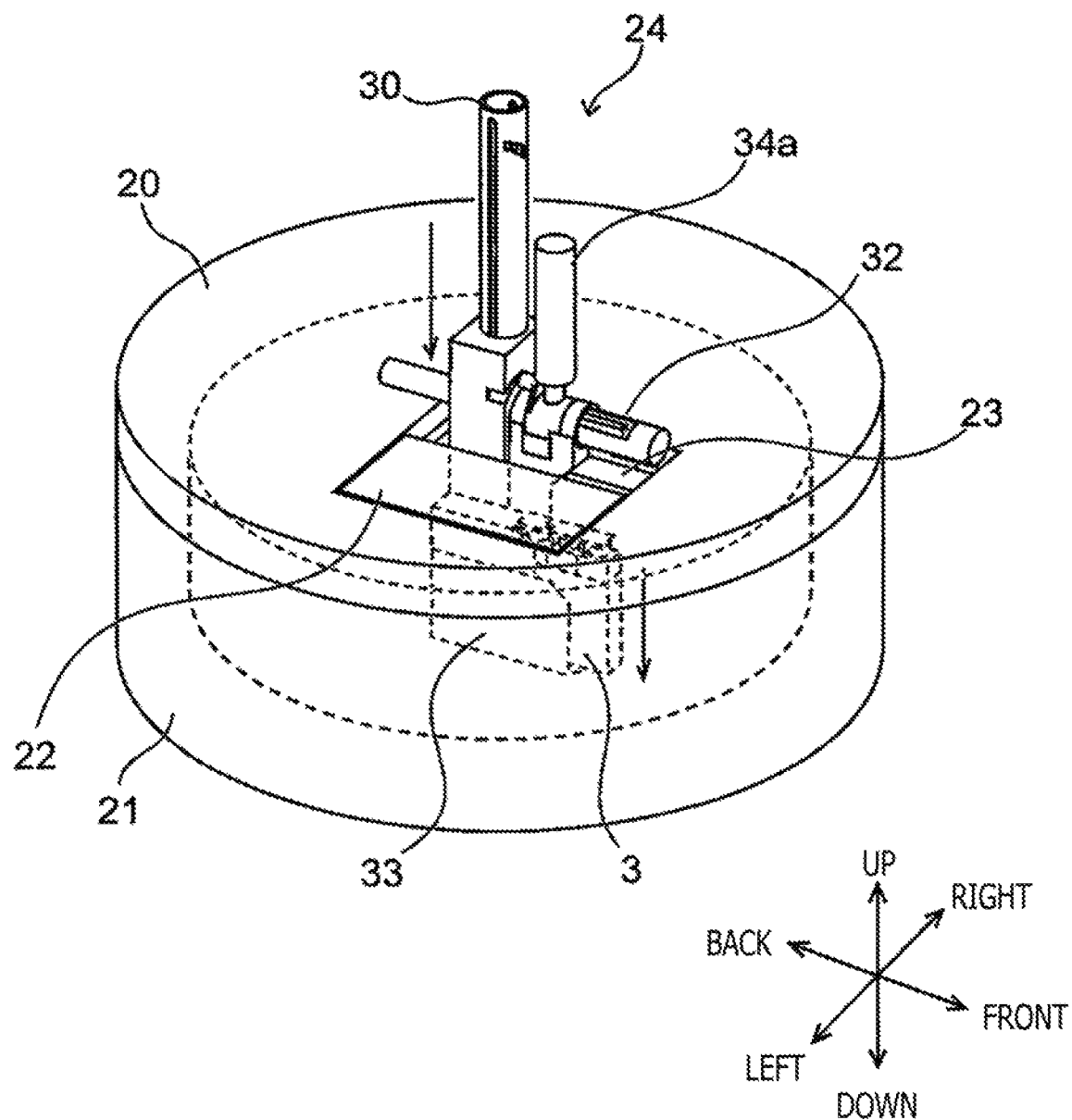
FIG. 11 is a perspective view illustrating a third state of the automated analyzer according to the first embodiment of the present invention.
Figure 12:
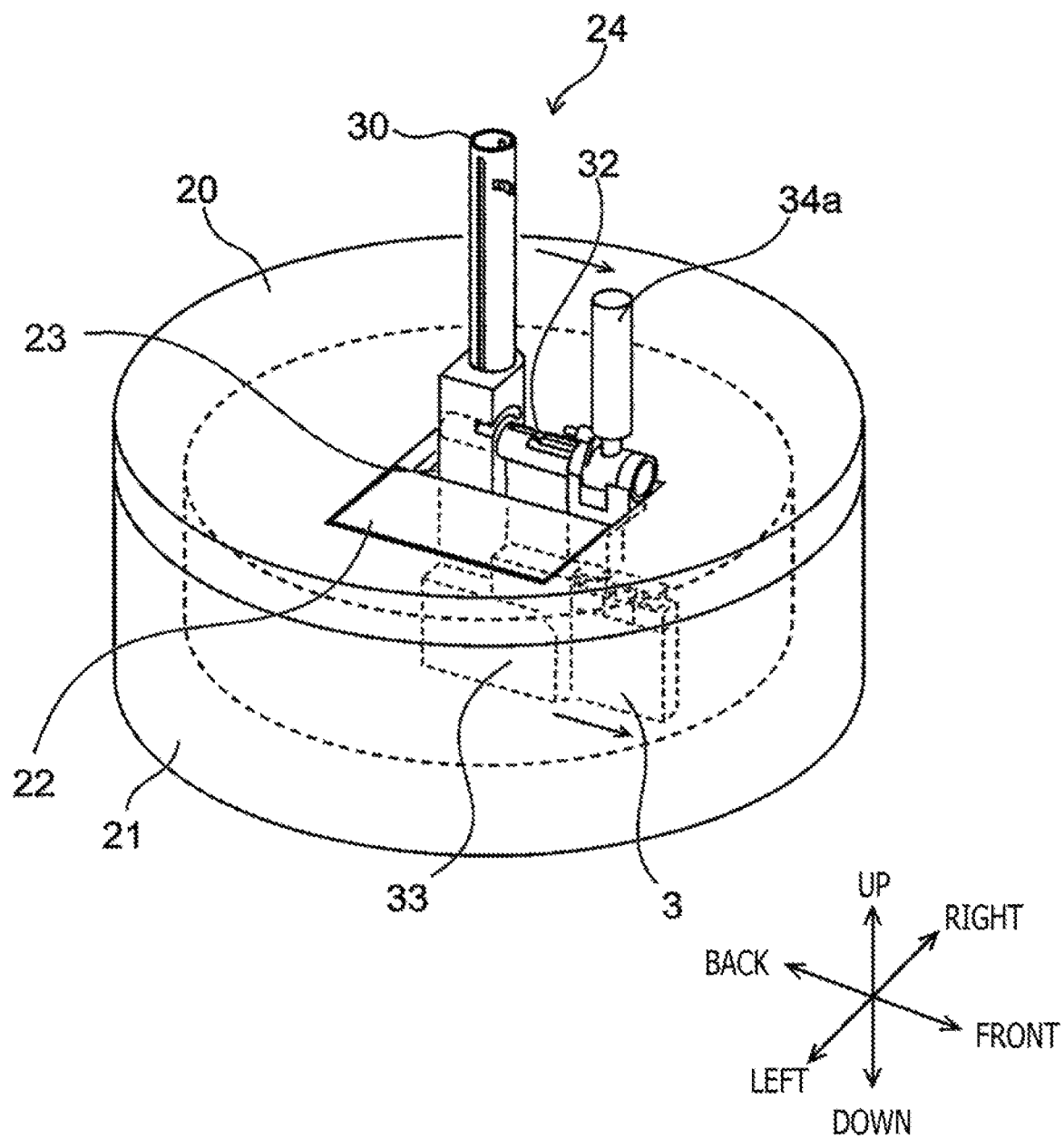
FIG. 12 is a perspective view illustrating a fourth state of the automated analyzer according to the first embodiment of the present invention.
Figure 13:
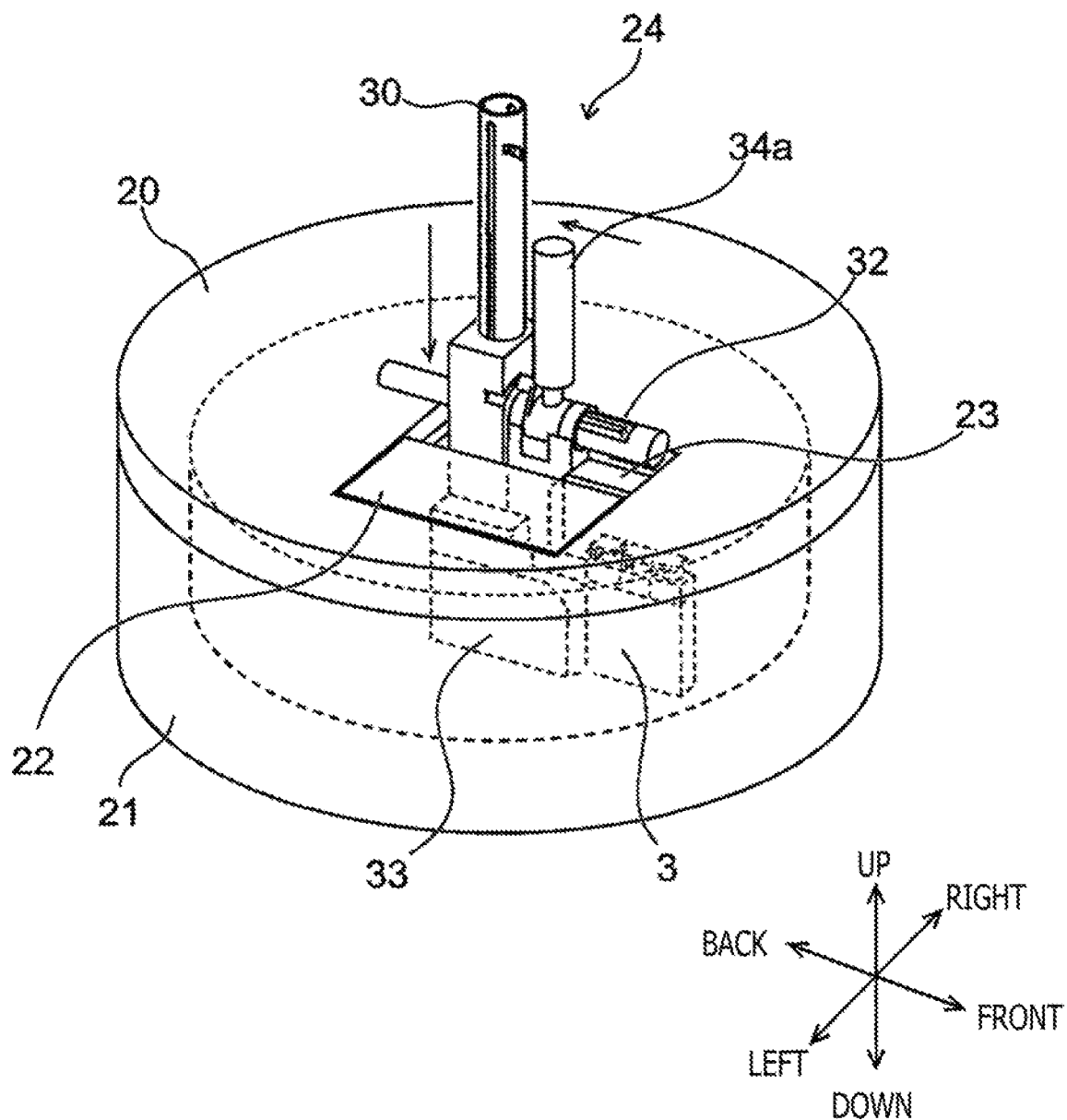
FIG. 13 is a perspective view illustrating a fifth state of the automated analyzer according to the first embodiment of the present invention.
Figure 14:
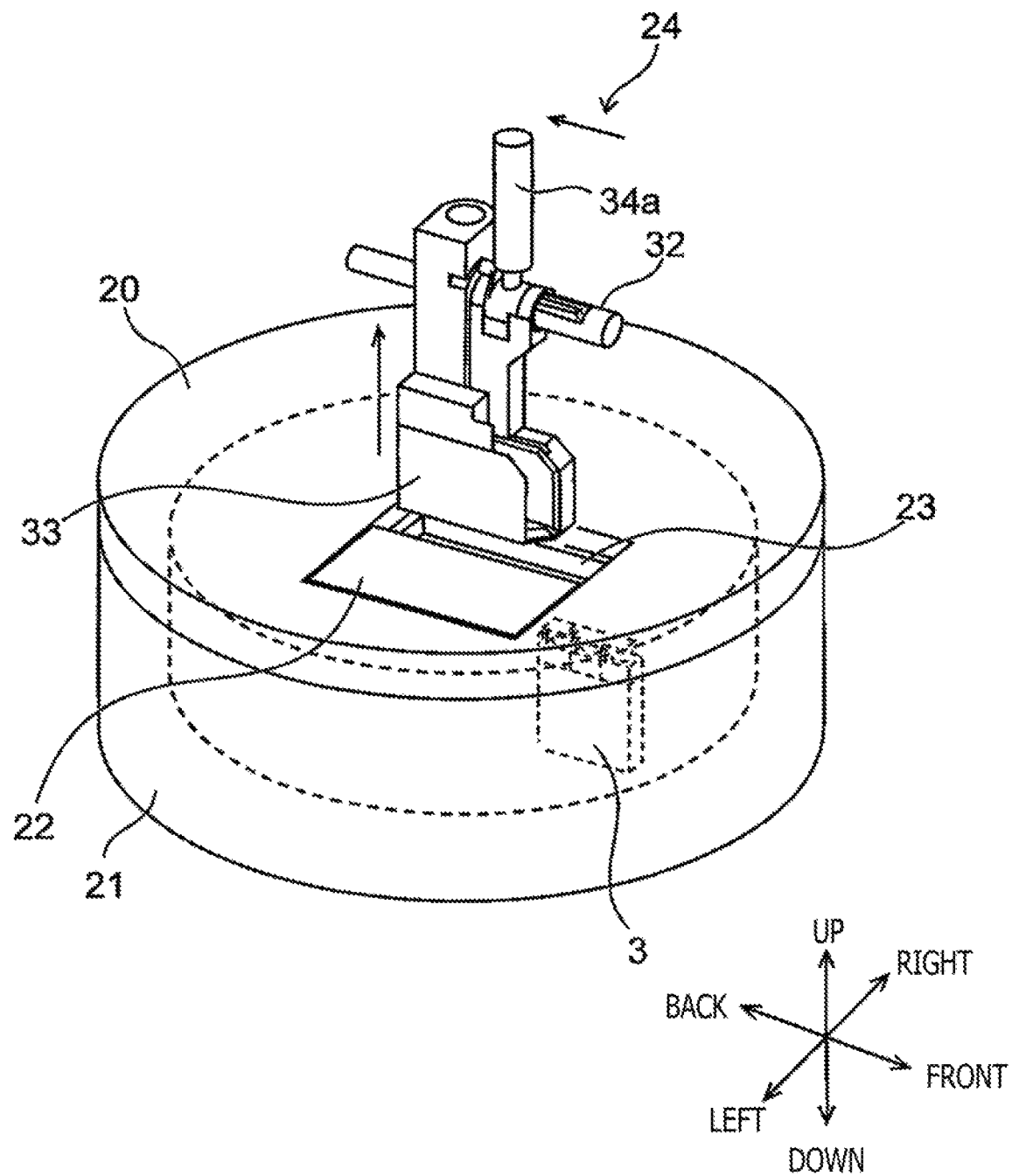
FIG. 14 is a perspective view illustrating a sixth state of the automated analyzer according to the first embodiment of the present invention.
Figure 15:
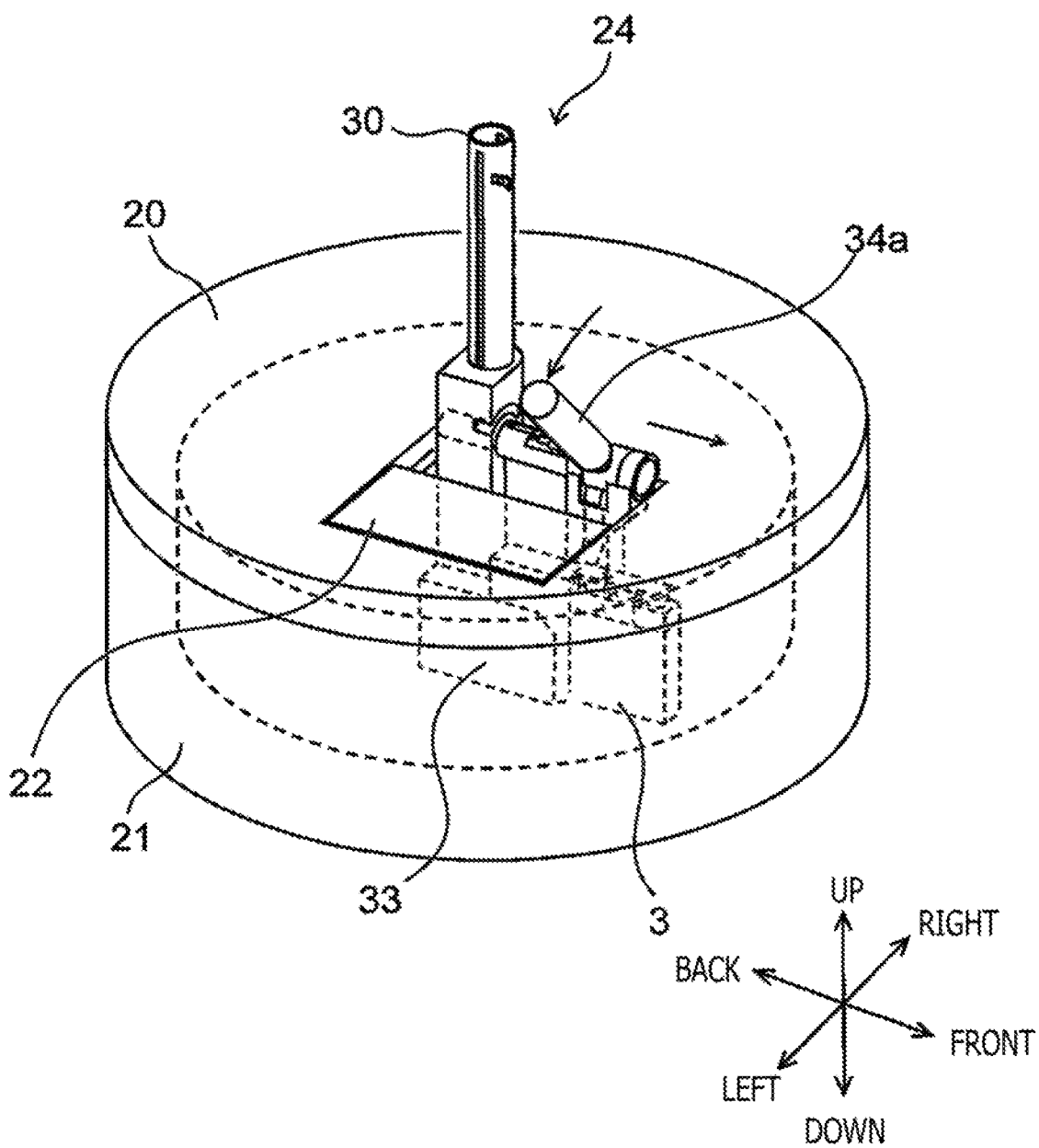
FIG. 15 is a perspective view illustrating a seventh state of the automated analyzer according to the first embodiment of the present invention.
Figure 16:
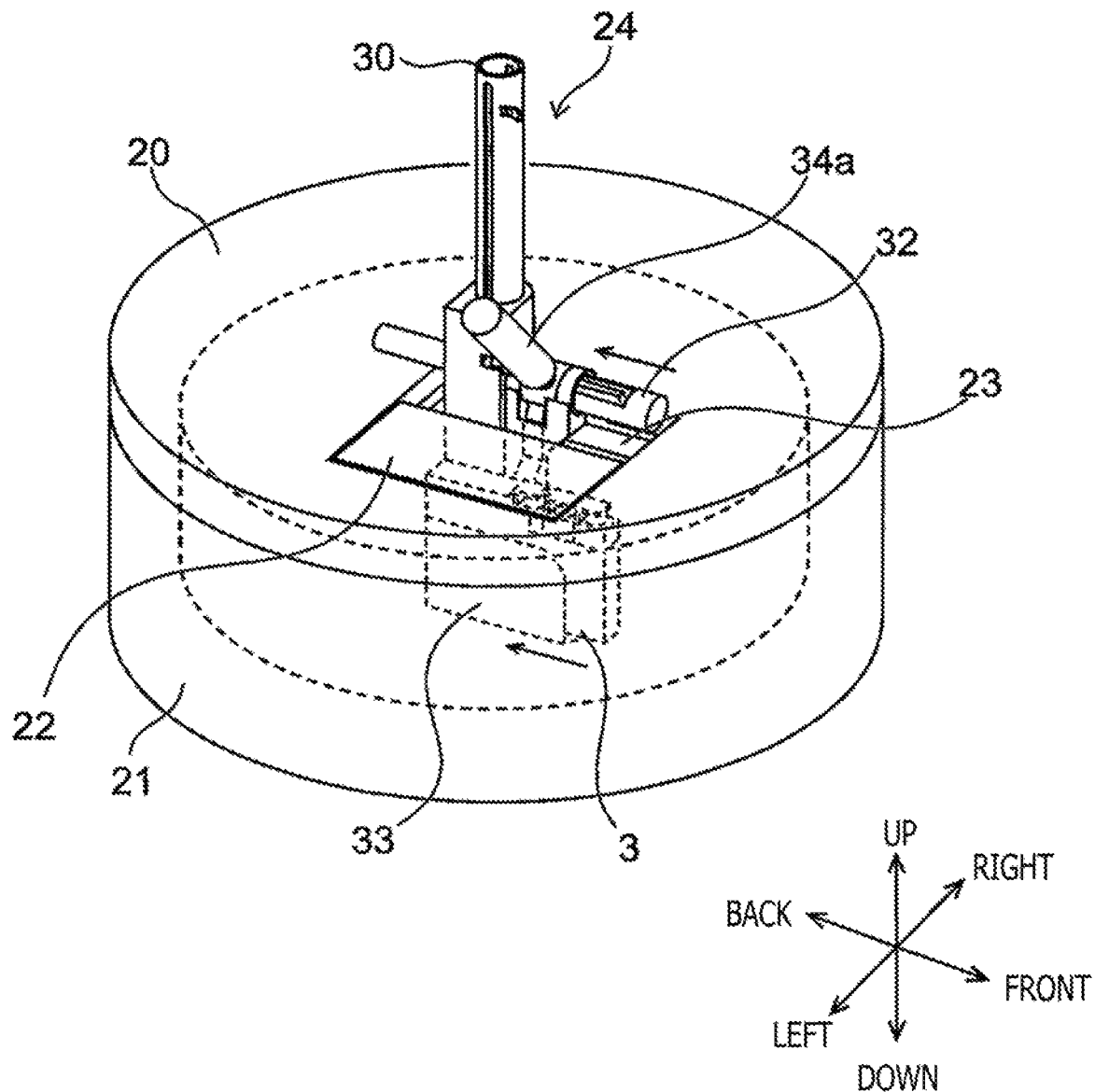
FIG. 16 is a perspective view illustrating an eighth state of the automated analyzer according to the first embodiment of the present invention.

FIGS. 1 to 8 relate to a first embodiment of the present invention. FIG. 1 is a plan view of an automated analyzer including a reagent disk (hereinafter referred to as a reagent container holder or a drum). FIG. 2 and FIG. 3 are perspective views of the reagent disk and reagent bottle loading means. FIG. 4 is a plan view of the reagent disk and the reagent bottle loading means. FIG. 5 is an A-A cross-sectional view in FIG. 2. FIG. 6A is a B-B cross-sectional view in FIG. 4, and FIG. 6B is a C-C cross-sectional view. FIG. 7A and FIG. 7B are D-D cross-sectional views. FIG. 8 is an exploded perspective view illustrating a configuration of the reagent bottle loading means.

Additionally, an up-down direction, a lateral direction, and a front-back direction are based on an up-down direction, a lateral direction, and a front-back direction in FIG. 1 and FIG. 2.

An automated analyzer 1 according to the present embodiment illustrated in FIG. 1 provides functions to house a plurality of reagent containers (hereinafter sometimes referred to as reagent containers, reagent bottles, or simply bottles) along an inner side of an outer peripheral wall of a cylindrical reagent disk 2 supported so as to be rotatable around a vertical axis, to suck a predetermined amount of predetermined reagent from each of the reagent bottles 3 using a dispensing pipette, and mix the reagent with a biological sample such as blood or urine in a reaction container and analyze the mixture. The automated analyzer 1 is provided with a safety cover 4 supported openable and closable backward via a hinge and covering the movable parts. The safety cover 4 is provided with what is called an interlock based on, for example, an unillustrated solenoid. While the automated analyzer 1 is in operation, a current is conducted through the solenoid to bar and keep the safety cover 4 closed. While the automated analyzer 1 is stopped, the current conduction through the solenoid is cancelled to allow safety cover 4 to be opened. An operator, therefore, can manually replace the reagent bottles 3 with new ones.

The inside of the reagent bottle 3 is divided into a plurality of housing areas to allow a plurality of reagents to be housed in the housing areas, and an upper surface of each of the housing areas forms an openable and closable lid. Details of configuration of the reagent bottle 3 will be described below.

First, a conveying path for samples to be analyzed will be described.

A sample 5a to be analyzed is moved through the automated analyzer 1 by sample conveying means 5 such as a belt conveyor or a rack handler and conveyed to sample dispensing means 6 for dispensing, the sample dispensing means 6 including a dispensing pipette that dispenses a sample.

A plurality of sample dispensing tips and a plurality of reaction containers placed on sample dispensing tip/reaction container supply means 7 are supplied to the automated analyzer 1. The reaction containers are moved from the sample dispensing tip/reaction container supply means 7 to an incubator 9 (sometimes referred to as a culture disk) by sample dispensing tip/reaction container conveying means 8. Sample dispensing tips 10 are moved from the sample dispensing tip/reaction container supply means 7 to a sample dispensing tip buffer 11.

To enable such movement, the sample dispensing tip/reaction container conveying means 8 is configured to be movable in an X-axis direction (lateral direction), a Y-axis direction (front-back direction), and a Z-axis direction (up-down direction). For a moving range, the sample dispensing tip/reaction container conveying means 8 is configured to be movable within a range spanning areas above a reaction container disposal hole 12, the sample dispensing tip buffer 11, reaction solution stirring means 13, the sample dispensing tip/reaction container supply means 7, and a part of the incubator 9.

The sample dispensing tip buffer 11 is a buffer on which a plurality of the sample dispensing tips 10 are temporarily placed, and the sample dispensing means 6 moves to the area above the sample dispensing tip buffer 11 and grips any one of the sample dispensing tips 10.

The disk-like incubator 9 rotatably supported around a vertical center shaft is configured to lock a plurality of reaction containers 14 on a circumference near an outer periphery of the incubator 9. Rotating the incubator 9 allows each of the reaction containers 14 to a predetermined position.

Then, the sample dispensing means 6 moves to an area above a sample and sucks the sample into the sample dispensing tip 10, and then moves to an area above the reaction container 14 on the incubator 9 and discharges the sample from inside of the sample dispensing tip 10 into the reaction container 14. Subsequently, the sample dispensing means 6 moves to an area above the sample dispensing tip/reaction container disposal hole 12 and drops the sample dispensing tip 10 into a hole for disposal.

Now, a conveying path for a reagent to be added to the sample in the reaction containers 14 will be described.

A reagent disk 2 that is shaped like a cylinder rotatably supported around a vertical center shaft and that is internally hollow forms slots radially holding a plurality of reagent bottles 3 along an internally hollow outer peripheral wall. Rotating the reagent disk 2 moves each reagent bottle 3 to a predetermined position on a circumference of the reagent disk 2. Note that some of the reagent bottles 3 contain a reagent containing a large number of magnetic particles.

A reagent dispensing pipette 15 is configured to be movable so as to be capable of sucking the reagent in the reagent bottle 3 and moving to a predetermined position.

First, the reagent dispensing pipette 15 moves to an area over a predetermined type of reagent on the reagent disk 2 and sucks a predetermined amount of reagent, and then moves to an area above a predetermined reaction container 14 on the incubator 9 and discharges the reagent into the reaction container 14.

Stirring means 16 for reagents is provided in an upper portion of the reagent disk 2. The stirring means 16 is provided with a magnetic-particle stirring arm (hereinafter referred to as a stirrer) rotatable around a vertical axis. The magnetic-particle stirring arm moves to an area above the reagent bottle 3 containing the reagent containing magnetic particles that is to be stirred and lowers, into the reagent, for example, a paddle-like or spiral magnetic-particle stirring means provided at a lower end of the magnetic-particle stirring arm. The magnetic-particle stirring means is rotated to stir a solution of the magnetic-particles. To prevent spontaneous sedimentation of the magnetic particles in the solution, the magnetic-particle stirring arm stirs the magnetic particles immediately before dispensation of the reagent. After the stirring, the magnetic-particle stirring arm rises up to the area above the reagent bottle 3 and moves to an area above cleaning means 17 containing a cleaning liquid. The magnetic-particle stirring arm lowers into the cleaning liquid, and then the magnetic-particle stirring means is rotated to remove magnetic particles attached to the stirring means.

A predetermined reaction time after the sample and the predetermined reagent are dispensed, a reaction solution is formed. The reaction solution is sucked from the reaction container 14 by a reaction solution suction nozzle 18 and further fed to detection means 19. The detection means 19 analyzes the reaction solution.

Then, the analyzed reaction solution is moved to an area above the sample dispensing tip/reaction container disposal hole 12 by the sample dispensing tip/reaction container conveying means 8, and discharged into the sample dispensing tip/reaction container disposal hole 12 for disposal.

The series of operations of the device is controlled by a host computer 200 that is control means.

By combining or repeating the above-described operations, the automated analyzer can efficiently analyze a plurality of samples in terms of a plurality of analysis items.

First Embodiment

FIG. 2 is a perspective view illustrating appearance of the reagent disk 2 according to the present invention. To controllably keep the reagent bottle 3 at a constant temperature, the reagent disk 2 is covered, at an upper and a lower surfaces and an outer periphery of the disk 2, with a lid 20 and a jacket 21 having a heat insulating function.

The upper surface of the lid 20 includes a slidably openable and closable reagent bottle loading port lid 22 in the present embodiment. When the reagent bottle loading port lid 22 is opened as illustrated in FIG. 2, a reagent bottle loading port 23 is opened in the upper surface. The reagent bottle loading port lid 22 is provided with an interlock including an unillustrated solenoid or the like. Like the safety cover 4, the reagent bottle loading port lid 22 is locked and closed while the automated analyzer 1 is in operation, and is unlocked and can be opened and closed while the automated analyzer 1 is stopped.

In an area above the reagent bottle loading port 23, reagent bottle loading means 24 is provided. As described below in detail, the following operation can be performed: the operation in which, in conjunction with the user's manual operation via the operation handle, the reagent bottle 3 is moved along a reagent bottle loading path 27 illustrated in FIG. 5, from outside of the reagent disk 2 to a predetermined position inside the reagent disk 2 (hereinafter referred to as a reagent bottle loading slot 26 or simply a slot) for loading or the operation in which a partially empty reagent bottle 3 is taken out from the slot inside the reagent disk 2 to the outside of the reagent disk 2.

FIG. 3 is a diagram of appearance of the reagent disk 2 and the reagent bottle loading means 24, and corresponds to the perspective view illustrated in FIG. 2 from which the lid 20 has been removed. Additionally, reagent information read means 25 for reading information related to the reagent such as analysis time and analysis items are provided.

FIG. 4 is a plan view of the reagent disk 2 illustrated in FIG. 3, and FIG. 5 is an A-A cross-sectional view of the reagent disk 2. On an operation path for the reagent dispensing pipette 15 in the reagent disk 2, a reagent dispensing position 15a and a reagent stirring position 16a adjacent to the reagent dispensing position 15a are provided. This area of the reagent disk 2 may be referred to as a processing zone. Inside the reagent disk 2, partition plates 28 are provided so as to space the adjacent reagent bottles 3 from each other to form slots.

The reagent disk 2 includes a reagent disk driving unit 29 rotationally driving the reagent disk 2 to move the reagent bottle 3 to a desired position. An example of the reagent disk driving unit 29 is a configuration including a small pulley 29b provided on an output shaft of a motor 29a as illustrated in FIG. 5, a large pulley 29d provided on a reagent disk driving shaft 29c, and a belt 29e extended between the small pulley 29b and the large pulley 29d, the configuration reducing a rotation speed of the motor 29a to rotate the reagent disk 2 at low speed.

Now, a configuration of the reagent bottle loading means 24 according to the present embodiment will be described in detail with reference to FIG. 6A, FIG. 6B, FIG. 7A, FIG. 7B, and FIG. 8.

The reagent bottle loading means 24 includes a loading frame 35 including a first guide sleeve 31 supported so as to be movable in the up-down direction along a vertically fixed hollow cylindrical pillar 30, a hollow cylindrical second guide sleeve 32 configured integrally with the first guide sleeve 31 and extending orthogonally to and forward of the first guide sleeve 31, and a reagent bottle placing section 33 provided integrally with and on an underside of the first guide sleeve 31 and in which the reagent bottle 3 is placed.

A first guide pin hole 36 penetrating the first guide sleeve 31 in the lateral direction is formed near an upper end of the first guide sleeve 31. First guide grooves 37 extending in the up-down direction are open in a left and a right side surfaces of the pillar 30. The first guide pin 38 penetrates the first guide pin hole 36 and the first guide grooves 37. In other word, the first guide sleeve 31 is supported so as to be movable only in the up-down direction without rotating, with respect to the pillar 30.

In a case where a balance spring 39 that is a compression spring is provided inside an inner periphery of the pillar 30, and includes a lower end fixed to a part of the pillar 30 and an upper end applying an upward force to the first guide pin 38, then the balance spring 39 pushes the loading frame 35 upward and thus balances with the weight of the loading frame 35 to prevent falling, allowing the operator to easily move the reagent bottle loading means 24 in the up-down direction.

The reagent bottle placing section 33 includes a reagent bottle placing section bottom surface 33a on which a bottom surface of the reagent bottle 3 is placed, a reagent bottle placing section side surface 33b holding a side surface of the reagent bottle 3, a reagent bottle placing section back surface 33c holding a back surface of the reagent bottle 3. The reagent bottle 3 can be placed in the reagent bottle placing section 33.

A lower end of a cylindrical operation handle 34a gripped and operated for driving by the operator forms a handle sleeve 40 shaped like a hollow cylinder in the front-back direction. An inner periphery of the handle sleeve 40 is fitted around an outer periphery of the second guide sleeve 32 with an appropriate gap between the inner periphery and the outer periphery. The operation handle 34a can slide in the front-back direction and forth along the second guide sleeve 32, and is supported so as to be laterally pivotal around a center axis of the handle sleeve 40. A pair of guide protrusions 41 is provided on the inner periphery of the handle sleeve 40 such that the guide protrusions 41 are each located at an upper end and a lower end of the handle sleeve 40 to face the center axis. The second guide sleeve 32 is provided with grooves corresponding to the respective guide protrusions 41.

The grooves formed in the second guide sleeve 32 will be described. A pair of second guide grooves 42 is formed in the second guide sleeve 32 such that the guide grooves 42 are each located at an upper surface and a lower surface of the second guide sleeve 32 to extend in the front-back direction. The guide protrusions 41 are fitted into the second guide grooves 42 to integrate the handle sleeve 40 and the operation handle 34a. The operation handle 34a can then be located in an upright position (sometimes referred to as a neutral state) and moved in the front-back direction.

A pair of third guide grooves 43 is formed such that the third guide groves 43 are located parallel to the second guide grooves 42 around the center axis of the second guide sleeve 32. The guide protrusions 41 are fitted into the third guide grooves 43 to integrate the handle sleeve 40 and the operation handle 34a together with the operation handle 34a inclined leftward (this position is sometimes referred to as a reagent bottle unloading position 34a1), and the operation handle 34a can then be moved in the front-back direction.

A first pivotal guide groove 44 is formed at front ends of the second guide grooves 42 such that the second guide grooves 42 are in communication with the third guide grooves 43 via the first pivotal guide groove 44. The guide protrusions 41 are fitted into the first pivotal guide groove 44, thus the operation handle 34a integrated with the handle sleeve 40 can be pivoted between the upright position and a leftward inclined state 34a1.

A second pivotal guide groove 45 is formed at back ends of the third guide grooves 43 such that the second guide grooves 42 are in communication with the third guide grooves 43 via the second pivotal guide groove 45. The second pivotal guide groove 45 allows the operation handle 34a to be pivoted between the leftward inclined state 34a1 and the upright position. The second pivotal guide groove 45 further extends opposite to the third guide grooves 43 with respect to the second guide grooves 42 to allow the handle sleeve 40 and the operation handle 34a to be pivoted from the upright position to a rightward inclined state (sometimes referred to as a lock position 34a2).

The first pivotal guide groove 44, the second pivotal guide groove 45, and the third guide grooves 43 are bottomed grooves that do not penetrate the second guide sleeve 32 down to the inner periphery. On the other hand, the second guide grooves 42 penetrate the second guide sleeve 32 in a diametric direction. The second guide grooves 42 extend to a side closer to the first guide sleeve 31 than the second pivotal guide groove 45 to form through-guide-grooves 46.

A reagent bottle push-out section 47 is provided along an upper surface of the reagent bottle placing section 33 and the second guide sleeve 32 so as to be slidable in the front-back direction.

An upper end of the reagent bottle push-out section 47 forms a third guide sleeve 48 shaped like a cylinder and divided in two pieces in the front-back direction. An inner periphery of the third guide sleeve 48 is fitted around an outer periphery of the second guide sleeve 32 with an appropriate gap between the inner periphery and the outer periphery and the third guide sleeve 48 is supported to be movable in the front-back direction. In a case where the handle sleeve 40 is fitted into a gap between the two divisional pieces of the third guide sleeve 48 with an appropriate gap between the handle sleeve 40 and each of the pieces, and the operation handle 34a and the handle sleeve 40 are moved in the front-back direction, the reagent bottle push-out section 47 can move in the front-back direction via the third guide sleeve 48 along with the operation handle 34a.

A reagent bottle push-out surface 49 is provided on a front surface side of the reagent bottle push-out section 47. When the operation handle 34a is located in a backmost position, the reagent bottle push-out surface 49 is substantially flush with the reagent bottle placing section back surface 33c, and in this state, the reagent bottle 3 can be loaded into the reagent bottle placing section 33.

In a case where the operation handle 34a is moved forward with the reagent bottle 3 loaded in the reagent bottle placing section 33, the reagent bottle push-out surface 49 moves forward along with the operation handle 34a to push out the reagent bottle 3 forward.

A cylindrical guide rod 50 is provided in an inner periphery of the second guide sleeve 32 so as to be movable in the front-back direction. Second guide pin holes 51a and 51b are formed near a back end of the third guide sleeve 48 and near a front end of the guide rod 50 so as to respectively penetrate the third guide sleeve 48 and the guide rod 50 in the up-down direction. A second guide pin 52 is provided so as to penetrate the second guide pin hole 51a, the second guide grooves 42, and the second guide pin hole 51b. A diameter of the second guide pin 52 is slightly smaller than a width of each of the second guide grooves 42. The second guide pin 52 can be slidably fitted into the second guide grooves 42 and the through-guide-grooves 46.

In other word, moving the operation handle 34a in the front-back direction moves the reagent bottle push-out section 47 and the guide rod 50 in the front-back direction along with the operation handle 34a via the third guide sleeve 48.

A lock pin 53 extending backward is provided integrally with and parallel to the handle sleeve 40 and in proximity to the operation handle 34a. The lock pin 53 pivots around the center axis of the handle sleeve 40 in synchronism with a lateral pivoting operation of the operation handle 34a.

A lock pin clearance groove 54 is formed in a surface of the loading frame 35 opposite to the lock pin 53 to prevent pivoting of the lock pin 53 from being impeded. A lock pin groove 55 is formed near an upper end of the pillar 30. The loading frame 35 is raised to a predetermined height with the operation handle 34a held at a position resulting from backward movement, and the operation handle 34a is pivoted rightward into the lock position, where the lock pin 53 is fitted into the lock pin groove 55. Accordingly, the loading frame 35 can be locked at a raised position and held and prevented from lowering. At this time, in a case where the reagent bottle placing section bottom surface 33*a* is positioned higher than the reagent bottle loading port 23 as illustrated in FIG. 5, an easy-to-use automated analyzer can be provided that facilitates the operator's operation of installing or unloading the reagent bottle 3 in or from the reagent bottle placing section 33.

Here, the reagent bottle loading path 27 will be described that is a trajectory of the reagent bottle 3 when the reagent bottle loading means 24 is used to load the reagent bottle 3 into the reagent disk 2. As illustrated in FIG. 5, first, the operation handle 34*a* is moved to the backmost position and upward, and the loading frame 35 is locked in the raised position. In this state, the loading frame 35 is lowered vertically into the reagent disk 2. Then, at the maximally lowered position, a traveling direction is changed to a forward direction toward the outer periphery of the reagent disk 2. The loading frame 35 is moved until the reagent bottle 3 is inserted into the reagent bottle loading slot 26 formed in the outer periphery of the reagent disk 2. Thus, the trajectory is shaped generally like the letter L.

In other word, to achieve the generally L-shaped trajectory, the device is to be configured such that movement in the up-down direction is enabled only when the operation handle 34*a* is located in the backmost position, whereas movement in the front-back direction is enabled only when the operation handle 34*a* is located in a lowermost position. By way of example of such a configuration, a first barring groove 56 is formed near a lower end of the pillar 30 by cutting out a portion of the pillar 30 in a cylindrical form in the front-back direction, the portion being located near a lower end of the pillar 30 and on a left side of the pillar close to the guide rod 50. A cylindrical outer periphery of the guide rod 50 is fitted in the first barring groove 56 with an appropriate gap between the guide rod 50 and the first barring groove 56, and the guide rod 50 is slidable along the first barring groove 56 in the front-back direction. In other word, the reagent bottle loading means 24 can slide in the front-back direction only in a position where the loading frame 35 is located in the lowermost position and where the first barring groove 56 is fitted over an outer periphery of the guide rod 50.

A second barring groove 57 is formed near a front end of the guide rod 50 by cutting out a portion of the guide rod 50 in a cylindrical form in the up-down direction, the portion being located on a right side of the guide rod 50 close to the pillar 30. A cylindrical outer periphery of the pillar 30 is fitted into the second barring groove 57 with an appropriate gap between the pillar 30 and the second barring groove 57, and the second barring groove 57 is slidable in the up-down direction along the pillar 30. In other word, the reagent bottle loading means 24 can slide in the up-down direction only in a position where the operation handle 34*a* is located in the backmost position and where the second barring groove 57 is fitted over the outer periphery of the pillar 30.

In other word, formation of the first barring groove 56 and the second barring groove 57 enables the desired operation to be achieved in which movement in the up-down direction is enabled only when the operation handle 34*a* is located in the backmost position, whereas movement in the front-back direction is enabled only when the operation handle 34*a* is located in the lowermost position, thus operating the reagent bottle loading means 24 along the generally L-shaped trajectory, thus a desirable operation can be achieved with the configuration.

The reagent bottle 3 includes: a bottle portion 60 in which a plurality of reagent containers 59 are arranged in line in the front-back direction, each of the reagent containers 59 containing a reagent sealed in the reagent containers 59 and including, in an upper surface, a bottle opening 58 that is an opening; and caps 62 supported, in an openable and closable manner, around hinges 61 provided so as to correspond to the respective bottle openings 58, the caps 62 being lids allowing the respective bottle openings 58 to be opened and closed.

A part of the reagent bottle 3 may be provided with an information recording medium, for example, an RFID (Radio Frequency IDentification) tag or a bar code label describing information related to the reagent, such as analysis time and analysis items. The described information can be read via the reagent information read means 25 provided outside the reagent disk 2.

Now, reagent bottle pull-out means 63*a* will be described that acts, after the reagent bottle 3 loaded into the reagent disk 2 is emptied, to pull out the empty reagent bottle 3.

The reagent bottle pull-out means 63*a* is supported so as to be pivotal around a rotation support shaft 64*a* fitted into a rotation support hole 119 formed in the front-back direction between the reagent bottle push-out section 47 and the third guide sleeve 48. A reagent bottle pull-out protrusion 65*a* protruding in a direction closer to the reagent bottle 3 is provided on an underside of the rotation support shaft 64*a*, and an operation plate 66 protruding in a direction away from the rotation support shaft 64*a* is provided on an upper side of the rotation support shaft 64*a*. The operation plate 66 includes a tip inclined in a direction closer to the reagent bottle push-out section 47.

The rotation support shaft 64*a* is provided with a torsion spring 68 applying to the reagent bottle pull-out means 63*a* a torque in a counterclockwise as illustrated, that is, in a direction to cause the reagent bottle pull-out protrusion 65*a* to pivot away from the reagent bottle 3.

The handle sleeve 40 is provided with an operation protrusion 67 interacting with the operation plate 66. In a case where the operation handle 34*a* is in the neutral position or the rightward inclined lock position as illustrated in FIG. 7A, the operation protrusion 67 does not act on the operation plate 66, and the pivoting torque from the torsion spring 68 keeps the reagent bottle pull-out protrusion 65*a* in a position away from the reagent bottle 3. In other word, in this state, moving the operation handle 34*a* forward allows the reagent bottle 3 to be pushed forward via the reagent bottle push-out surface 49, but even moving the operation handle 34*a* from front to back fails to pull out the reagent bottle 3 backward from the slot, with only the reagent bottle push-out section 47 moving backward.

On the other hand, in a case where the operation handle 34*a* is tilted leftward into the reagent bottle unloading position 34*a*1 and the guide protrusion 41 is fitted into the third guide groove 43 as illustrated in FIG. 7B, the operation protrusion 67 acts on the operation plate 66, which pivots around the rotation support shaft 64*a*, causing the reagent bottle pull-out protrusion 65*a* to be inserted between the hinge 61 of the reagent bottle 3 and the bottle opening 58. In this state, moving the operation handle 34*a* backward allows the reagent bottle pull-out protrusion 65*a* to pull the reagent bottle 3 backward. Here, moving the operation handle 34*a* backward allows the reagent bottle 3 loaded in the slot of the reagent disk 2 to be pulled out toward the inner periphery of the reagent disk 2, thus the reagent bottle pull-out protrusion 65*a* acts as reagent bottle gripping means.

A lower side of the reagent bottle push-out surface 49 is provided with a direction determination lever 69 determining an orientation of the reagent bottle 3 to prevent the reagent bottle 3 from being inserted in the reverse orientation in the front-back direction, and a torsion spring 70 applying a predetermined torque to the direction determining lever 69. The direction determination lever 69 and the torsion spring 70 will be described below in detail.

The reagent bottle placing section side surface 33b is provided with a reagent bottle detecting arm 73 supported so as to be pivotal around a double-loading preventing arm 72 provided in the up-down direction; a bias force acting in a predetermined rotating direction is applied to the reagent bottle detecting arm 73 by a torsion spring 75. The reagent bottle detecting arm 73 pivots in conjunction with a double-loading preventing arm 74 disposed on a lower surface of the reagent bottle placing section bottom surface 33a. The double-loading preventing arm 74 constitutes double-loading preventing means 71 preventing duplicate mounting of a reagent bottle 3 in a slot in the reagent disk 2 that is not empty and that contains another reagent bottle. The detail of the double-loading preventing arm 74 will be described below.

Now, an installation process and an unloading process will be described; the installation process includes installing the reagent bottle 3 in the reagent disk 2 using the reagent bottle loading means 24 according to the present embodiment, and the unloading process includes unloading the empty reagent bottle 3 from the reagent disk 2.

Figure 17:
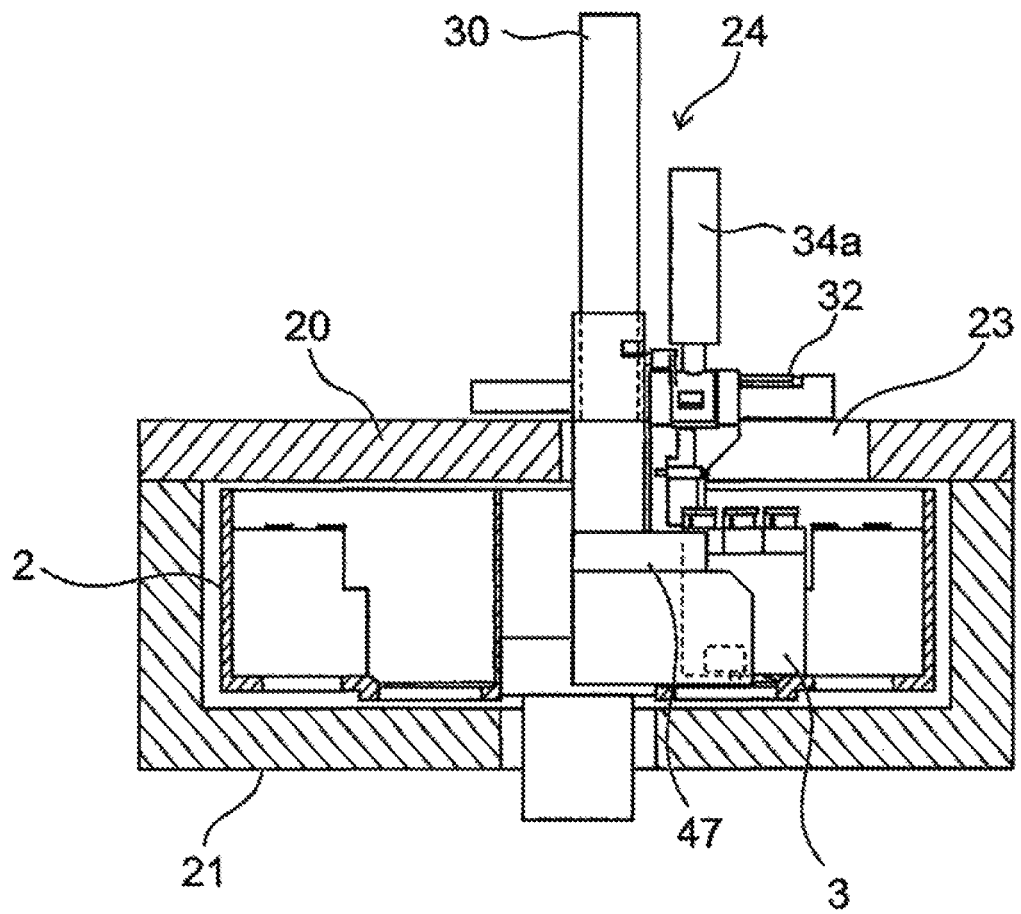
FIG. 17 is a cross-sectional view illustrating the third state and the seventh state of the automated analyzer according to the first embodiment of the present invention.
Figure 18:
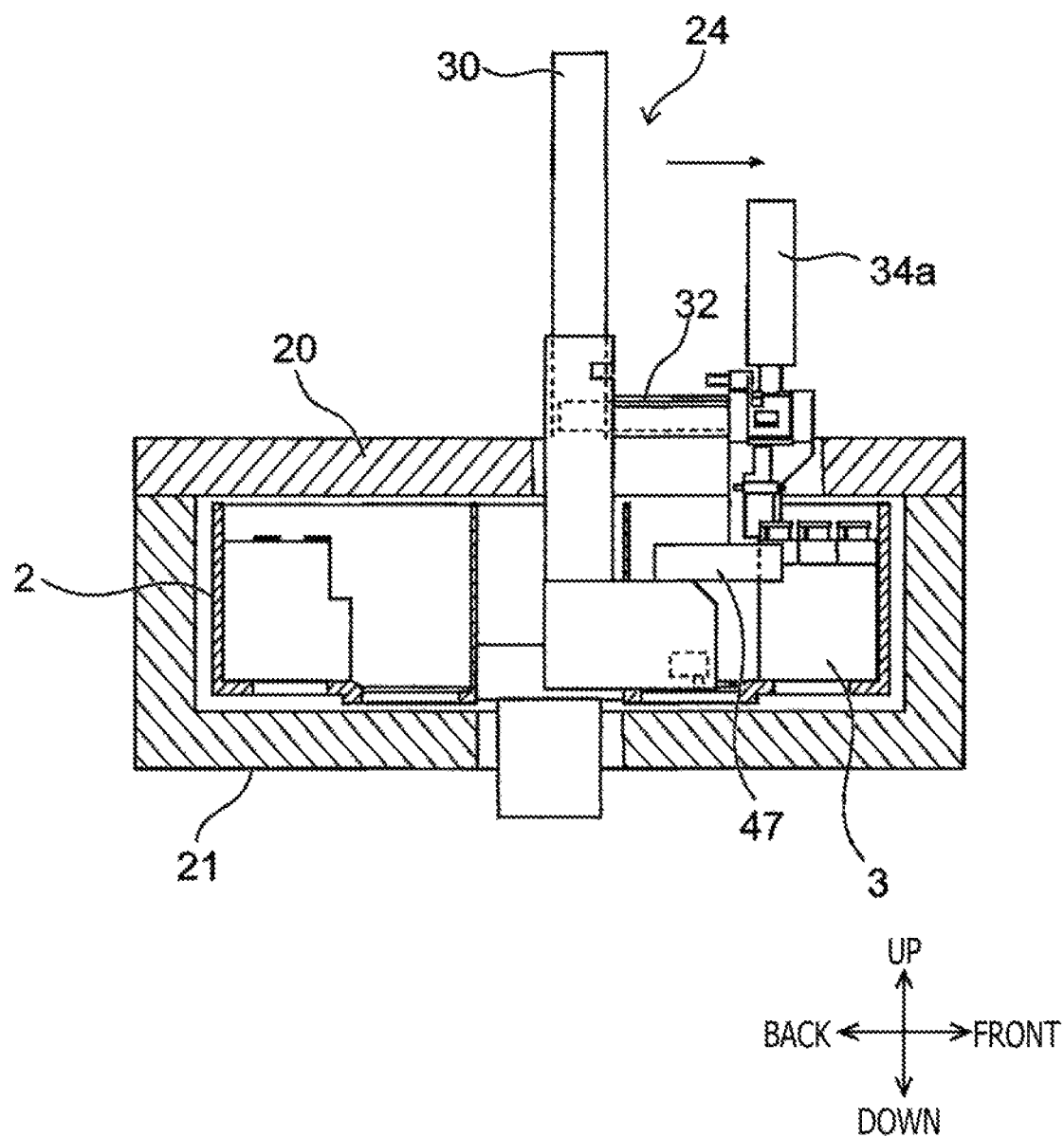
FIG. 18 is a cross-sectional view illustrating the fourth state and the sixth state of the automated analyzer according to the first embodiment of the present invention.
Figure 19:
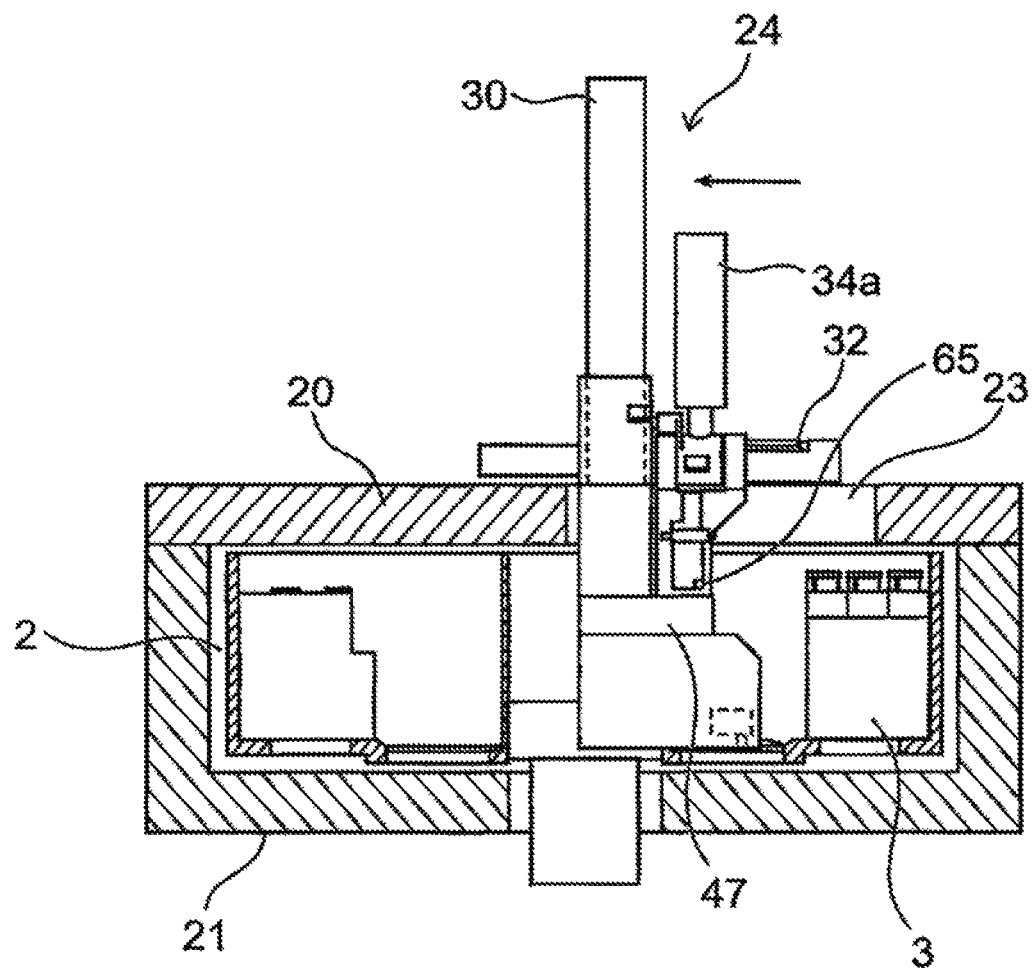
FIG. 19 is a cross-sectional view illustrating the fifth state of the automated analyzer according to the first embodiment of the present invention.
Figure 19:
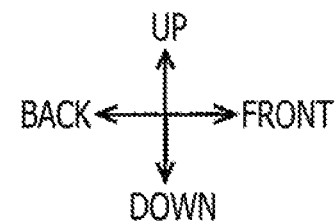

First, the state of the reagent bottle loading means 24 according to the present embodiment is assumed to be expressed as follows using perspective views in FIGS. 9 to 16 and cross-sectional views in FIGS. 17 to 19. Note that, in the cross-sectional views in FIGS. 17 to 19, the operation handle 34a is described as including the inclined state as well as the upright state.

1. First state (FIG. 9): The reagent bottle loading means 24 is in the upper end position, and the operation handle 34a is located in the backmost position and inclined rightward. The lock pin 53 is fitted in the lock pin groove 55 to lock the reagent bottle loading means 24 at the upper end thereof. Furthermore, the reagent bottle loading port lid 22 is closed.

2. Second state (FIG. 10): The reagent bottle loading means 24 is in the upper end position, but the operation handle 34a is in the backmost and neutral position. The lock pin 53 is off from the lock pin groove 55 to cancel the locking of the reagent bottle loading means 24 at the upper end thereof. The reagent bottle 3 is placed in the reagent bottle placing section 33, and the reagent bottle loading port lid 22 is open, and the reagent bottle loading port 23 is thus open.

3. Third state (FIG. 11 and FIG. 17): The reagent bottle loading means 24 has been lowered to the lowermost position, and the operation handle 34a is in the backmost and upright position. During the second state and the third state, the second barring groove 57 is fitted over the outer periphery of the pillar 30, allowing the operation handle 34a to move in the up-down direction, while preventing the operation handle 34a from moving in the front-back direction.

4. Fourth state (FIG. 12 and FIG. 18): The reagent bottle loading means 24 has been lowered to the lowermost position, and the operation handle 34a is in the foremost and upright position. The reagent bottle 3 is in a loaded position along the outer periphery of the reagent disk 2; the reagent bottle 3 has been moved forward along with the operation handle 34a by the reagent bottle push-out section 47 and inserted into the reagent bottle loading slot 26 in the reagent disk 2.

5. Fifth state (FIG. 13 and FIG. 19): The reagent bottle loading means 24 has been lowered to the lowermost position, and the operation handle 34a is in the backmost and upright position. The reagent bottle 3 is loaded in the loaded position where the reagent bottle 3 has been inserted into the reagent bottle loading slot 26, and the reagent bottle loading means 24 is empty. During the third state and the fourth state, and further the fifth state, the first barring groove 56 is fitted over the outer periphery of the guide rod 50, allowing the operation handle 34a to move in the front-back direction, while preventing the operation handle 34a from moving in the up-down direction.

6. Sixth state (FIG. 14 and FIG. 18): The reagent bottle loading means 24 is in the upper end position as in a loaded state, and the operation handle 34a is in the backmost and upright position. The reagent bottle 3 is loaded in the reagent bottle loading slot 26 along the outer periphery of the reagent disk 2, and the reagent bottle loading means 24 is empty.

7. Seventh state (FIG. 15 and FIG. 17): The reagent bottle loading means 24 has been lowered to the lowermost position, and the operation handle 34a is in the foremost position and is inclined leftward. The reagent bottle pull-out means 63a acts on the reagent bottle 3 via the operation protrusion 67.

8. Eighth state (FIG. 16): The reagent bottle loading means 24 has been lowered to the lowermost position, the operation handle 34a is inclined leftward, and the reagent bottle pull-out means 63a has been moved to the backmost position while acting on the reagent bottle 3. The reagent bottle 3 has been pulled out from the reagent bottle loading slot 26 by the action of the reagent bottle pull-out means 63a, moved backward along with the operation handle 34a, and placed in the reagent bottle placing section 33.

Now, a series of operations will be described in which the reagent bottle loading means 24 according to the present embodiment is used to load the reagent bottle 3 into an empty slot in the reagent disk 2.

While the automated analyzer 1 is being driven and an operation is being performed that includes dispensing a reagent using the reagent bottle 3 in the reagent disk 2 and analyzing a sample, the reagent bottle loading means 24 is in the first state.

When the reagent disk 2 includes an empty slot in which no reagent bottle 3 is loaded and a new reagent bottle 3 is to be loaded into the empty slot, first, the automated analyzer 1 is stopped to cancel the interlock, and the safety cover 4 is opened. Then, the reagent bottle loading port lid 22 is opened. The new reagent bottle 3 is placed in the reagent bottle placing section 33, and the operation handle 34a is placed in the upright position. The second state is thus established.

In the second state, the operation handle 34a is moved downward to lower the reagent bottle loading means 24 in which the reagent bottle 3 is loaded. The third state is thus established.

In the third state, the operation handle 34a is pulled forward to move the reagent bottle push-out section 47 forward to insert the reagent bottle 3 into the empty slot. The reagent bottle 3 is pushed to a predetermined position along an inner side of the outer periphery of the reagent disk 2. The fourth state is thus established. The reagent bottle 3 is moved to the predetermined position in accordance with the driving operation of the operation handle 34a, and thus, the position of the reagent bottle 3 is prevented from varying when the loading is completed, allowing the reagent bottle 3 to be accurately loaded.

In the fourth state, the operation handle 34a is pushed backward to move the reagent bottle push-out section 47 backward. The reagent bottle 3 remains in the predetermined position in the reagent disk 2. The fifth state is thus established.

In the fifth state, the operation handle 34a is moved upward to move the reagent bottle push-out section 47 upward. The sixth state is thus established.

Subsequently, the operation handle 34a is tilted rightward to fit the lock pin 53 into the lock pin groove 55 to lock the reagent bottle loading means 24 at the upper end thereof, and the reagent bottle loading port lid 22 is further closed. Then, the first state is recovered. The safety cover 4 is closed to allow the automated analyzer 1 to be driven.

Now, a series of operations will be described in which the reagent bottle loading means 24 according to the present embodiment is used to take out an empty reagent bottle 3 from inside the reagent disk 2.

While the automated analyzer 1 is being driven and an operation is being performed that includes dispensing a reagent using the reagent bottle 3 in the reagent disk 2 and analyzing a sample, the reagent bottle loading means 24 is in the first state.

When the empty reagent bottle 3 is taken out from inside the reagent disk 2, first, the automated analyzer 1 is stopped to cancel the interlock and the safety cover 4 is opened. Then, the reagent bottle loading port lid 22 is opened. With the reagent bottle placing section 33 remaining empty, the operation handle 34a is placed in the upright position to establish the sixth state.

In the sixth state, the operation handle 34a is moved downward to lower the reagent bottle loading means 24 to establish the fifth state.

In the fifth state, the operation handle 34a is pulled forward to move the reagent bottle push-out section 47 forward to bring the reagent bottle push-out surface 49 into contact with the reagent bottle 3. The fourth state is thus established.

In the fourth state, the operation handle 34a is tilted leftward into the reagent bottle unloading position 34a1 to cause the reagent bottle pull-out means 63a to act. The seventh state is thus established.

In the seventh state, the operation handle 34a is moved backward while remaining inclined leftward. The empty reagent bottle 3 is pulled out backward from the slot in the reagent disk 2 by the action of the reagent bottle pull-out means 63a and placed in the reagent bottle placing section 33. The eighth state is thus established.

In the eighth state, the operation handle 34a is set back into the neutral position to establish the third state.

In the third state, the operation handle 34a is moved upward to move the reagent bottle push-out section 47 upward to establish the second state.

In the second state, the operation handle 34a is tilted rightward to fit the lock pin 53 into the lock pin groove 55 to lock the reagent bottle loading means 24 at the upper end thereof. The operator takes out the empty reagent bottle 3 and closes the reagent bottle loading port lid 22. Then, the first state is recovered, and the unloading operation is completed.

After the empty reagent bottle 3 is unloaded, a new reagent bottle 3 is placed in position. The reagent bottle loading operation is continuously performed to allow the reagent bottle 3 to be replaced.

Now, operating directions of and operation timings for the components during the operations of loading and unloading the reagent bottle 3 will be described in brief using a time chart in FIG. 20.

A left half (A) of the time chart illustrates a loading process of finally loading the reagent bottle 3 into the reagent disk 2, and a right half (B) of the time chart illustrates an unloading process of unloading the empty reagent bottle 3 from the reagent disk 2.

Circled numbers 1 to 8 indicate the above-described states of the reagent bottle loading means 24 and correspond to the first to eight states.

(a) indicates the lateral tilting operation of the operation handle 34a. Rightward tilting locks the reagent bottle loading means 24 between the operation handle 34a and the pillar 30, and leftward tilting acts on the reagent bottle pull-out means 63a.

(b) indicates the up-down movement of the operation handle 34a.

(c) indicates the front-back movement of the operation handle 34a.

(d) indicates the up-down movement of the reagent bottle placing section 33. Since the reagent bottle placing section 33 moves up and down along with the operation handle 34a, the up-down movement of the reagent bottle placing section 33 is identical to the up-down movement of the operation handle 34a in (b).

(e) indicates the front-back movement of the reagent bottle placing section 33. Since the reagent bottle placing section 33 moves back and forth along with the operation handle 34a, the front-back movement of the reagent bottle placing section 33 is identical to the front-back movement of the operation handle 34a in (c).

(f) indicates the operation of the reagent bottle pull-out means 63a. While the reagent bottle pull-out means 63a is acting on the reagent bottle 3, the empty reagent bottle 3 can be pulled out from the slot in the reagent disk 2 when the reagent bottle placing section 33 moves backward.

When the reagent bottle 3 is loaded, first, the first state where the operation handle 34a is inclined rightward is changed to the second state where the operation handle 34a is upright, and the operation handle 34a is further lowered to establish the third state. Then, the operation handle 34a is moved forward to establish the fourth state. The reagent bottle 3 is then inserted and loaded into an empty slot in the reagent disk 2.

Subsequently, the operation handle 34a is moved backward to establish the fifth state and further moved upward to establish the sixth state, and the operation handle 34a is tilted rightward from the upright position to lock the reagent bottle loading means 24 in the uppermost end position. The first state is thus established again.

To unload the reagent bottle 3, first, the first state where the operation handle 34a is inclined rightward is changed to the sixth state where the operation handle 34a is in the upright position, and the operation handle 34a is further lowered to establish the fifth state. Then, the operation handle 34a is moved forward to establish the fourth state, and further tilted leftward to establish the seventh state. The reagent bottle pull-out means 63a then acts on the reagent bottle 3. The operation handle 34a is subsequently moved backward to pull out the reagent bottle 3 from the slot in the reagent disk 2. The eighth state is thus established. The operation handle 34a is set back into the upright position to establish the third state and further moved upward to establish the second state. The operation handle 34a is then tilted rightward from the upright position to lock the reagent bottle loading means 24 in the uppermost end position. The first state is thus recovered.

<Reverse Insertion Prevention>

Now, using FIGS. 21A to 21D and FIGS. 22A and 22B, a reverse insertion preventing means 76 will be described that includes the direction determination lever 69 that acts when the reagent bottle 3 is loaded into the reagent bottle placing section 33, by allowing the reagent bottle 3 to be loaded in a case of the regular orientation, while preventing the reagent bottle 3 from being loaded when the operator erroneously attempts to load the reagent bottle 3 in the reverse orientation, to make the operator recognize that the reagent bottle 3 is reversely oriented. Note that, in the present embodiment, the regular direction corresponds to insertion of the reagent bottle 3 in a direction in which the hinge 61 of the cap 62 approaches the reagent bottle placing section back surface 33c.

Figure 21A:
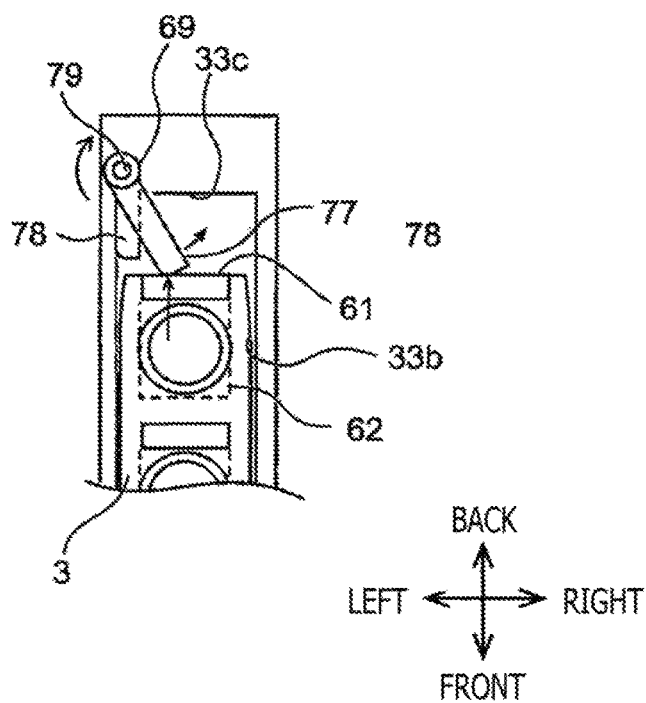
FIG. 21A is an explanatory diagram illustrating a configuration of reagent bottle reverse-insertion preventing means of the automated analyzer according to the first embodiment of the present invention.
Figure 21B:
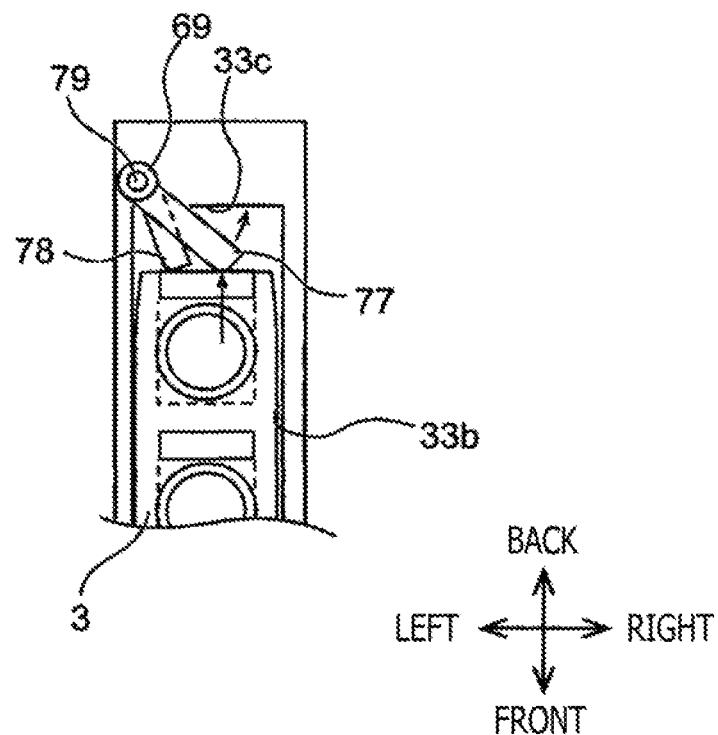
FIG. 21B is an explanatory diagram illustrating the configuration of the reagent bottle reverse-insertion preventing means of the automated analyzer according to the first embodiment of the present invention.
Figure 21C:
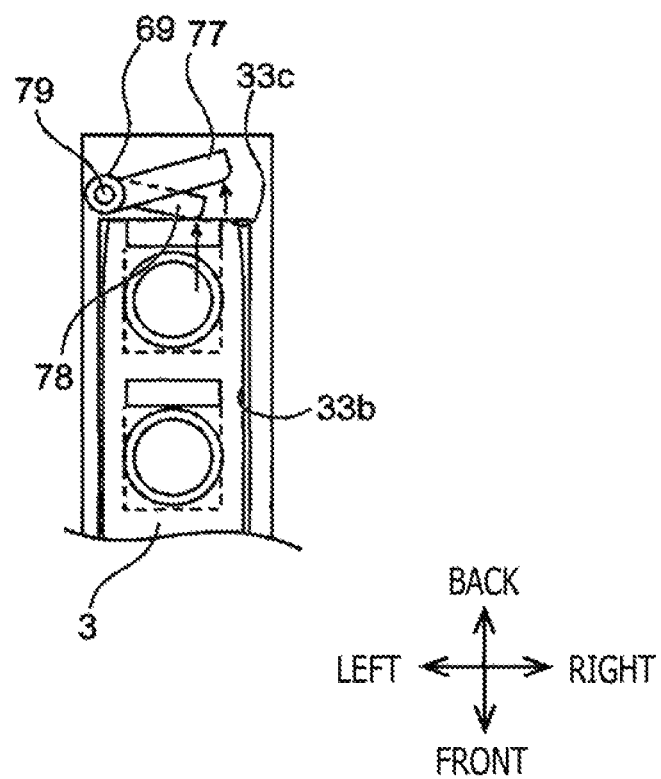
FIG. 21C is an explanatory diagram illustrating the configuration of the reagent bottle reverse-insertion preventing means of the automated analyzer according to the first embodiment of the present invention.
Figure 21D:
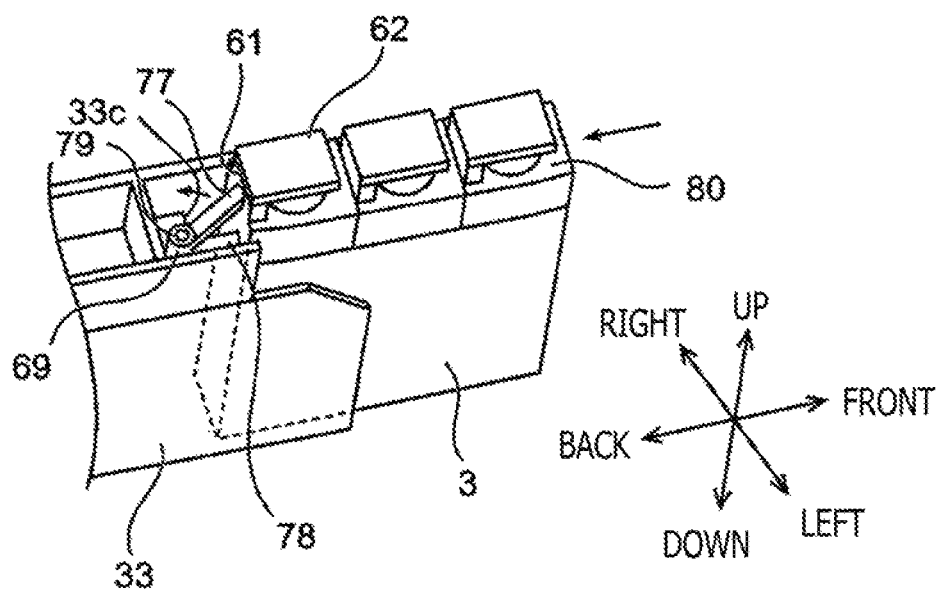
FIG. 21D is an explanatory diagram illustrating the configuration of the reagent bottle reverse-insertion preventing means of the automated analyzer according to the first embodiment of the present invention.

FIGS. 21A to 21D are diagrams illustrating operations performed when the reagent bottle 3 is loaded into the reagent bottle placing section 33 in the regular orientation. FIGS. 21A to 21C are plan views, and FIG. 21D is a perspective view.

Figure 22A:
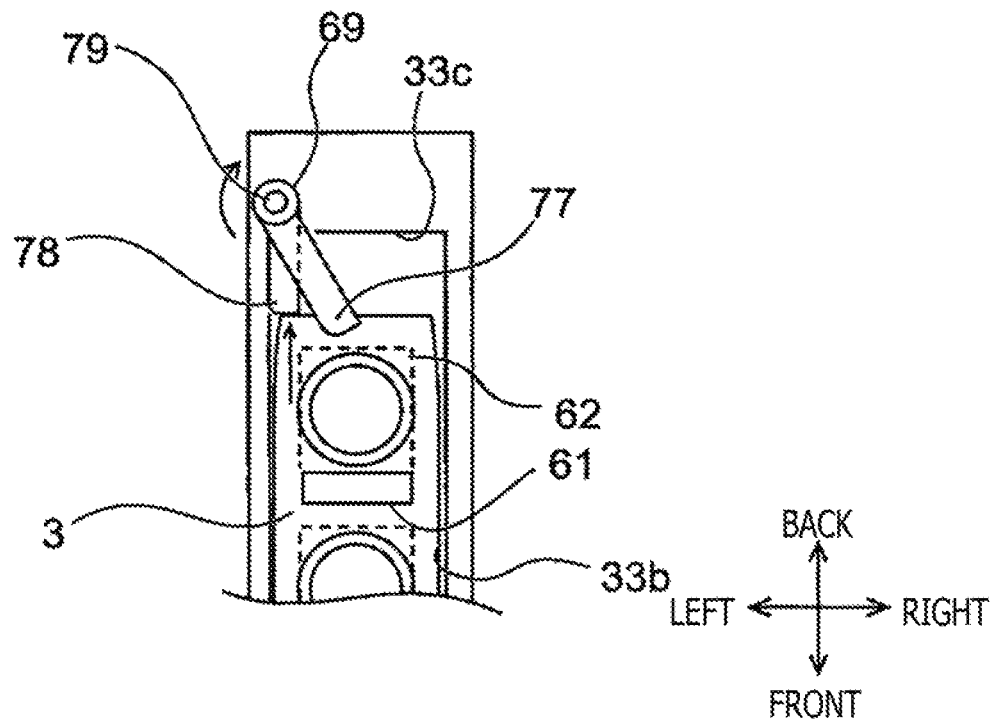
FIG. 22A is an explanatory diagram illustrating the configuration of the reagent bottle reverse-insertion preventing means of the automated analyzer according to the first embodiment of the present invention.
Figure 22B:
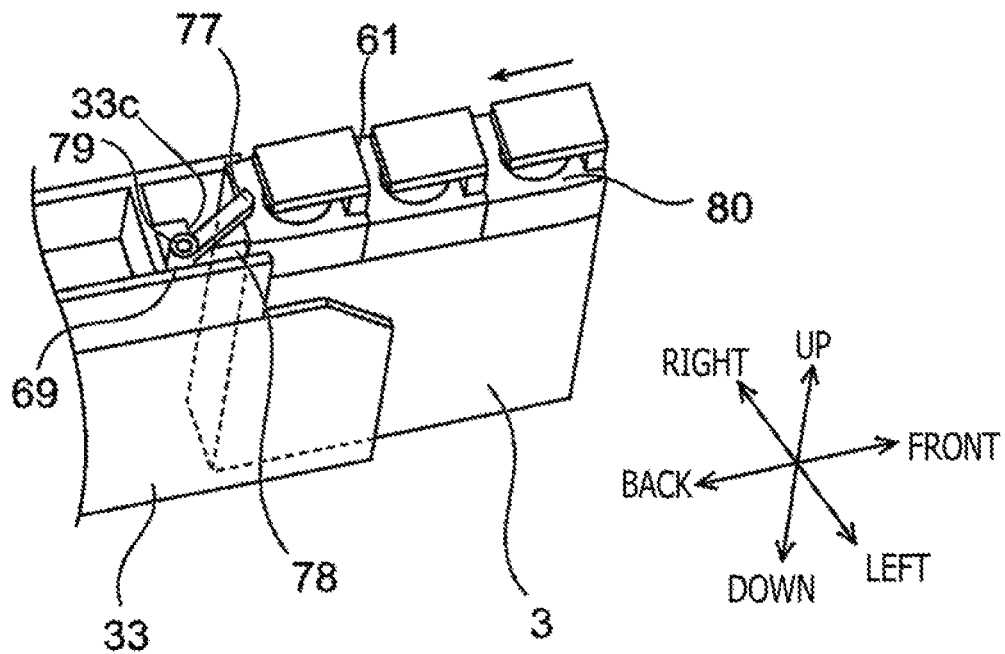
FIG. 22B is an explanatory diagram illustrating the configuration of the reagent bottle reverse-insertion preventing means of the automated analyzer according to the first embodiment of the present invention.

FIG. 22A and FIG. 22B are diagrams illustrating operations performed when the reagent bottle 3 is loaded into the reagent bottle placing section 33 in the reverse orientation. FIG. 22A is a plan view, and FIG. 22B is a perspective view.

The direction determination lever 69 acts as reagent container reverse-insertion inhibiting means for inhibiting insertion of the reagent container when an attempt is made to load the reagent bottle in the reverse orientation. The direction determination lever 69 is supported so as to be pivotal around a rotation support shaft 79 and includes a hinge detecting protrusion 77 that is a first protrusion and a stopper protrusion 78 that is a second protrusion; a bias force acting in the directions of arrows is applied to the direction determination lever 69 by a rotational torque from the torsion spring 70.

The stopper protrusion 78 is disposed along the reagent bottle placing section side surface 33b so as to come into abutting contact with the vicinity of a left side surface of the reagent bottle 3 below a bottle portion upper surface 80.

The hinge detecting protrusion 77 is disposed so as to come into abutting contact with the vicinity of the hinge 61 above the bottle portion upper surface 80 of the reagent bottle 3. The hinge detecting protrusion 77 is longer than the stopper protrusion 78 and is inclined from the stopper protrusion 78 to extend so as to face the vicinity of center of the reagent bottle 3 in the lateral direction.

In FIGS. 21A to 21D, in a case where an attempt is made to load the reagent bottle 3 in the regular orientation, first, a portion of a back surface of the reagent bottle 3 close to the hinge 61 comes into contact with the hinge detecting protrusion 77. This contact point is located rightward of the rotation support shaft 79, leading to exertion of a reaction force acting to rotate the direction determination lever 69 counterclockwise around the rotation support shaft 79. The direction determination lever 69 pivots as illustrated in FIG. 21B. In a case where the direction determination lever 69 continuously pivots by being pushed by the reagent bottle 3, a tip of the stopper protrusion 78, which has a short length, comes into abutting contact with the back surface of the reagent bottle 3. The direction determination lever 69 subsequently further pivots to a position illustrated in FIG. 21C where the back surface of the reagent bottle 3 comes into abutting contact with the reagent bottle placing section back surface 33c to correctly load the reagent bottle 3 in the reagent bottle placing section 33.

On the other hand, as illustrated in FIG. 22A and FIG. 22B, in a case where an attempt is made to load the reagent bottle 3 in the reverse orientation in the front-back direction, that is, in the orientation where the hinge 61 face forward, the hinge detecting protrusion 77 fails to come into abutting contact with the portion of the reagent bottle 3 close to the hinge 61, thus preventing the direction determination lever 69 from pivoting. The stopper protrusion 78 comes into substantially vertical abutting contact with the back surface of the reagent bottle 3 to serve as what is called a prop to prevent the reagent bottle 3 from moving further backward. The operator is prevented from pushing the reagent bottle 3 fully backward and thus notices that the reagent bottle 3 is in the reverse orientation.

Provision of the reverse-insertion preventing means 76 described above easily allows, using the simple configuration, the operator to recognize whether the reagent bottle 3 is correctly oriented or not. Thus, an easy-to-use reliable automated analyzer can be provided that prevents the reagent bottle 3 from being loaded in the reverse orientation.

With reference to FIG. 23A, FIG. 23B, FIG. 24A, and FIG. 24B, a configuration of the double-loading preventing means 71 will be described that is intended to prevent duplicate loading of a reagent bottle 3 into a slot where another reagent bottle 3 has already been loaded (this may be referred to as double loading).

An operation of feeding a reagent bottle 3 is performed when any of the reagent bottles 3 loaded in the reagent disk 2 is emptied and a new reagent bottle 3 is to be fed into the empty slot from which the empty reagent bottle 3 has been removed or a new reagent bottle 3 is to be fed into an originally free slot.

Here, in a case where a reagent bottle 3 is actually present in a slot in the reagent disk 2 that has determined to be empty, the bottom surface of the reagent bottle 3 to be newly loaded comes into abutting contact with the upper surface of the already loaded reagent bottle 3. The reagent bottle 3 to be newly loaded may thus be pushed up and come off the slot and fall into the reagent disk 2. An example of the configuration of the double-loading preventing means 71 for avoiding such a situation will be described.

Figure 23A:
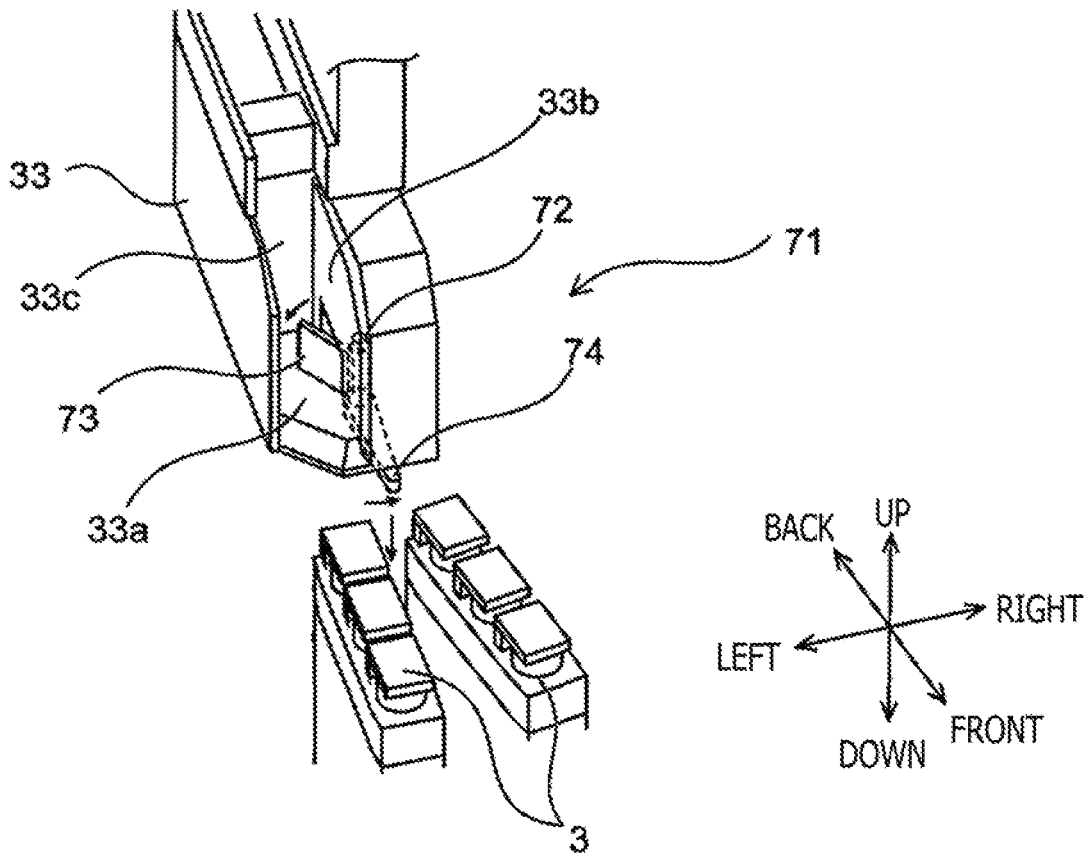
FIG. 23A is an explanatory diagram illustrating a configuration of reagent bottle double-loading preventing means of the automated analyzer according to the first embodiment of the present invention.
Figure 23B:
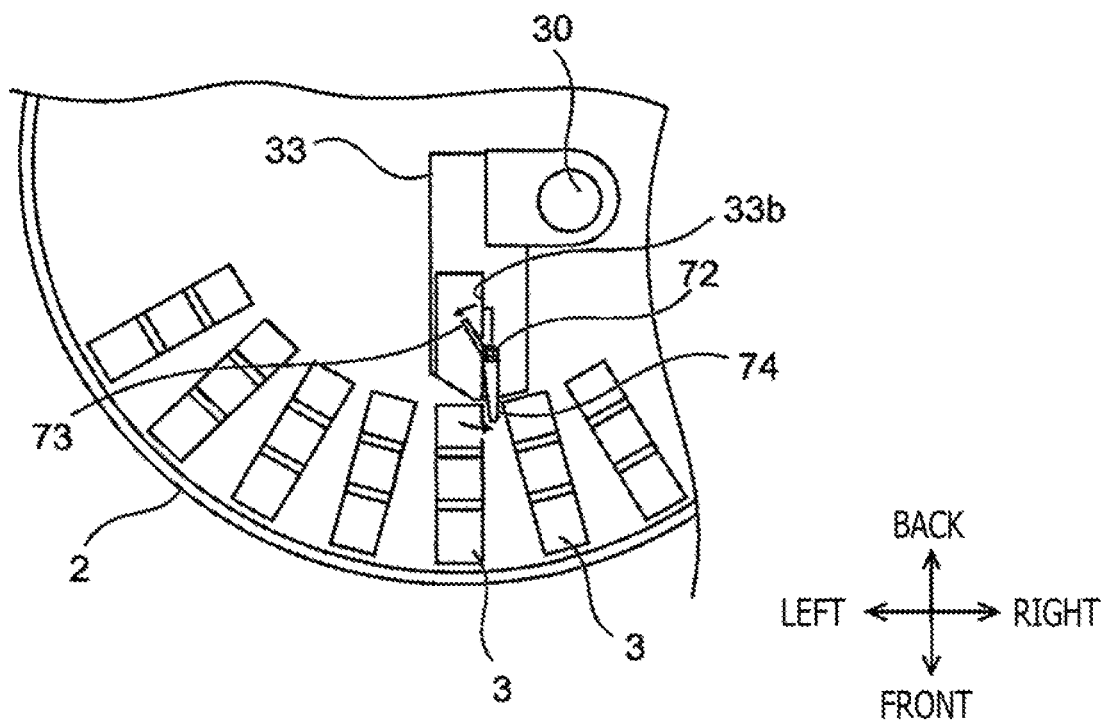
FIG. 23B is an explanatory diagram illustrating the configuration of the reagent bottle double-loading preventing means of the automated analyzer according to the first embodiment of the present invention.
Figure 24A:
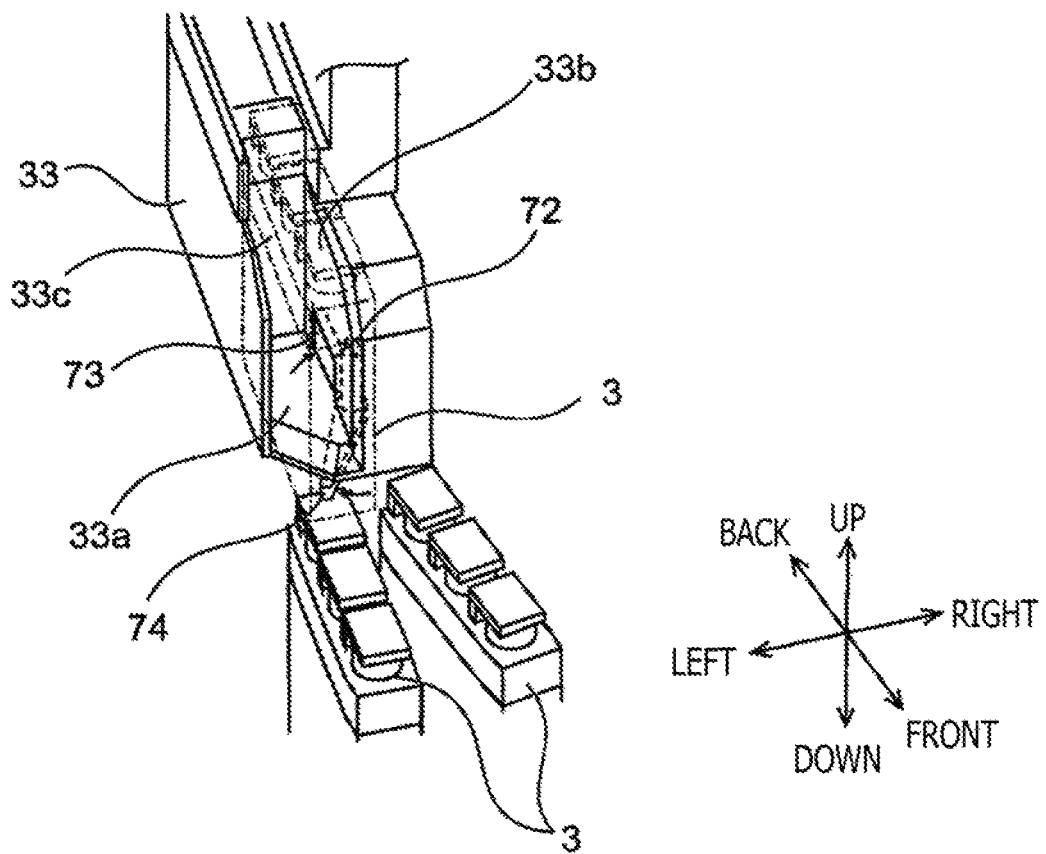
FIG. 24A is an explanatory diagram illustrating the configuration of the reagent bottle double-loading preventing means of the automated analyzer according to the first embodiment of the present invention.
Figure 24B:
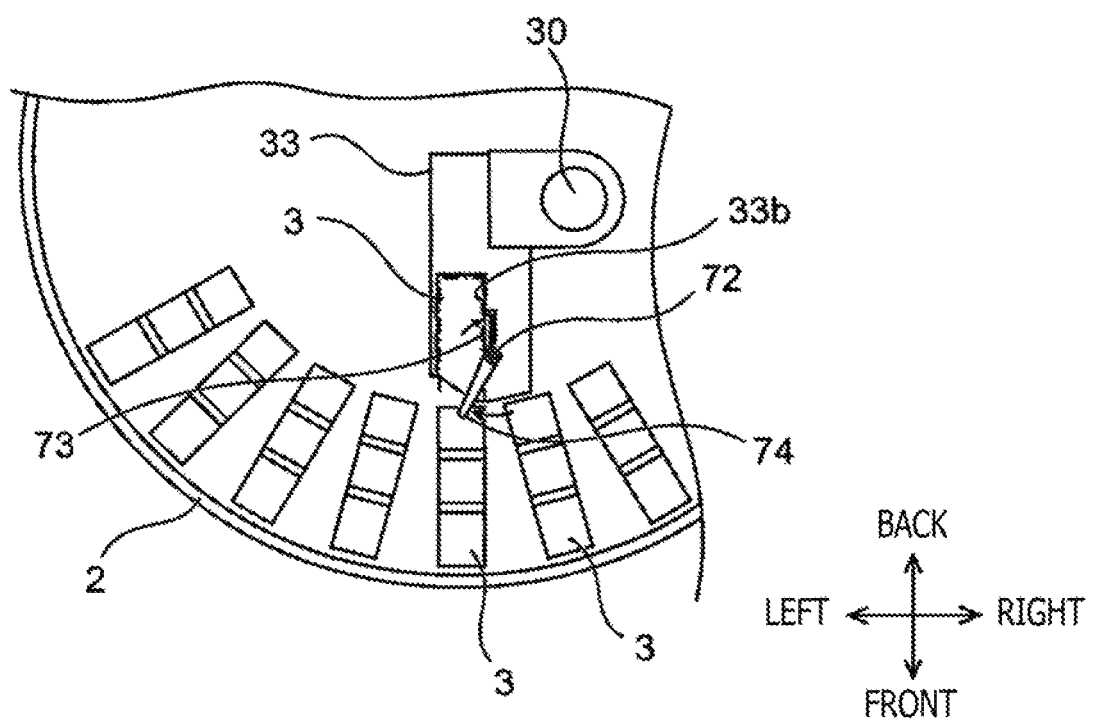
FIG. 24B is an explanatory diagram illustrating the configuration of the reagent bottle double-loading preventing means of the automated analyzer according to the first embodiment of the present invention.

FIG. 23A, FIG. 23B, FIG. 24A, and FIG. 24B are diagrams illustrating the configuration of the double-loading preventing means 71 for reagent bottles. FIG. 23A and FIG. 24A are perspective views, and FIG. 23B and FIG. 24B are plan views.

A part of the reagent bottle placing section side surface 33b is provided with the reagent bottle detecting arm 73 supported so as to be pivotal around a double-loading preventing arm shaft 72. The double-loading preventing arm shaft 72 extends downward below the reagent bottle placing section 33 bottom surface 33a and is provided with the double-loading preventing arm 74. A bias force acting counterclockwise as illustrated is applied to the reagent bottle detecting arm 73 by the torsion spring 75.

FIG. 23A and FIG. 23B illustrate a configuration in which a reagent bottle 3 has already been loaded in an adjacent slot in the reagent disk 2 and in which, to pull out an empty reagent bottle 3, the operation handle 34a is used to lower the reagent bottle placing section 33 into the reagent disk 2 to change the sixth state to the fifth state.

No reagent bottle 3 is loaded in the reagent bottle placing section 33, and thus, the reagent bottle detecting arm 73 is positioned to protrude from the reagent bottle placing section side surface 33b under the bias force of the torsion spring 75. At this time, the double-loading preventing arm 74 is positioned in the gap between the empty reagent bottle 3 and the adjacent reagent bottle 3 in a plan view in FIG. 23B, and the fifth state can be established by lowering the reagent bottle placing section 33. In other word, to pull out the empty reagent bottle 3, the reagent bottle placing section 33 can be lowered in a case where the reagent bottle placing section 33 is empty.

On the other hand, FIG. 24A and FIG. 24B, the reagent disk 2 includes no empty slot, and in spite of a presence of an already loaded reagent bottle 3, an attempt is made to load a new reagent bottle 3 (illustrated by an alternate long and short dash line) into the reagent bottle placing section 33 and then to load the reagent bottle 3 into the slot. Since the reagent bottle 3 is loaded along the reagent bottle placing section side surface 33b, the reagent bottle detecting arm 73 pivots counterclockwise as illustrated, against the bias force of the torsion spring 75, and a tip of the double-loading preventing arm 74 moves to a position where the tip overlaps the already loaded reagent bottle 3 in a plan view in FIG. 24B.

Then, when an attempt is made to lower the reagent bottle placing section 33, the tip of the double-loading preventing arm 74 comes into abutting contact with the upper surface of the already loaded reagent bottle 3 to prevent the reagent bottle placing section 33 from being further lowered. This enables the operator attempting to lower the operation handle 34a to notice that the reagent bottle 3 is not empty.

Furthermore, at this time, the double-loading preventing arm 74 provided below the reagent bottle placing section bottom surface 33a comes into contact with the upper surface of the already loaded reagent bottle 3 and is subjected to a reaction force. Thus, no force is applied to the reagent bottle 3 loaded in the reagent bottle placing section 33, and the reagent bottle 3 to be newly loaded is prevented from being pushed up and coming off the reagent bottle placing section 33.

Provision of the double-loading preventing means 71 described above easily allows, using the simple configuration, the operator to recognize whether the slot in the reagent disk 2 in which the next loading is to be performed is empty or not. Thus, an easy-to-use reliable automated analyzer 1 can be provided that prevents double loading of the reagent bottles 3.

Figure 25:
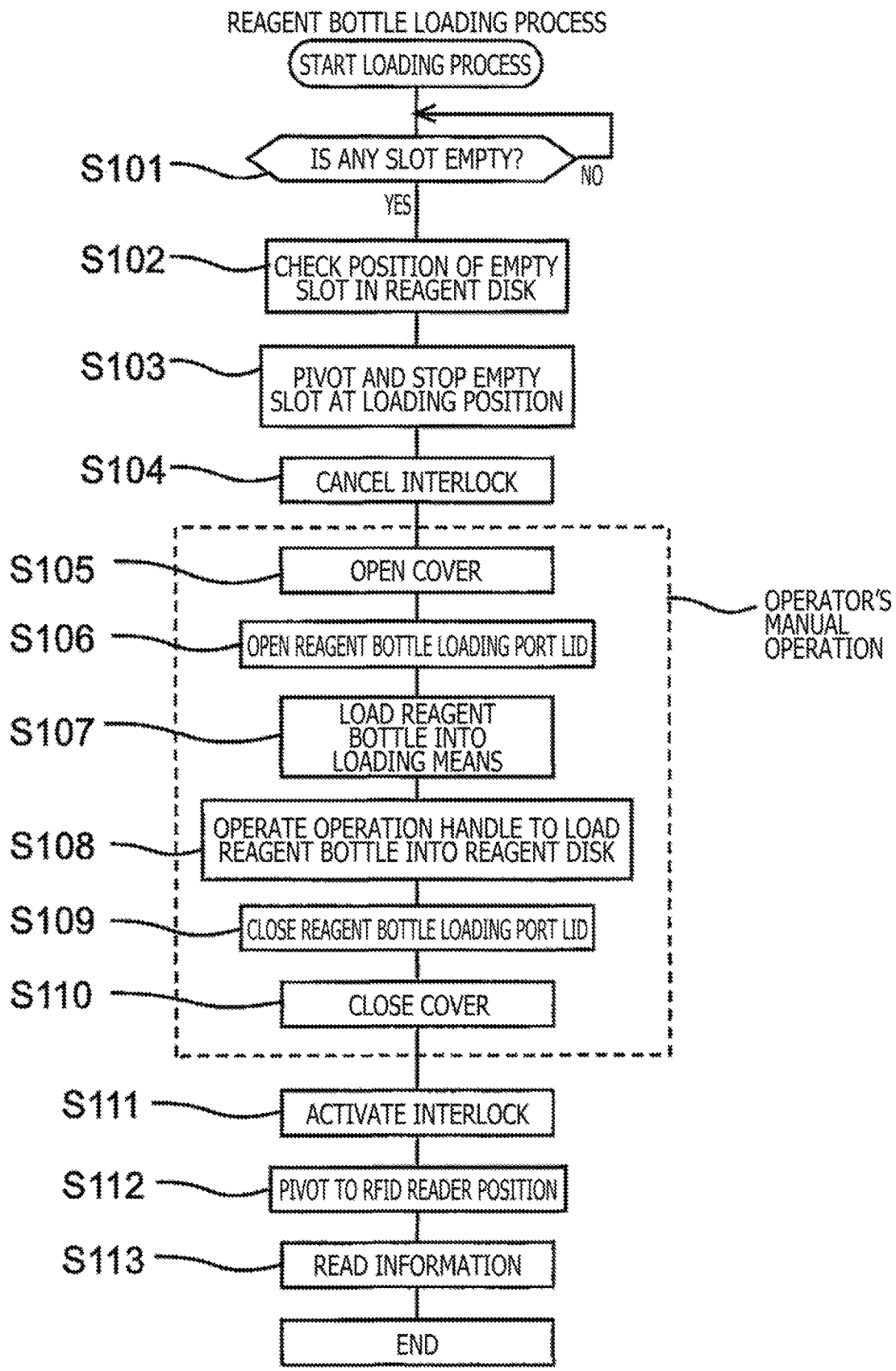
FIG. 25 is a flowchart illustrating a series of reagent bottle loading processes in the automated analyzer according to the first embodiment of the present invention.

Using a flowchart in FIG. 25, a process will be described in which the reagent bottle 3 is newly loaded into the empty slot in the reagent disk 2.

Step S101
Before the loading process is started, whether any empty slot is present is determined to branch processing.

Step S102
In a case where the reagent disk 2 includes an empty slot, the position of the empty slot is checked.

Step S103
The reagent disk 2 is rotated to move the empty slot to the loading position where the reagent bottle loading means 24 performs an operation and then stop the empty slot at that position.

Step S104
The operation is stopped and the interlock is cancelled to allow the safety cover 4 and the reagent bottle loading port lid 22 to be opened.

Step S105
The safety cover 4 is opened.

Step S106
The reagent bottle loading port lid 22 is opened.

Step S107
The reagent bottle 3 is loaded into the reagent bottle loading means 24.

Step S108
The operation handle 34a is operated to load the reagent bottle 3 into the empty slot in the reagent disk 2, and the reagent bottle loading means 24 is moved back to the original position and locked.

Step S109
The reagent bottle loading port lid 22 is closed.

Step S110
The safety cover 4 is closed.

Step S111
In a case where closure of the safety cover 4 is detected or the operator uses unillustrated operation means to indicate that the loading of the reagent bottle 3 is completed, the interlock is activated to lock the safety cover 4 and the reagent bottle loading port lid 22.

Step S112
The newly loaded reagent bottle 3 is pivoted to the position of the reagent information read means 25, for example, an RFID reader.

Step S113
Reagent information about the reagent bottle 3 is read.

Thus, the process of loading the reagent bottle 3 into the empty slot in the reagent disk 2 is completed. Those of the above-described steps which range from the step S115 of opening the safety cover 4 to the step S110 of closing the safety cover 4 are the operator's manual operations. The loading of the reagent bottle 3 can be performed in accordance with the manual operations, and the reagent bottle 3 can be similarly unloaded from the reagent disk 2.

As described above, the operator can manually perform the loading and unloading of the reagent bottle 3. This enables the structure to be simplified and miniaturized and further allows an operation control algorithm to be simplified.

Second Embodiment

Now, a second embodiment of the present invention will be described with reference to FIGS. 26 to 35. FIGS. 26 to 33 are perspective views illustrating a second embodiment of the reagent bottle loading means 24.

The second embodiment differs from the first embodiment in that an operation handle 34b is shaped like a cylinder extending in the lateral direction and that the operation of the reagent bottle pull-out means 63 in which the reagent bottle pull-out protrusion 65 acts on the reagent bottle 3 is performed by conducting a current through a solenoid 81 rather than by the operation of tilting the operation handle 34b. Additionally, different operations of the operation handle 34b will be described below than result from a different driving link mechanism from the operation handle 34b to the reagent bottle placing section 33.

Figure 26:
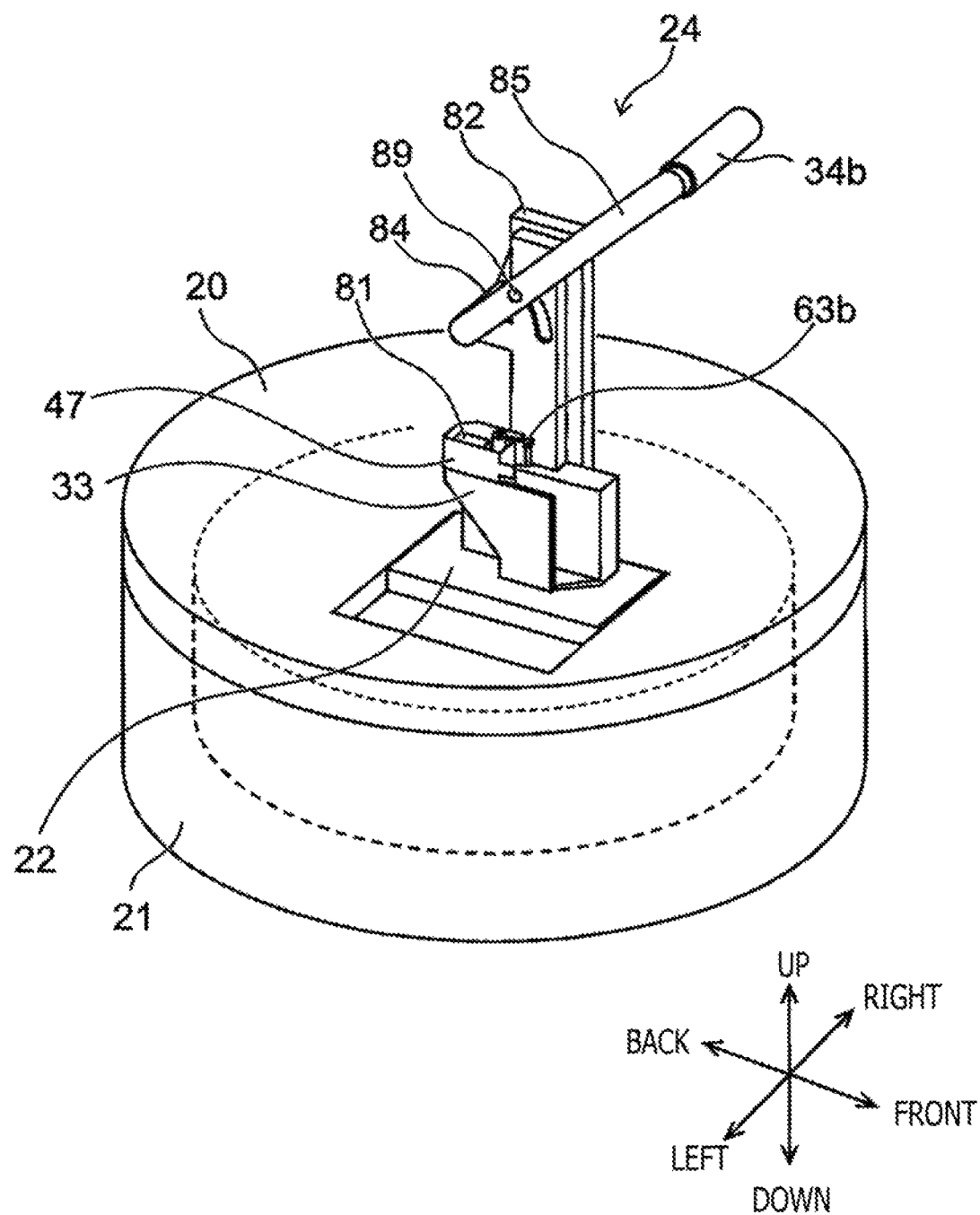
FIG. 26 is a perspective view of a reagent disk and reagent bottle loading means in an automated analyzer according to a second embodiment of the present invention.

FIG. 26 corresponds to the first state of the first embodiment and illustrates a state before loading of the reagent bottle 3.

Figure 27:
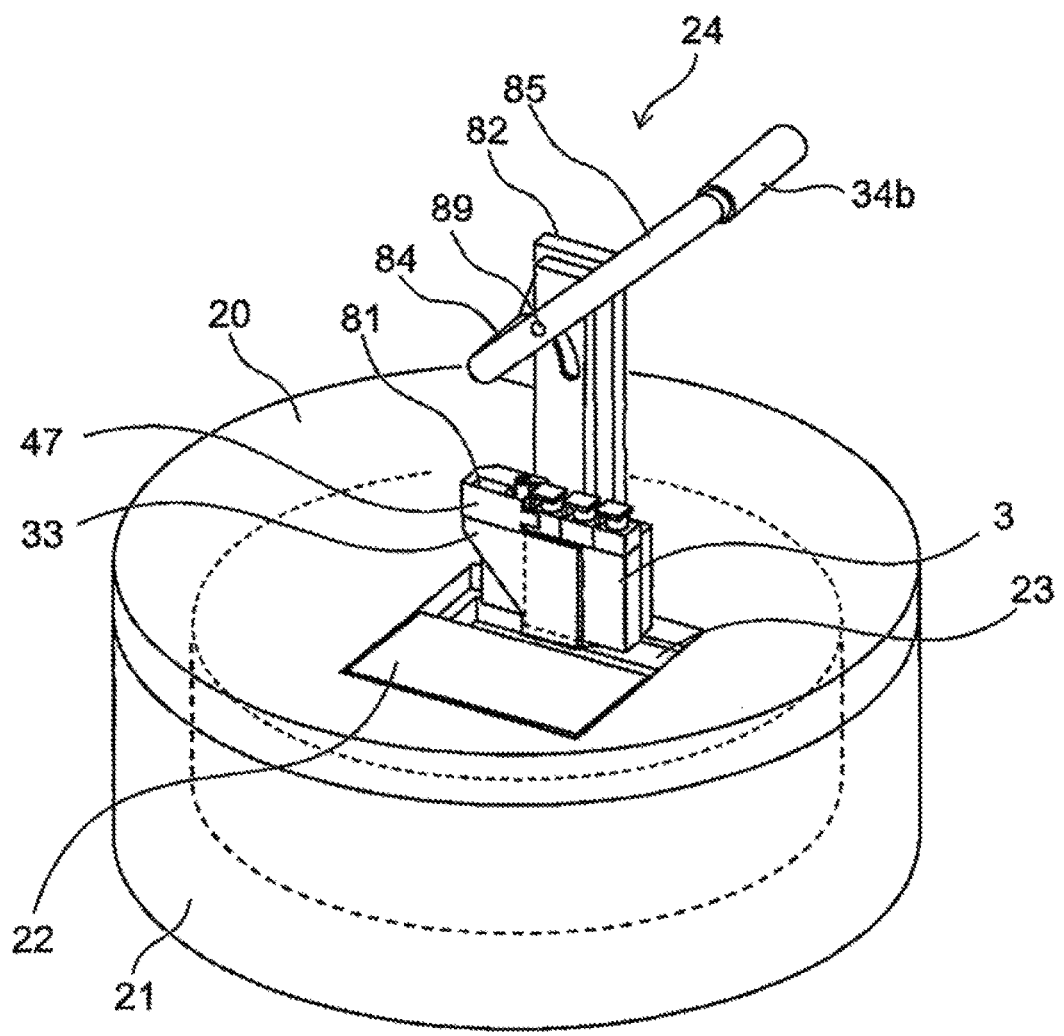
FIG. 27 is a perspective view of the reagent disk and the reagent bottle loading means in the automated analyzer according to the second embodiment of the present invention.
Figure 27:
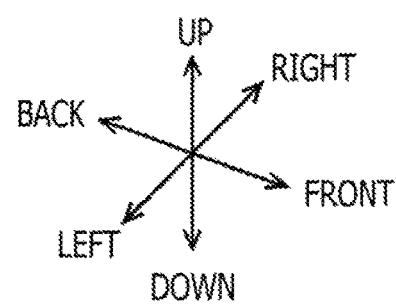

FIG. 27 corresponds to the second state of the first embodiment and illustrates a state where the reagent bottle 3 has been loaded in the reagent bottle placing section 33. In a case where the reagent bottle 3 is positioned to be loaded in the reagent disk 2, this state corresponds to the sixth state of the first embodiment.

Figure 28:
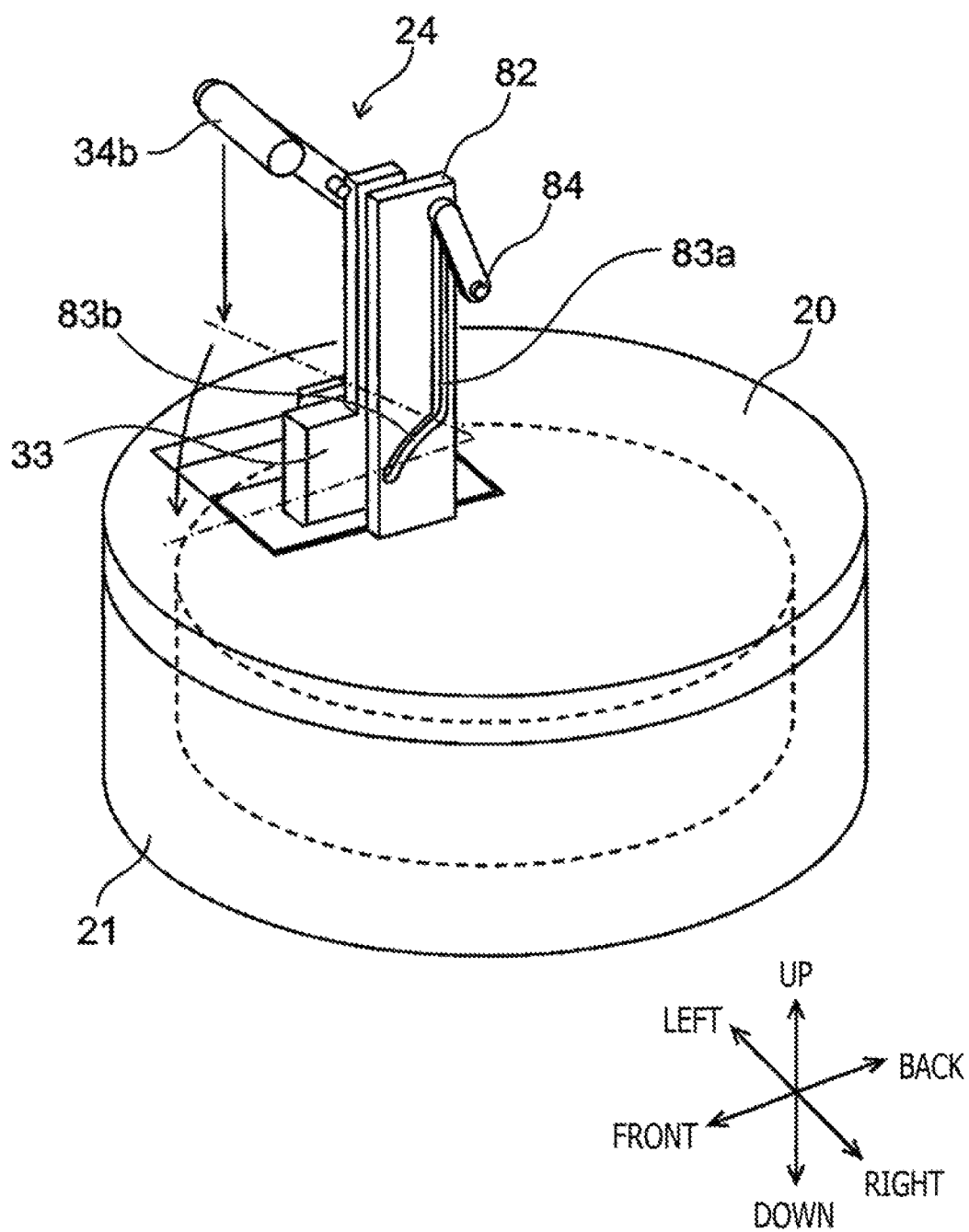
FIG. 28 is a perspective view of the reagent disk and the reagent bottle loading means in the automated analyzer according to the second embodiment of the present invention.

FIG. 28 is a perspective view of FIG. 26 as seen from an upper right direction.

Figure 29:
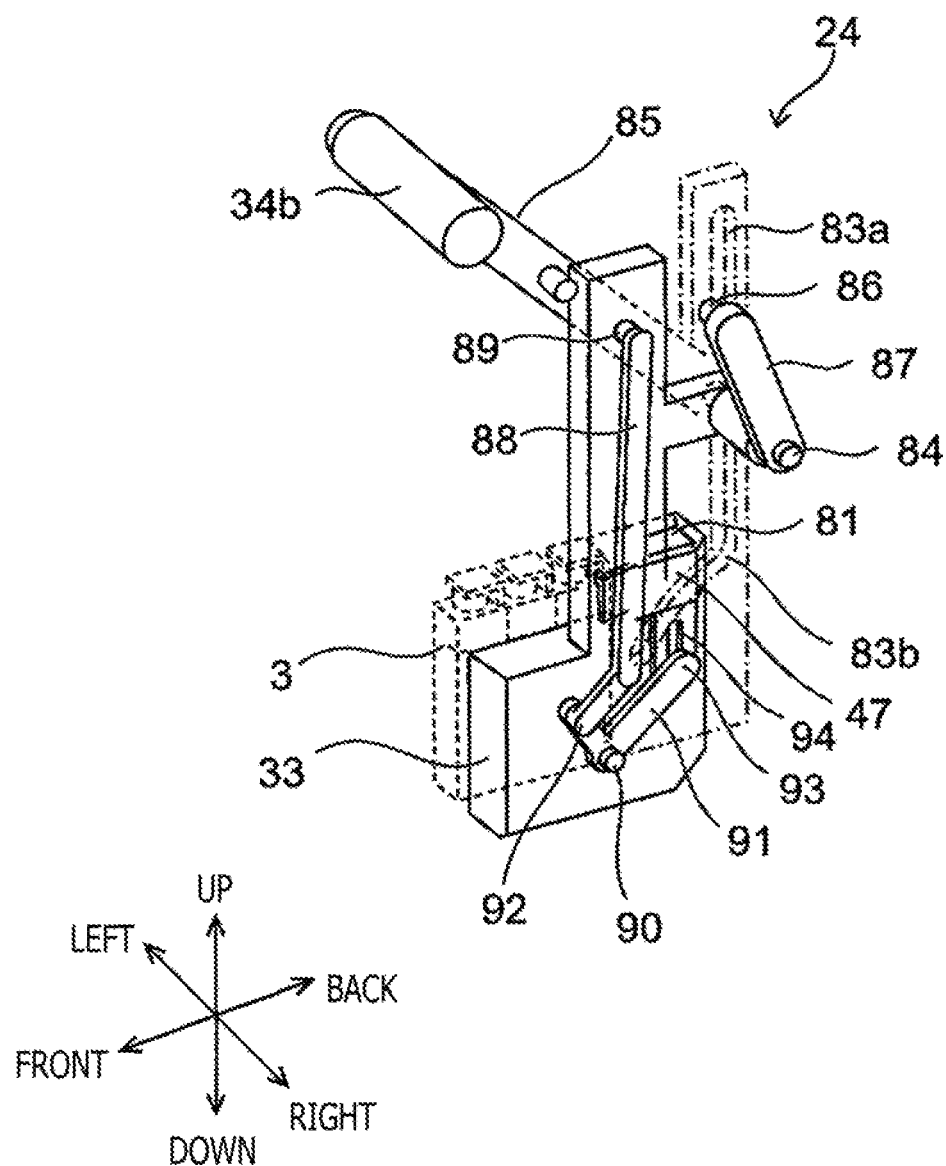
FIG. 29 is a perspective view of the reagent bottle loading means in the automated analyzer according to the second embodiment of the present invention.

FIG. 29 is a perspective view corresponding to the perspective view illustrated in FIG. 28 but illustrating only the reagent bottle loading means 24. FIG. 29 illustrates the internal structure of the reagent bottle loading means 24 with some components omitted.

Figure 30:
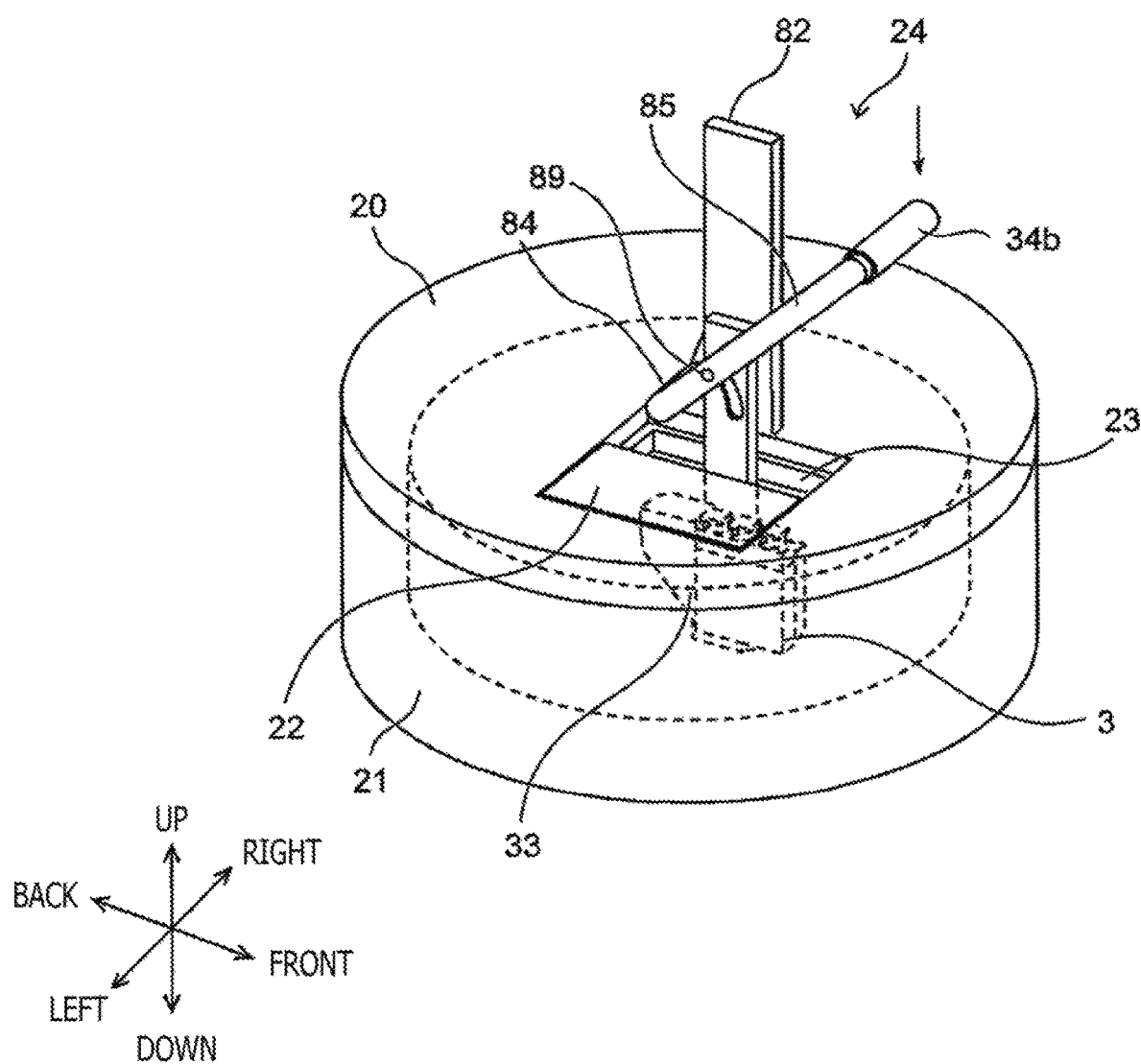
FIG. 30 is a perspective view of the reagent disk and the reagent bottle loading means in the automated analyzer according to the second embodiment of the present invention.
Figure 31:
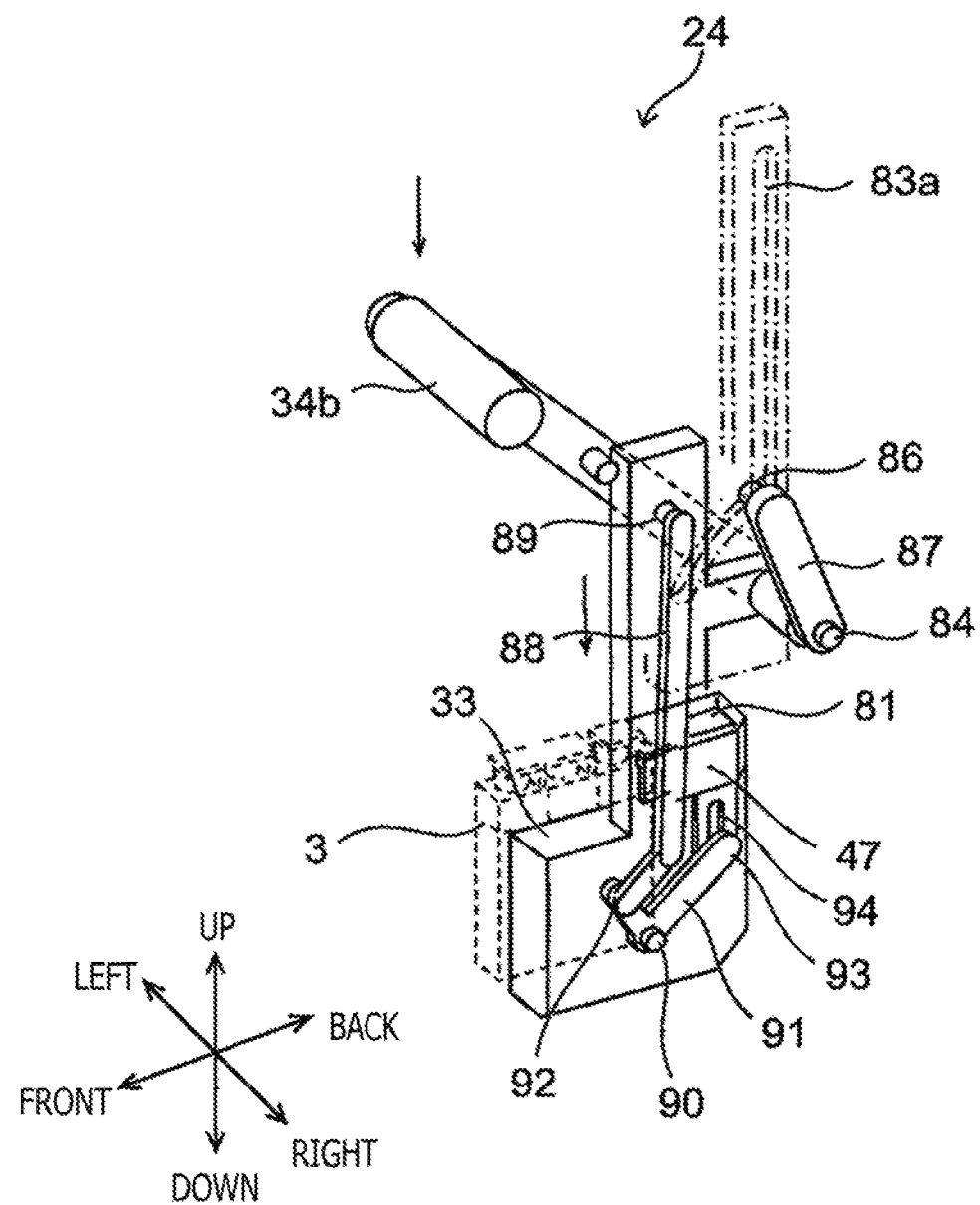
FIG. 31 is a perspective view of the reagent bottle loading means in the automated analyzer according to the second embodiment of the present invention.

FIG. 30 corresponds to the third state of the first embodiment. FIG. 31 is a perspective view of FIG. 30 as seen from the upper right direction and illustrates that the reagent bottle 3 has been lowered into the reagent disk 2. In a case where the reagent bottle 3 is positioned to be loaded in the reagent disk 2, this state corresponds to the fifth state of the first embodiment.

Figure 32:
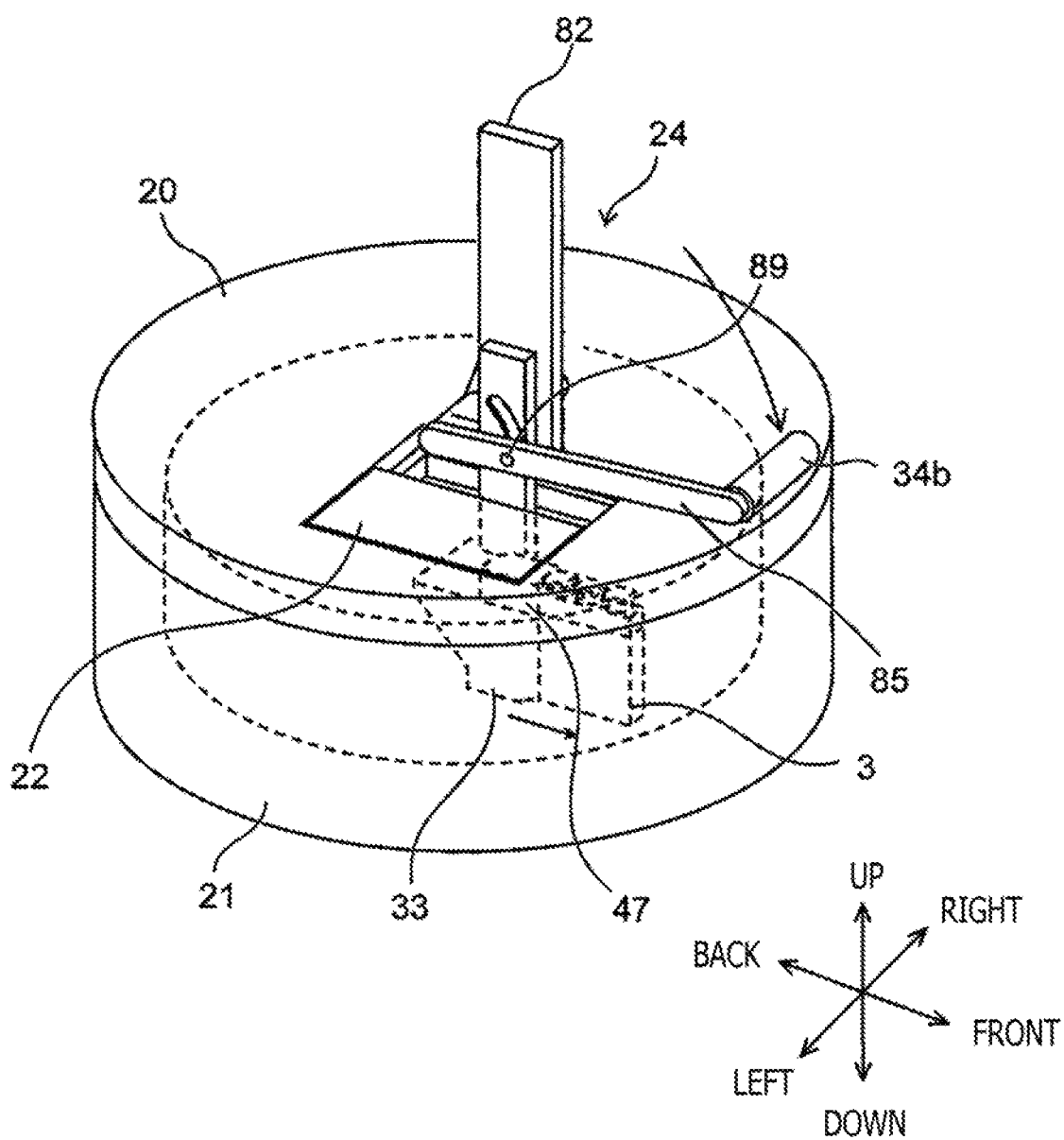
FIG. 32 is a perspective view of the reagent disk and the reagent bottle loading means in the automated analyzer according to the second embodiment of the present invention.
Figure 33:
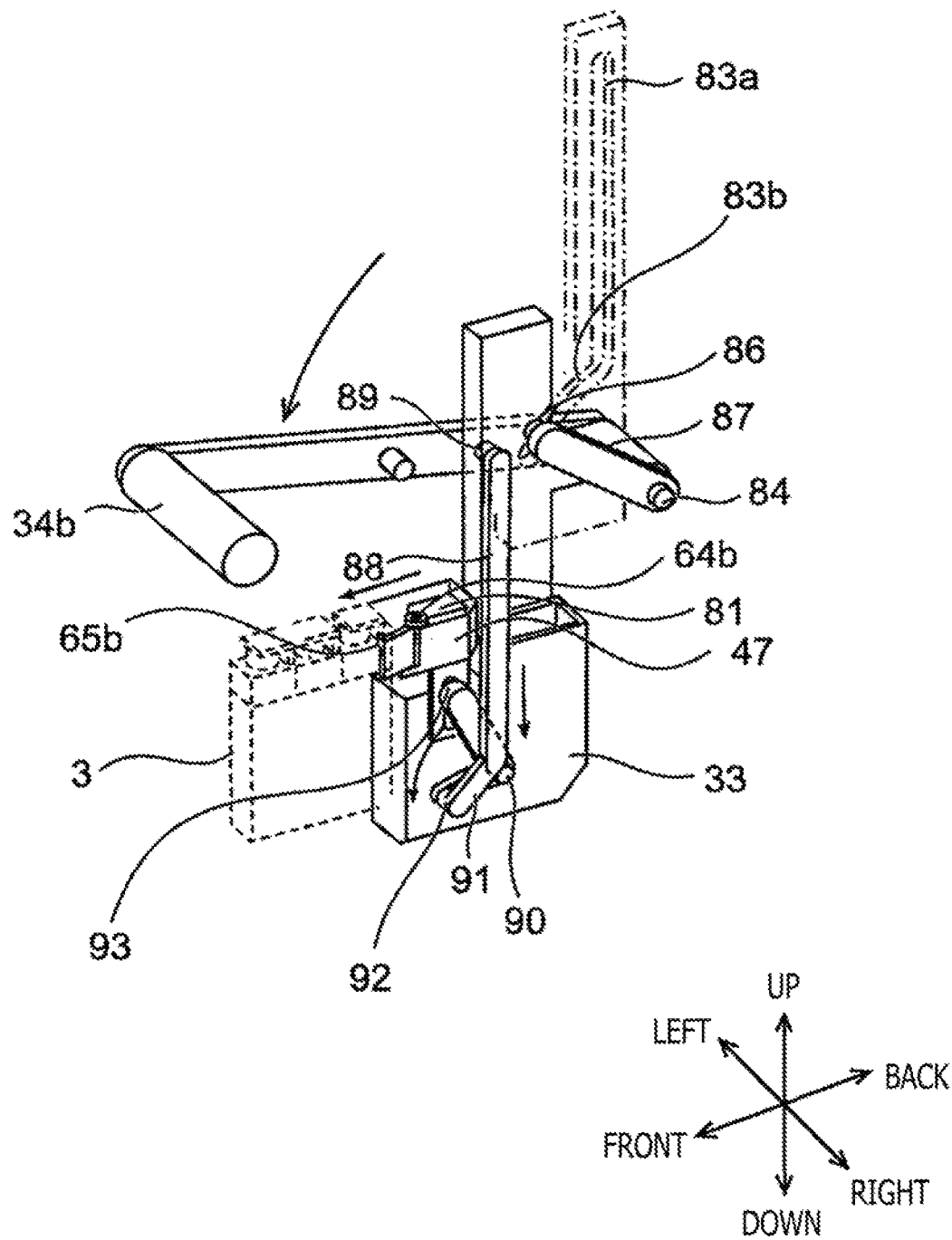
FIG. 33 is a perspective view of the reagent bottle loading means in the automated analyzer according to the second embodiment of the present invention.

FIG. 32 corresponds to the fourth state of the first embodiment. FIG. 33 is a perspective view of FIG. 32 as seen from the upper right direction and illustrates that the loading of the reagent bottle 3 into the reagent disk 2 is completed.

Figure 34A:
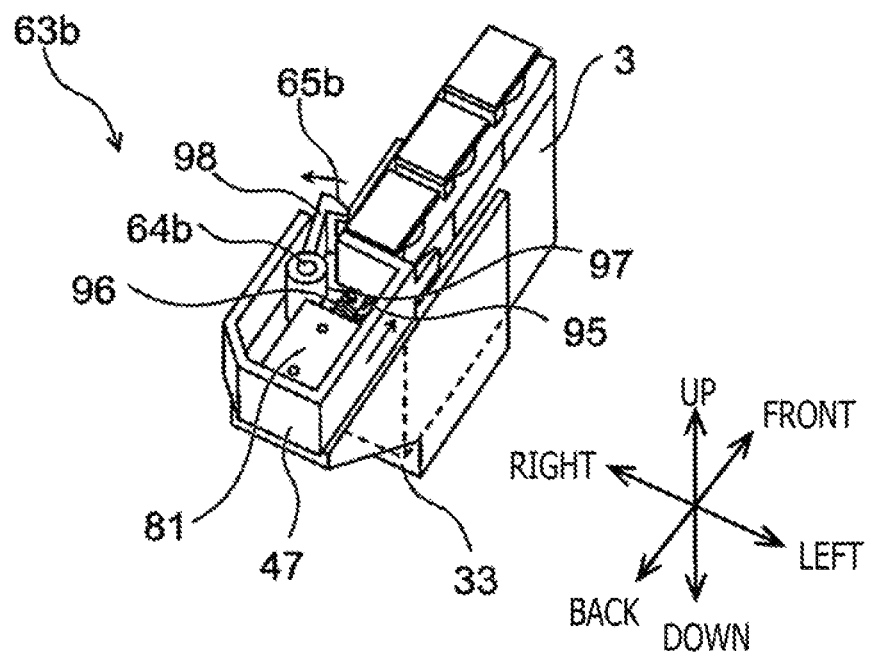
FIG. 34A is a perspective view of reagent bottle gripping means in the automated analyzer according to the second embodiment of the present invention.
Figure 34B:
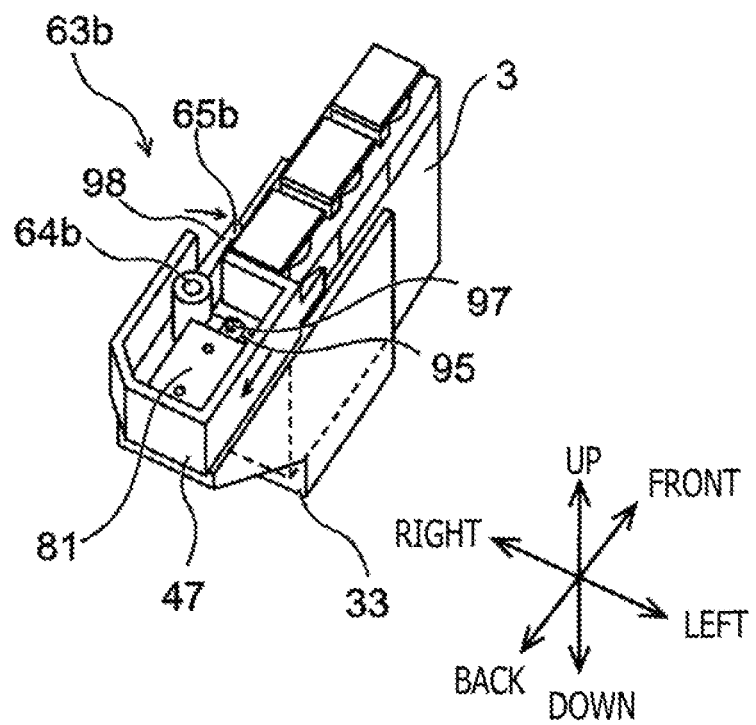
FIG. 34B is a perspective view of the reagent bottle gripping means in the automated analyzer according to the second embodiment of the present invention.

FIG. 34A and FIG. 34B are perspective views illustrating, in detail, the configuration and operation of reagent bottle gripping means for causing the reagent bottle pull-out protrusion 65b to act on the reagent bottle 3 using the solenoid 81.

FIG. 34A corresponds to the eighth state of the first embodiment and illustrates a state where no current is conducted through the solenoid 81, preventing the reagent bottle pull-out protrusion 65b from acting on the reagent bottle 3. FIG. 34B corresponds to the seventh state of the first embodiment and illustrates a state where a current is conducted through the solenoid 81 to cause the reagent bottle pull-out protrusion 65b to act on the reagent bottle 3.

<Reagent Bottle Loading Means>

The configuration of the reagent bottle loading means 24 according to the second embodiment will be described. A fixedly provided rectangular pillar 82 includes a guide rail 83 including a vertical portion 83a and a circular arc portion 83b provided so as to continuously extend downward from the vertical portion 83a.

The cylindrical operation handle 34b is horizontally and laterally provided at a front tip of a handle arm 85 supported so as to be pivotal around an operation handle support shaft 84 provided by extending a part of the reagent bottle placing section 33 upward and backward.

A guide arm 87 with a guide pin 86 at a tip of the guide arm 87 is provided around the operation handle support shaft 84 so as to rotate integrally with the handle arm 85. The guide pin 86 is slidably fitted into the guide rail 83 and is movable along the guide rail 83.

The reagent bottle 3 is loaded in the vicinity of the lower end of the reagent bottle placing section 33. The reagent bottle 3 includes, on a back portion of the reagent bottle 3, the reagent bottle push-out section 47 supported so as to be slidable in the front-back direction with respect to the reagent bottle placing section 33. Forward movement of the reagent bottle push-out section 47 enables the reagent bottle 3 to be pushed out from the reagent bottle placing section 33 toward the inside of the reagent disk 2, allowing the reagent bottle 3 to be loaded into the reagent bottle loading slot 26 of the reagent disk 2.

As illustrated in FIGS. 28 to 31, moving the operation handle 34b downward in the vertical direction moves the guide pin 86 downward along the guide rail vertical portion 83a, and thus, the guide arm 87 moves downward in the vertical direction without pivoting. Accordingly, the reagent bottle placing section 33 moves downward along with the operation handle 34b, and the reagent bottle 3 lowers into the reagent disk 2 through the reagent bottle loading port 23.

As illustrated in FIGS. 29 to 31, a pushrod 88 extending in the up-down direction is provided inside the reagent bottle loading means 24, and an upper end of the pushrod 88 is pivotally supported by a pushrod upper end support shaft 89 provided on the handle arm 85. A generally L-shaped bell crank 91 is provided in the vicinity of the lower end of the reagent bottle placing section 33, the bell crank 91 being supported so as to be pivotal around a bell crank support point 90. One end of the bell crank 91 and a lower end of the pushrod 88 are rotatably supported on a first bell crank shaft 92. The other end of the bell crank 91 forms a second bell crank shaft 93 and is slidably fitted into a reagent bottle push-out groove 94 that is an up-down-direction groove formed to extend downward from the vicinity of a back end of the reagent bottle push-out section 47.

Next, as illustrated in FIG. 32 and FIG. 33, operating the operation handle 34b further downward pivots the guide pin 86 around the operation handle support shaft 84 along the guide rail circular arc portion 83b. Accordingly, the handle arm 85 pivots around the operation handle support shaft 84 without lowering, and the pushrod 88 lowers and pivots counterclockwise as illustrated in FIG. 33, around the bell crank support point 90, with the second bell crank shaft 93 also pivoting. Then, the reagent bottle push-out section 47 is moved forward via the reagent bottle push-out groove 94 in which the second bell crank shaft 93 is fitted, and thus, the reagent bottle 3 is pushed out forward from the reagent bottle placing section 33 and loaded into the reagent disk 2.

Now, the configuration of reagent bottle pull-out means 63b different from the reagent bottle pull-out means of the first embodiment will be described using FIG. 34A and FIG. 34B. The reagent bottle pull-out means 63b is provided with the solenoid 81 as an actuator, and a current is conducted through the solenoid 81 to cause the reagent bottle pull-out protrusion 65b to act on the reagent bottle 3. In FIG. 34A, a bias force acting in a direction away from the solenoid 81 is applied to a plunger 95 of the solenoid 81 by a reaction force of a compression spring 96, and a pin 97 is provided in the vicinity of a tip of the plunger 95. In a case where a current is conducted through the solenoid 81, the plunger 95 is sucked by the solenoid 81 against the bias force of the push spring 96.

A lever 98 is generally L-shaped and supported so as to be pivotal around a rotation support shaft 64b. One end of the lever 98 is connected to the plunger 95 via the pin 97, and the other end of the lever 98 includes the reagent bottle pull-out protrusion 65b, which protrudes closer to the reagent bottle 3. While no current is conducted through the solenoid 81, the reagent bottle pull-out protrusion 65b is separated from the reagent bottle 3 under the bias force of the compression spring 96 and is thus prevented from acting on the reagent bottle 3.

On the other hand, when a current is conducted through the solenoid 81, the plunger 95 is sucked to pivot the lever 98 around the rotation support shaft 64, while moving the reagent bottle pull-out protrusion 65b in a direction closer to the reagent bottle 3. With the reagent bottle pull-out protrusion 65b keeping acting on the reagent bottle 3, the reagent bottle 3 is moved backward along with the reagent bottle push-out section 47 to allow the reagent bottle 3 to be pulled out from the reagent bottle loading slot 26.

In other word, with the reagent bottle 3 placed in the reagent bottle placing section 33, the operation handle 34b is lowered vertically and then operated so as to pivot forward to allow the reagent bottle 3 to be moved downward and then forward and thus loaded into an empty slot in the reagent disk 2.

Furthermore, with the reagent bottle placing section 33 empty, the operation handle 34b is vertically lowered and then operated to pivot forward to move the reagent bottle placing section 33 downward and then forward. Then, a current is conducted through the solenoid 81 to cause the reagent bottle pull-out protrusion 65b to act on the reagent bottle 3. With the reagent bottle pull-out protrusion 65b kept acting on the reagent bottle 3, the operation handle 34b is pivoted upward to move the reagent bottle placing section 33 backward, and the reagent bottle 3 is pulled out from the slot in the reagent disk 2. Subsequently, vertically raising the operation handle 34b allows the reagent bottle 3 to be taken out from inside the reagent disk 2 through the reagent bottle loading port 23. The conduction of a current through the solenoid 81 is cancelled to allow the empty reagent bottle 3 to be unloaded.

Figure 20:
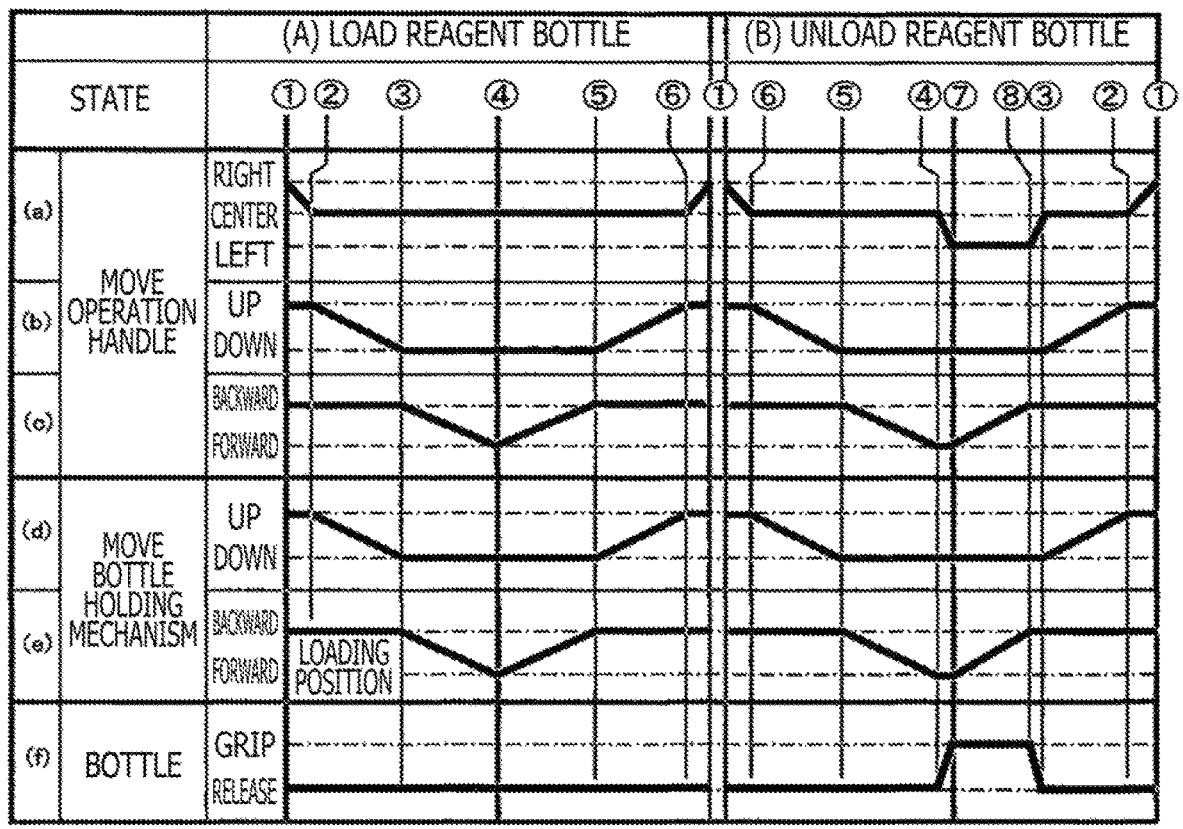
FIG. 20 is a time chart illustrating operations of the reagent bottle loading means of the automated analyzer according to the first embodiment of the present invention.
Figure 35:
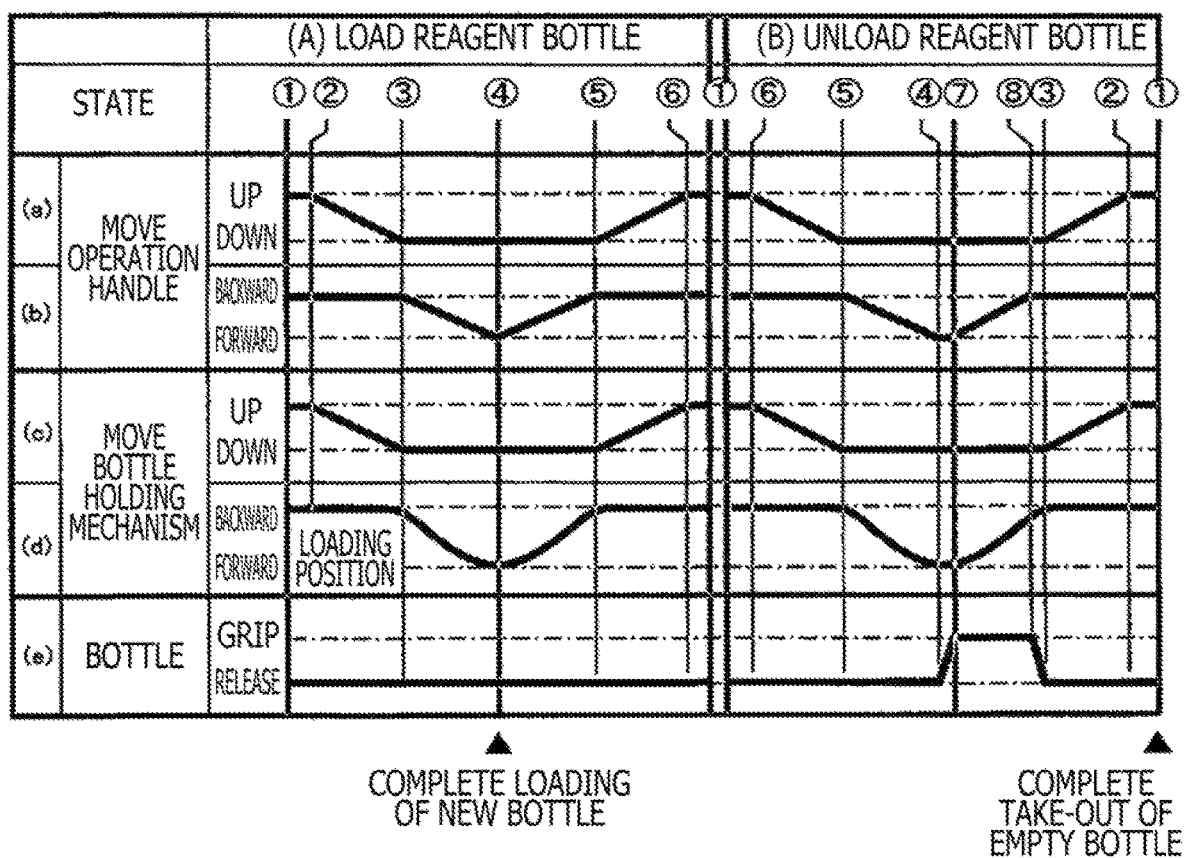
FIG. 35 is a time chart illustrating operations of the reagent bottle loading means in the automated analyzer according to the second embodiment of the present invention.

Like FIG. 20 for the first embodiment, FIG. 35 schematically illustrates the operation directions of and the operation timings for the components during the operations of loading and unloading the reagent bottle 3 according to the second embodiment. The operation directions and timings in the second embodiment differ from the operation directions and timings in the first embodiment in that the leftward and rightward tilting operations of the operation handle 34b are omitted and that gripping of the reagent bottle 3 and cancellation of the gripping are performed by conducting a current through the solenoid 81 and stopping the conduction. Furthermore, the pivoting operation of the operation handle 34b is converted into forward and backward operations via pivoting of a second bell crank shaft 93 and sliding of the reagent bottle push-out groove 94, and thus, the amount of forward and backward operations of the reagent bottle placing section 33 is not proportional to the pivoting angle of the operation handle 34b. Thus, the amount of operation of the reagent bottle placing section 33 is expressed by a curve instead of a straight line.

Third Embodiment

Now, a third embodiment of the present invention will be described with reference to FIGS. 36 to 41.

Figure 36:
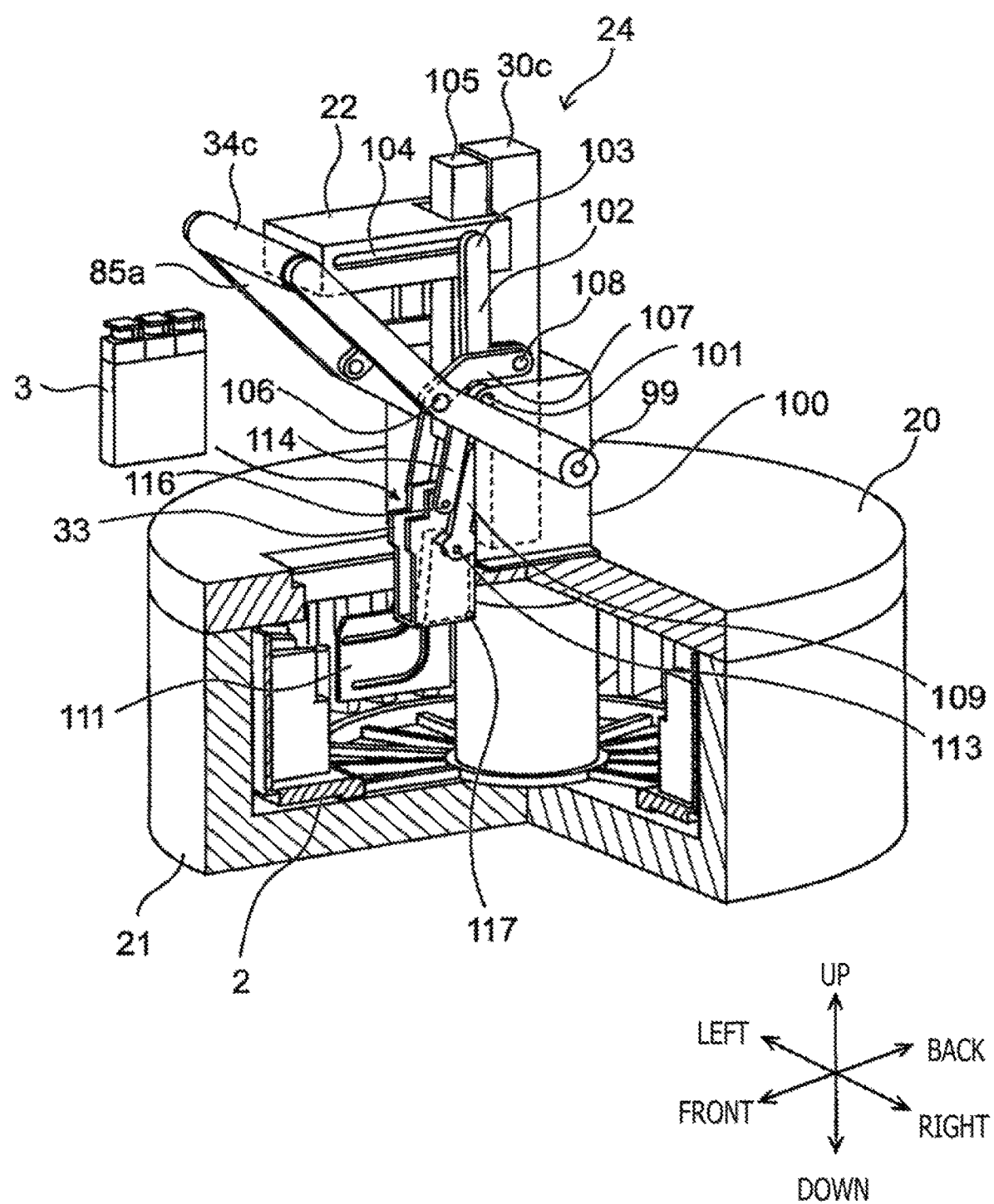
FIG. 36 is a partially cross-sectional perspective view of a reagent disk and reagent bottle loading means in an automated analyzer according to a third embodiment of the present invention.
Figure 39:
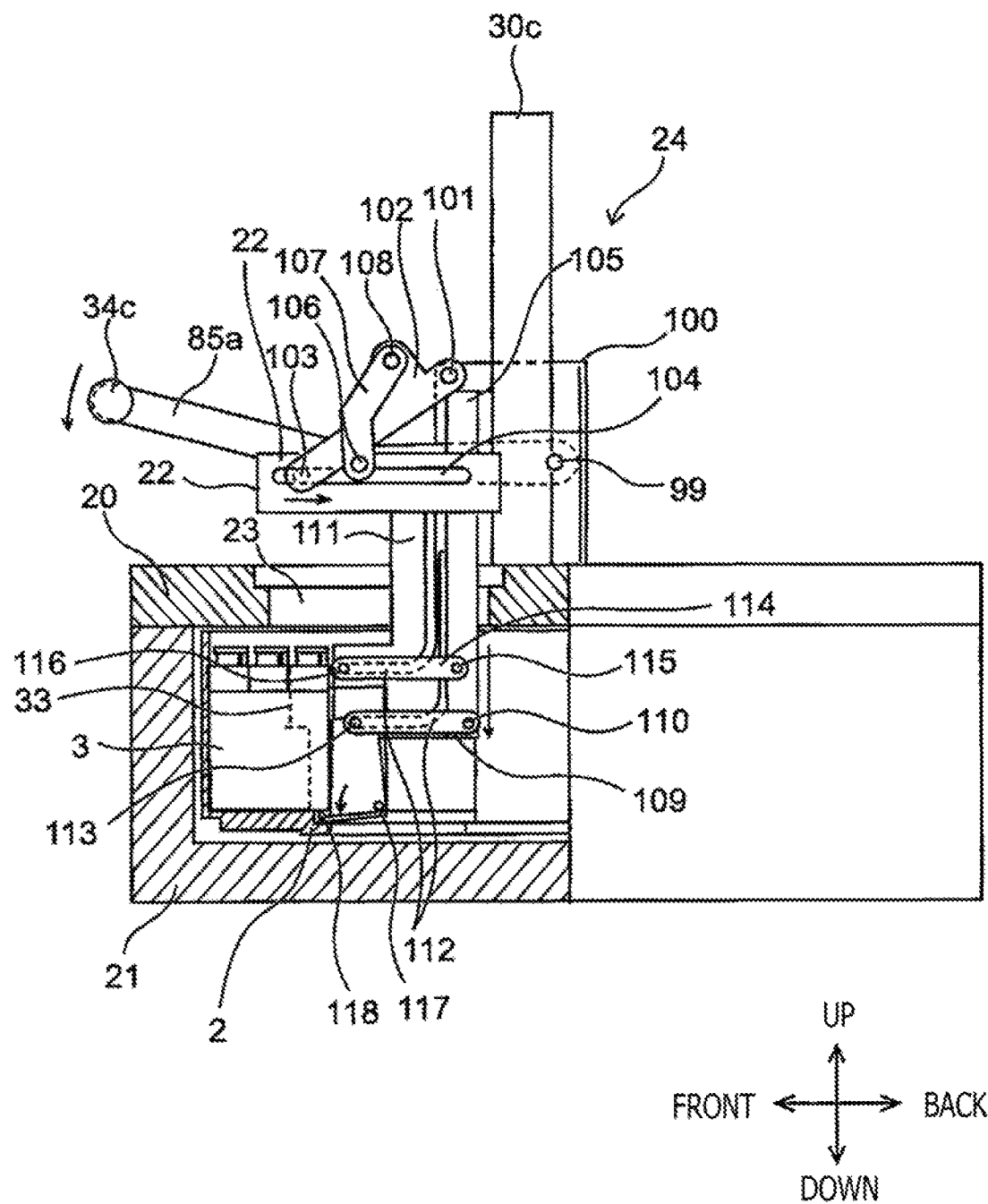
FIG. 39 is a cross-sectional view of the reagent disk and the reagent bottle loading means in the automated analyzer according to the third embodiment of the present invention.
Figure 40:
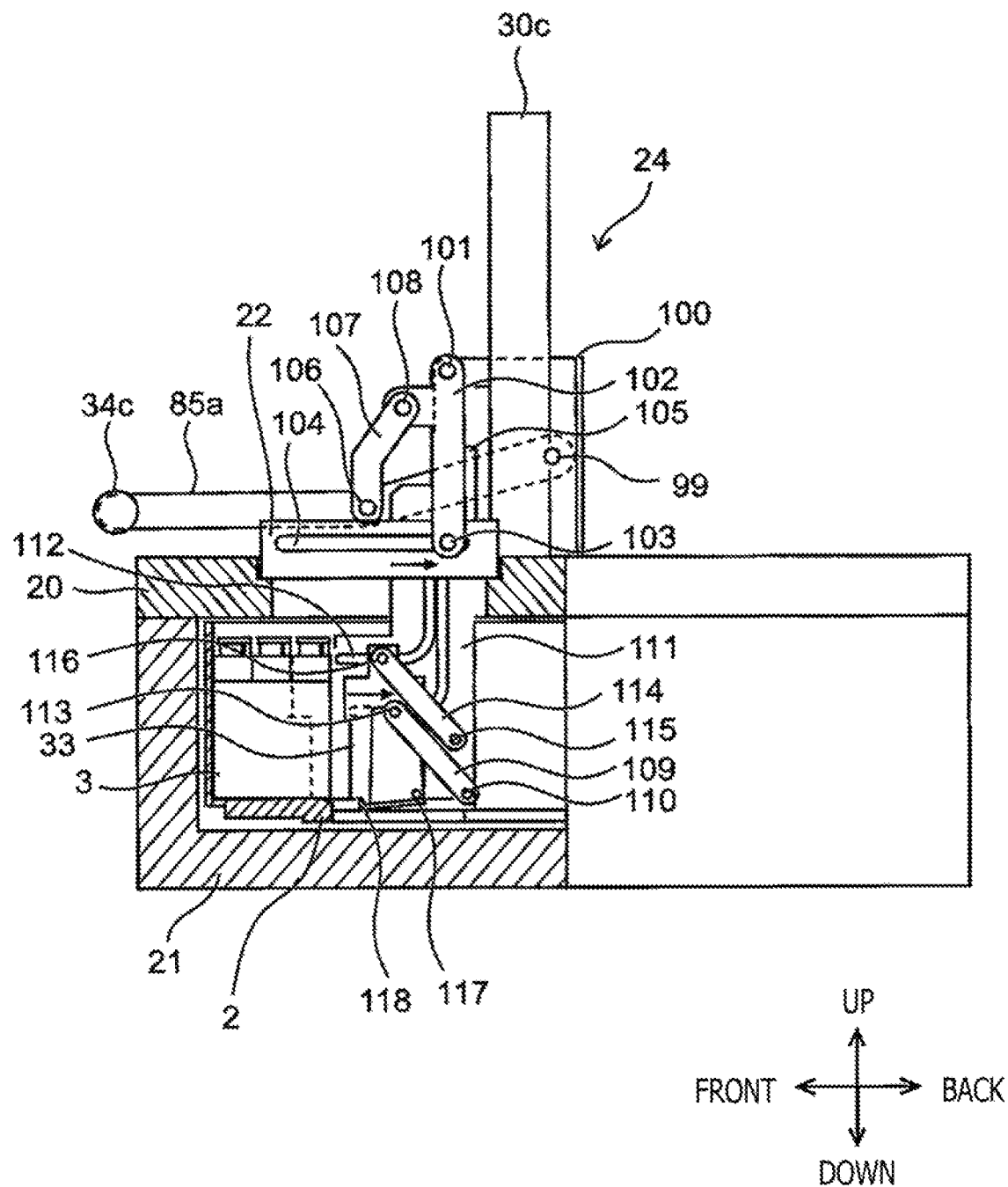
FIG. 40 is a cross-sectional view of the reagent disk and the reagent bottle loading means in the automated analyzer according to the third embodiment of the present invention.
Figure 41:
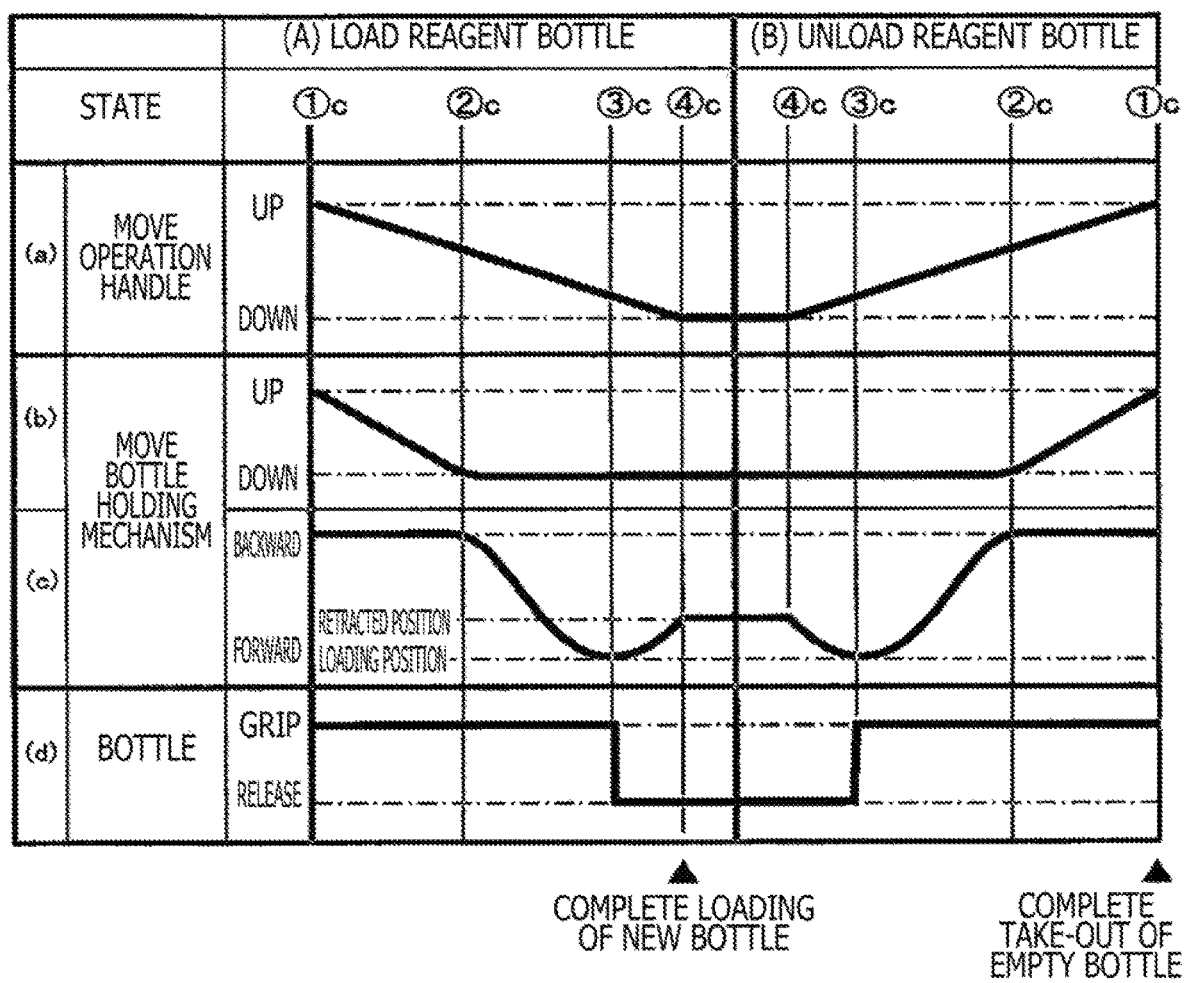
FIG. 41 is a time chart illustrating operations of the reagent bottle loading means in the automated analyzer according to the third embodiment of the present invention.

FIG. 36 is a perspective view of the third embodiment of the reagent bottle loading means 24, and FIGS. 37 to 40 are cross-sectional views sequentially illustrating a loading operation in which an operation handle 34c is moved in one direction from the upper end to the lower end. Like FIG. 20 for the first embodiment and FIG. 35 for the second embodiment, FIG. 41 schematically illustrates the operation directions of and the operation timings for the components during the operations of loading and unloading the reagent bottle 3.

The third embodiment differs from the first embodiment and the second embodiment in that the operation handle 34c is configured to perform only a pivoting operation via a handle arm 85a supported so as to be pivotal around a first support shaft 99.

Instead of sliding along the lid 20 to open the reagent bottle loading port 23, the reagent bottle loading port lid 22 moves upward and downward in conjunction with the operation handle 34c to open and close the reagent bottle loading port 23, and closes the reagent bottle loading port 23 at the lower end position of the operation handle 34c, as described below in detail.

In the first embodiment and the second embodiment, during each operation of loading or unloading the reagent bottle 3, the operation handle 34c performs a reciprocating operation of moving from the upper end to the lower end and then returning to the upper end. However, in the third embodiment, the loading operation is performed by moving the operation handle 34c in one direction from the upper end to the lower end, and with the operation handle 34c remaining at the lower end position, the automated analyzer 1 is operated. The operation of unloading the empty reagent bottle 3 is performed by moving the operation handle 34c in one direction from the lower end to the upper end.

In FIGS. 36 to 40, the handle arm 85a is supported at one end so as to be pivotal around the first support shaft 99 provided on a fixedly supported support frame 100, and includes the cylindrical operation handle 34c provided at the other end of the handle arm 85a. One end of a third link 102 is pivotally supported by a fourth support shaft 101 provided on the support frame 100, and the other end of the third link 102 includes a cylindrical fifth support shaft 103 and is slidably fitted in a slide groove 104 formed in lateral side surfaces of the reagent bottle loading port lid 22 so as to extend in the front-back direction. The reagent bottle loading port lid 22 is fixed to a slider 105 supported so as to be slidable in the vertical direction with respect to a fixed pillar 30c. When lowered to the lower end along with the slider 105, the reagent bottle loading port lid 22 closes the reagent bottle loading port 23.

Figure 37:
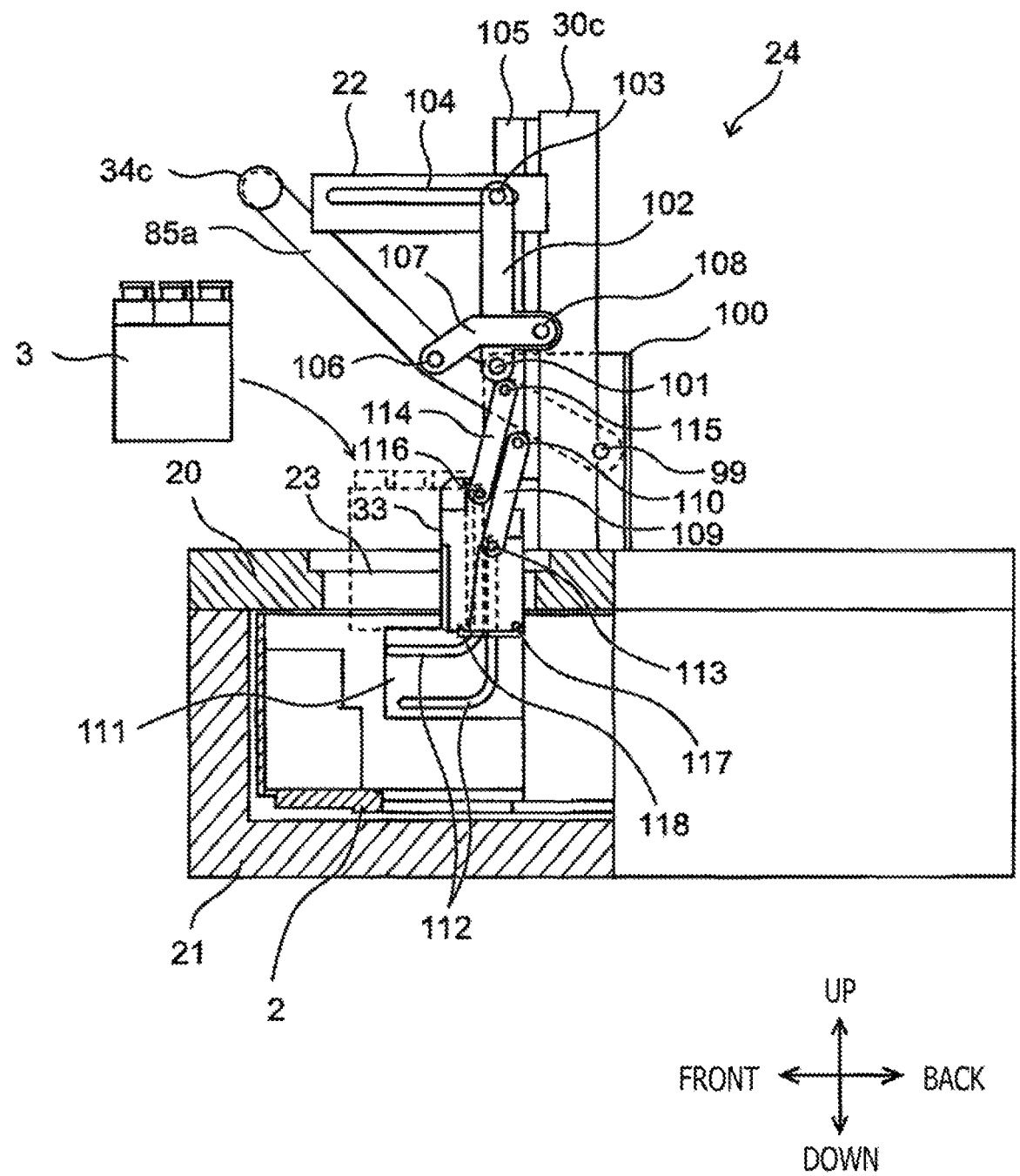
FIG. 37 is a cross-sectional view of the reagent disk and the reagent bottle loading means in the automated analyzer according to the third embodiment of the present invention.

In FIG. 36 and FIG. 37, the operation handle 34c and the reagent bottle loading port lid 22 are in what is called an open position where the operation handle 34c and the reagent bottle loading port lid 22 are raised to respective uppermost positions. In a case where the components are arranged such that, at this time, the fifth support shaft 103 is positioned immediately above the fourth support shaft 101, the third link 102 serves as a prop for the support frame 100 to support the reagent bottle loading port lid 22 from below via the slide groove 104.

A second support shaft 106 is provided intermediate between the one end and the other end of the handle arm 85a. One end of a second link 107 is pivotally supported by the second support shaft 106, and the other end of the second link 107 is pivotally supported by a third support shaft 108 provided on the third link 102.

As illustrated in FIG. 36 and FIG. 37, in a case where the slider 105 is positioned at the upper end, the third support shaft 108 lies in proximity to the fourth support shaft 101 of the third link 102. Further, the third support shaft 108 is provided opposite to the second support shaft 106 with respect to a straight line connecting the fourth support shaft 101 and the fifth support shaft 103 together.

As illustrated in FIG. 37, an eighth support shaft 110 pivotally supporting one end of a fourth link 109 is provided in the vicinity of a lowermost end of the slider 105. The other end of the fourth link 109 includes a ninth support shaft 113 slidably supported in a lower guide groove 112 of two guide grooves 112, 112 that are formed in a fixedly supported guide plate 111 and that are each generally L-shaped, the grooves 112, 112 being disposed away from each other in the up-down direction.

A sixth support shaft 115 pivotally supporting one end of a fifth link 114 is provided upward and slightly forward of the eighth support shaft 110 of the slider 105, and the other end of the fifth link 114 includes a seventh support shaft 116 slidably supported in an upper guide groove 112.

The fourth link 109 and the fifth link 114 are assumed to be identical to each other in length. A distance between the sixth support shaft 115 and the seventh support shaft 116 is assumed to be equal to a distance between the eighth support shaft 110 and the ninth support shaft 113. Furthermore, a distance between the sixth support shaft 115 and the eighth support shaft 110 is assumed to be equal to an interval between the two guide grooves 112, 112 in the direction of a straight line connecting the sixth support shaft 115 and the eighth support shaft 110.

Moving the slider 105 in the up-down direction moves the sixth support shaft 115 and the eighth support shaft 110 in the up-down direction integrally with the slider 105. In a case where the seventh support shaft 116 and the ninth support shaft 113 move along the guide groove 112, the fourth link 109 and the fifth link 114 move while constantly remaining parallel to each other.

The seventh support shaft 116 and the ninth support shaft 113 are each rotatably supported by the reagent bottle placing section 33, and moreover, the fourth link 109 and the fifth link 114 move while constantly remaining parallel to each other. Thus, the reagent bottle placing section 33 moves along and parallel to the guide groove 112 via the seventh support shaft 116 and the ninth support shaft 113. Since the guide groove 112 is generally L-shaped, the reagent bottle placing section 33 also moves along the generally L-shaped guide groove 112.

The reagent bottle placing section 33 includes a tenth support shaft 117 provided in the vicinity of a back lower end of the reagent bottle placing section 33, and a reagent bottle support hook 118 supporting a back lower end portion of the reagent bottle 3 is pivotally supported around the tenth support shaft 117. In a position where the operation handle 34c has been pivoted in a direction in which the reagent bottle support hook 118 rises as illustrated in FIG. 37, the reagent bottle support hook 118 supports the back lower portion of the reagent bottle 3. In a position where the operation handle 34c has been pivoted in a direction in which the reagent bottle support hook 118 lowers as illustrated in FIG. 39 and FIG. 40, the reagent bottle support hook 118 comes off from the bottom surface of the reagent bottle 3 and does not support the reagent bottle 3.

Now, a series of loading operations of loading the reagent bottle 3 into the reagent disk 2 will be described with reference to FIGS. 36 to 40.

In FIG. 36 and FIG. 37, the reagent bottle 3 can be loaded into the reagent bottle placing section 33. At this time, the back lower end portion of the reagent bottle 3 is hooked on the reagent bottle support hook 118 to hold the reagent bottle 3. Since the third link 102 serves as a prop for the up-down direction as described above, the reagent bottle placing section 33 is not lowered even in a case of being pushed downward. Thus, the reagent bottle 3 can be stably loaded into the reagent bottle placing section 33. This state may be referred to a first state c.

Figure 38:
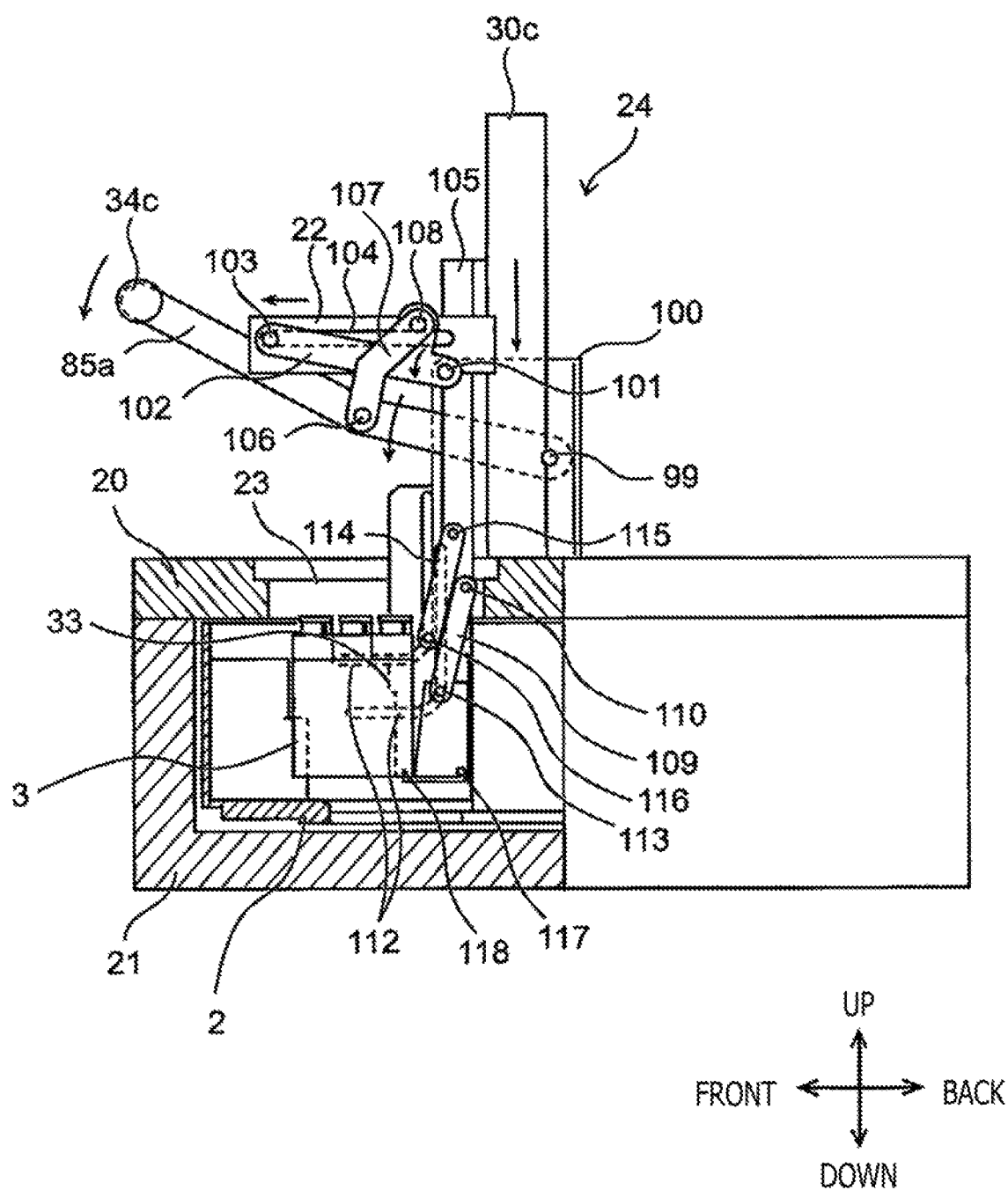
FIG. 38 is a cross-sectional view of the reagent disk and the reagent bottle loading means in the automated analyzer according to the third embodiment of the present invention.

FIG. 38 illustrates a state in which the reagent bottle 3 is being lowered by rotating the operation handle 34c counterclockwise as illustrated, around the first support shaft 99. The third support shaft 108 of the third link 102 is moved forward via the second link 107, and thus, the third link 102 pivots counterclockwise around the fourth support shaft 101. The fifth support shaft 103 moves forward along the slide groove 104, and the reagent bottle loading port lid 22 lowers along with the slider 105, the sixth support shaft 115, and the eighth support shaft 110. The fourth link 109 and the fifth link 114 lower the reagent bottle placing section 33 into the reagent disk 2 while remaining parallel to each other. This state may be referred to as a second state c.

FIG. 39 illustrates a state in which the operation handle 34c is further rotated counterclockwise as illustrated around the first support shaft 99. With the operation handle 34c pivoted, the third link 102 further pivots counterclockwise via the second link 107, and the fifth support shaft 103 further lowers the reagent bottle loading port lid 22 while moving backward along the slide groove 104. The sixth support shaft 115 and the eighth support shaft 110 also lower, but the seventh support shaft 116 and the ninth support shaft 113 slidably move forward within a front-back-wise extension range of the generally L-shaped guide groove 112 to move the reagent bottle placing section 33 forward toward the outer periphery of the reagent disk 2. Once the fourth link 109 and the fifth link 114 are placed level, the reagent bottle placing section 33 has been moved to the frontmost position to place the reagent bottle 3 in a loaded position in the vicinity of the outer periphery of the reagent disk 2.

Here, in a case that the operation handle 34c is pivoted counterclockwise as illustrated in a direction in which the reagent bottle support hook 118 lowers, using an electromagnetic actuator such as a solenoid as illustrated in FIG. 34A and FIG. 34B for the second embodiment or using an unillustrated cam mechanism acting in conjunction with the fourth link 109, the reagent bottle support hook 118 comes off from the bottom surface of the reagent bottle 3. This state may be referred to as a third state c.

FIG. 40 illustrates a state in which the operation handle 34c is further pivoted to the lowermost position. The third link 102 rotates from the raised position in FIG. 37 through substantially 180° around the fourth support shaft 101, and the fifth support shaft 103 is positioned immediately below the fourth support shaft 101. Thus, the third link 102 serves as a prop for the support frame 100, and the reagent bottle loading port lid 22 closes the reagent bottle loading port 23 open in the lid 20. The sixth support shaft 115 and the eighth support shaft 110 are positioned below the guide groove 112, and thus, the seventh support shaft 116 and the ninth support shaft 113 move backward along the guide groove 112.

Since the reagent bottle support hook 118 is off from the bottom surface of the reagent bottle 3, the reagent bottle 3 remains in the loaded position in the vicinity of the outer periphery of the reagent disk 2. The reagent bottle placing section 33, the fifth link, and the fourth link 109 are placed in a retracted position where the reagent bottle placing section 33, the fifth link, and the fourth link 109 have been moved backward. Loading of the reagent bottle 3 is thus completed. This state may be referred to as a fourth state c.

In a case where the reagent bottle 3 is emptied and is to be taken out, the operation handle 34c in the fourth state c in FIG. 40 is pivoted around the first support shaft 99 in the direction in which the operation handle 34c is raised. In the third state c in FIG. 39, the reagent bottle placing section 33 in the retracted position is placed in proximity to the reagent bottle 3. Then in the second state c in FIG. 38, the back lower end portion of the reagent bottle 3 is hooked on the reagent bottle support hook 118, and the reagent bottle 3 is pulled out backward. Moreover, in the first state c in FIG. 37, the operation handle 34c is raised to the uppermost position, and the reagent bottle 3 can be taken out from the reagent bottle loading port 23.

Using the time chart in FIG. 41, the operation directions of and the operation timings for the components during the operations of loading and unloading the reagent bottle 3 according to the third embodiment will be described. In FIG. 41, the first state c to the fourth state c are denoted by circled numbers with the subscript c.

The operation handle 34c makes a circular arc motion around the first support shaft 99 to lower substantially uniformly from the first state c to the fourth state c. The reagent bottle placing section 33 lowers from the first state c to the second state c. In this part, the reagent bottle placing section 33 moves along a portion of the generally L-shaped guide groove 112 that faces in the vertical direction. From the second state c to the third state c, the reagent bottle placing section 33 moves forward from the inner periphery to the outer periphery of the reagent disk 2. The third state c corresponds to a top position where the reagent bottle placing section 33 moves to the frontmost position, and also corresponds to the loaded position.

In the third state c, the reagent bottle support hook 118 is disengaged from the reagent bottle 3, and the reagent bottle placing section 33 continuously moves backward from the third state c to the fourth state c and reaches the retracted position. In this state, the reagent bottle loading means 24 is in a retracted state, and thus, the reagent disk 2 can be rotated to operate the automated analyzer 1.

The reagent bottle unloading operation is a contrary operation to the reagent bottle loading operation, and thus, the time chart in FIG. 41 is laterally symmetric.

According to the present invention, simply operating the operation handle allows the reagent bottle to be loaded in a predetermined position within the reagent disk and to be unloaded from the predetermined position. Thus, an easy-to-use, reliable automated analyzer can be effectively provided.

The reagent bottle loading means according to the present invention allows the reagent bottle to be moved to and loaded in the predetermined position inside the reagent disk in accordance only with the manual operation with the operation handle. Thus, a reliable automated analyzer can be provided that eliminates a need for an actuator, wiring, or power transmission mechanisms such as gears and belts and that enables simplification of the reagent bottle loading means and a reduction in the size and cost of the reagent bottle loading means, the automated analyzer using a simple operation control algorithm and facilitating loading and unloading of the reagent bottle.

According to the present invention, the reagent bottle loading means is operated in accordance with the operation of the operation handle 34a, 34b, or 34c, and the position where the reagent bottle 3 is inserted into the slot in the reagent disk 2 is prevented from varying depending on the operation of the operation handle 34a, 34b, or 34c, with the reagent bottle 3 always loaded in the constant position. Thus, an easy-to-use, reliable automated analyzer can be effectively provided that enables a reduction in errors in loading of the reagent bottle.

According to the present invention, the reagent bottle support section includes reverse-insertion preventing means for allowing the reagent bottle to be pushed to the innermost position for correct loading when the reagent bottle is inserted into the reagent bottle support section in the regular direction, while functioning to stopping and preventing the reagent bottle from being inserted to the innermost position in a case where the reagent bottle is inserted in the reverse orientation. This prevents the reagent bottle from being inserted into the reagent bottle support section in the reverse orientation. Thus, an easy-to-use, reliable automated analyzer can be effectively provided.

According to the present invention, when an attempt is made to perform duplicate loading of a new reagent bottle 3 into a slot in the reagent disk 2 in which a reagent bottle 3 is already loaded, instead of an empty slot (double loading), in a case where the reagent bottle 3 is completely loaded in the slot, double-loading detecting means provided at a bottom portion of the reagent bottle placing section 33 detects that the reagent bottle 3 is already loaded. This allows prevention of a situation where the reagent bottles 3 collide against each other and where the reagent bottle 3 being loaded is raised and comes off from the reagent bottle placing section 33 and falls into the reagent disk 2. Thus, an easy-to-use, reliable automated analyzer can be effectively provided.

Note that the present invention is not limited to the above-described embodiments but includes many variations. For example, the above-described embodiments are described in detail in order to describe the present invention in an easy-to-understand manner and are not necessarily limited to the described embodiments including all the components. Furthermore, a part of the configuration of one embodiment may be replaced with the configuration of another embodiment, and to the configuration of one embodiment, the configuration of another embodiment can be added. Furthermore, to a part of the configuration of each embodiment, addition, deletion, or replacement of another configuration can be made.

Furthermore, in the present embodiment, the reagent bottle loading port lid is slidable or movable in the up-down direction. However, the present embodiment is not limited to such a configuration, and a rotatably supported hinged opening/closing lid may be used.

Furthermore, in the present embodiment, the operation handle is cylindrical. However, the present embodiment is not limited to the cylindrical shape, and any shape may be used such as a lever shape, a general T shape, a general L shape, a circular pipe shape, a curved shape, a shape with recesses and protrusions provided to conform to the shape of the hand so long as the shape allows the operation handle to be easily gripped by the hand and to be easily moved in the up-down direction and in the lateral direction or rotated.

Furthermore, in the present embodiment, the reagent container holder holding a plurality of reagent bottles 3 is the reagent disk 2 that is a cylindrical rotary drum. However, the present embodiment is not limited to the cylindrical rotary drum, and another form of the reagent container holder may be, for example, a box-like reagent box in which a plurality of reagent bottles 3 are arranged in line or in a plurality of lines in series. When the reagent bottle 3 is loaded in such an embodiment, the box-like reagent box is linearly moved in the front-back direction or in the lateral direction to move an empty slot to a predetermined position, and then the reagent bottle 3 can be loaded into the slot.

Moreover, an opening may be formed in a side surface, instead of an upper surface, of a box-like reagent box in which a plurality of reagent bottles 3 are arranged in line or in a plurality of lines in series. When the reagent bottle 3 is loaded in such an embodiment, the box-like reagent box is linearly moved in the front-back direction or in the lateral direction to move an empty slot to a predetermined position, and then the reagent bottle 3 can be loaded through the opening in the side surface.

Moreover, in the present embodiment, the reagent bottle loading port 23 is open in the upper surface of the reagent disk 2 and the reagent bottle 3 is loaded and unloaded through the upper surface. However, the reagent bottle loading port 23 is not limited to the upper surface. An opening may be formed in a side surface on a circumference of the reagent disk 2, and the reagent bottle 3 may be loaded into the slot from the outer periphery toward the inner periphery of the reagent disk 2 and moved from inside the slot from the inner periphery toward the outer periphery of the reagent disk 2 and thus unloaded to the outside of the reagent disk 2.

Moreover, the reagent bottle loading port 23 may be formed in the upper surface of the reagent disk 2 and an opening for unloading of the reagent bottle 3 may be formed in the side surface on the circumference of the reagent disk 2. Then, the reagent bottle 3 may be loaded into the reagent disk 2 through the reagent bottle loading port 23 formed in the upper surface, and an empty reagent bottle 3 in the reagent disk 2 may be unloaded to the outside of the reagent disk 2 through the opening for unloading formed in the side surface of the reagent disk 2.

Furthermore, in the present embodiment, only one reagent bottle 3 can be placed in the reagent bottle placing section 33 of the reagent bottle loading means 24, and one reagent bottle 3 is loaded into and unloaded from each slot. However, the present embodiment is not limited to such a configuration. The configuration may be such that a plurality of reagent bottles 3 can be placed in the reagent bottle placing section 33 and that a plurality of the reagent bottles 3 are simultaneously loaded into and unloaded from a plurality of slots.

DESCRIPTION OF REFERENCE CHARACTERS

1: Automated analyzer
2: Reagent disk
3: Reagent bottle
4: Safety cover
5: Sample conveying means
6: Sample dispensing means
7: Sample dispensing tip/reaction container supply means
8: Sample dispensing tip/reaction container conveying means
9: Culture disk
10: Sample dispensing tip
11: Sample dispensing tip buffer
12: Sample dispensing tip/reaction container disposal hole
13: Reaction solution stirring means
14: Reaction container
15: Reagent dispensing pipette
15*a*: Reagent dispensing position
16: Stirring means
16*a*: Reagent stirring position
17: Cleaning means
18: Reaction solution suction nozzle
19: Detection means
20: Lid
21: Jacket
22: Reagent bottle loading port lid
23: Reagent bottle loading port
24: Reagent bottle loading means
25: Reagent information read means
26: Reagent bottle loading slot
27: Reagent bottle loading path
28: Partition plate
29: Reagent disk driving unit
29*a*: Motor
29*b*: Small pulley
29*c*: Reagent disk driving shaft
29*d*: Large pulley
29*e*: Belt
30: Pillar
31: First guide sleeve
32: Second guide sleeve
33: Reagent bottle placing section
33*a*: Reagent bottle placing section bottom surface
33*b*: Reagent bottle placing section side surface
33*c*: Reagent bottle placing section back surface
34*a*: Operation handle
34*b*: Operation handle
34*c*: Operation handle
35: Loading frame
36: First guide pin hole
37: First guide groove
38: First guide pin
39: Balance spring
40: Handle sleeve
41: Guide protrusion
42: Second guide groove
43: Third guide groove
44: First pivoting guide groove
45: Second pivoting guide groove
46: Through-guide-groove
47: Reagent bottle push-out section
48: Third guide sleeve
49: Reagent bottle push-out surface
50: Guide rod
51*a*: Second guide pin hole
51*b*: Second guide pin hole
52: Second guide pin
53: Lock pin
54: Lock pin clearance groove
55: Lock pin groove
56: First barring groove
57: Second barring groove
58: Bottle opening
59: Reagent container
60: Bottle portion
61: Hinge
62: Cap
63*a*: Reagent bottle pull-out means
63*b*: Reagent bottle pull-out means
64*a*: Rotation support shaft
64*b*: Rotation support shaft
65*a*: Reagent bottle pull-out protrusion
65*b*: Reagent bottle pull-out protrusion
66: Operation plate
67: Operation protrusion
68: Torsion spring
69: Direction determination lever
70: Torsion spring
71: Double-loading preventing means
72: Double-loading preventing arm shaft
73: Reagent bottle detecting arm
74: Double-loading preventing arm
75: Torsion spring
76: Reverse-insertion preventing means
77: Hinge detecting means
78: Stopper protrusion
79: Rotation support shaft
80: Bottle portion upper surface
81: Solenoid
82: Pillar (second embodiment)
83: Guide rail
83*a*: Vertical portion
83*b*: Circular arc portion
84: Operation handle support shaft
85: Handle arm
85*a*: Handle arm
86: Guide pin
87: Guide arm
88: Pushrod
89: Pushrod upper end support shaft
90: Bell crank support point
91: Bell crank
92: First bell crank shaft
93: Second bell crank shaft
94: Reagent bottle push-out groove 95: Plunger
96: Compression spring
97: Pin
98: Lever
99: First support shaft
100: Support frame
101: Fourth support shaft
102: Third link
103: Fifth support shaft
104: Slide groove
105: Slider
106: Second support shaft
107: Second link
108: Third support shaft
109: Fourth link
110: Eighth support shaft
111: Guide plate
112: Guide groove
113: Ninth support shaft
114: Fifth link
115: Sixth support shaft
116: Seventh support shaft
117: Tenth support shaft
118: Reagent bottle support hook
119: Rotation support hole
200: Host computer

The invention claimed is:
1. An automated analyzer comprising:
a reagent container holder including an openable and closable opening and a plurality of reagent container holding slots each capable of holding a reagent container at an internal predetermined position, wherein the reagent container holder further comprises:
a cylindrical, hollow drum disposed so as to be rotatable around a vertical shaft; and a heat insulating cover covering an upper surface, a lower surface, and a cylindrical side surface of the drum, and the opening is formed in the heat insulating cover; and
loading assisting means executing a loading process of conveying the reagent container from outside of the reagent container holder into the reagent container holder via the opening to load the reagent container into one of the reagent container holding slots and a taking-out process of conveying the reagent container from the reagent container holding slot to outside of the reagent container holder via the opening,
the loading assisting means being provided with a reagent container installing section in which the reagent container is enabled to be installed, a pillar movably supporting the reagent container installing section, and an operation handle operating the reagent container installing section in conjunction with an operation by a user,
wherein the loading assisting means, in the loading process, lowers, in conjunction with movement of the operation handle in a vertical direction, the reagent container placed on the reagent container installing section into the drum through the opening and moves, in conjunction with movement of the operation handle in a direction other than the vertical direction, the reagent container on the reagent container installing section in a direction away from the vertical shaft of the drum to the reagent container holding slot provided in an inner periphery of the drum.

2. The automated analyzer according to claim 1, wherein the loading assisting means, in the taking-out process,
moves, in conjunction with movement of the operation handle in the direction other than the vertical direction, the reagent container held on the particular reagent container holding slot from the reagent container holding slot in a direction closer to the vertical shaft of the drum to place the reagent container onto the reagent container installing section, and
moves, in conjunction with movement of the operation handle in the vertical direction, the reagent container installing section on which the reagent container is placed, to outside of the drum via the opening.

3. The automated analyzer according to claim 1, wherein the loading assisting means further comprises reagent container pull-out means coupling, in the taking-out process, the reagent container and the reagent container installing section together to enable the reagent container to be pulled out from the reagent container holding slot, the reagent container pull-out means supported so as to be pivotable around a rotation support shaft fitted into a rotation support hole, the reagent container pull-out means comprising a protrusion provided on an underside of the rotation support shaft and an operation plate protruding in a direction away from the rotation support shaft on an upper side of the rotation support shaft.

4. The automated analyzer according to claim 1, wherein the reagent container installing section further comprises reagent container reverse-direction insertion inhibiting means further including a determination lever that is supported so as to be pivotal around a support shaft and that includes a first protrusion coming into inclined abutting contact with the reagent container when the reagent container is inserted in a regular direction and includes a second protrusion having length shorter than the first protrusion and coming into orthogonal abutting contact with the reagent container when the reagent container is inserted in a reverse direction,
the determination lever pivoting around the support shaft and not preventing insertion of the reagent container when the reagent container is inserted into the reagent container installing section in a regular orientation,
the determination lever not pivoting and inhibiting, by the second protrusion, insertion of the reagent container when the reagent container is inserted into the reagent container installing section in a reverse orientation.

5. The automated analyzer according to claim 4, wherein the reagent container installing section further comprises:
a third protrusion supported so as to be pivotal around the support shaft and coming into abutting contact with the reagent container when the reagent container is inserted into the reagent container installing section; and
a fourth protrusion provided on a lower surface of the reagent container installing section so as to face an upper surface of the reagent container loaded in the reagent container holding slot in the reagent container holder, the fourth protrusion pivoting around the support shaft along with the third protrusion, wherein
in a case where the reagent container is not inserted into the reagent container installing section, the fourth protrusion is disposed in a position where the fourth protrusion does not come into abutting contact with the upper surface of the reagent container loaded in the reagent container holding slot, in a case where the reagent container is inserted into the reagent container installing section, the fourth protrusion is disposed in a position where the fourth protrusion comes into abutting contact with the upper surface of the reagent container loaded in the reagent container holding slot, when the reagent container is inserted into the reagent container installing section and the reagent container installing section is lowered, in a case where the reagent container holding slot is empty, the fourth protrusion does not come into abutting contact with the upper surface of the reagent container and enables the reagent container installing section to be lowered, and in a case where the reagent container is loaded in the reagent container holding slot, the fourth protrusion comes into abutting contact with the upper surface of the reagent container to inhibit lowering of the reagent container installing section.

6. The automated analyzer according to claim 1, wherein the operation handle is movable in a direction perpendicular to the pillar and in a direction inclined with respect to the pillar.

7. The automated analyzer according to claim 1, comprising:
- a guide pin moving in conjunction with movement of the operation handle;
- a guide rail enabling the guide pin to be slidably fitted in the guide rail and moved; and
- a reagent container push-out section pushing out the reagent container held on the reagent container installing section, wherein the guide rail is partly formed into a vertical portion extending in a vertical direction and into a circular arc portion extending continuously from the vertical portion, and the guide pin moves along the vertical portion of the guide rail to move the reagent container installing section in a direction in conjunction with movement of the operation handle and into the reagent container holder via the opening, and the guide pin moves along the circular arc portion of the guide rail to cause the reagent container push-out portion to move the reagent container in a horizontal direction in conjunction with rotational movement of the operation handle.

8. The automated analyzer according to claim 7, wherein the loading assisting means further comprises a reagent container pull-out protrusion moving the reagent container held on the reagent container holding slot to the reagent container installing section and an actuator driving the reagent container pull-out protrusion.

9. The automated analyzer according to claim 1, wherein the operation handle is provided so as to be pivotal in the vertical direction with respect to the pillar, and the operation handle is moved from an upper end to a lower end to execute a loading process of loading a new reagent container onto the reagent container holding slot and the operation handle is moved from the lower end to the upper end to execute a conveying process of conveying the reagent container to outside of the reagent container holder.

* * * * *